(12) United States Patent
Nishitani et al.

(10) Patent No.: US 10,127,622 B2
(45) Date of Patent: Nov. 13, 2018

(54) IMAGE PROCESSING APPARATUS AND ROBOT SYSTEM

(71) Applicant: Seiko Epson Corporation, Tokyo (JP)

(72) Inventors: Masanobu Nishitani, Suwa (JP); Nobuyuki Setsuda, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/854,499

(22) Filed: Sep. 15, 2015

(65) Prior Publication Data

US 2016/0078583 A1 Mar. 17, 2016

(30) Foreign Application Priority Data

Sep. 16, 2014 (JP) ................. 2014-187732
Sep. 16, 2014 (JP) ................. 2014-188035
Sep. 16, 2014 (JP) ................. 2014-188036
Sep. 16, 2014 (JP) ................. 2014-188037
Sep. 16, 2014 (JP) ................. 2014-188038
Sep. 16, 2014 (JP) ................. 2014-188127

(51) Int. Cl.
  *G06T 1/00* (2006.01)
  *B25J 9/16* (2006.01)
  *H04N 5/232* (2006.01)
  *G06T 7/73* (2017.01)

(52) U.S. Cl.
  CPC ........... *G06T 1/0014* (2013.01); *B25J 9/1697* (2013.01); *G06T 7/73* (2017.01); *H04N 5/23206* (2013.01); *H04N 5/23229* (2013.01); *Y10S 901/09* (2013.01)

(58) Field of Classification Search
  CPC ..... B25J 9/1697; B25J 9/1674; G06T 1/0014; G06T 7/0042; H04N 5/23206; H04N 5/23229; Y10S 901/09; Y10S 901/46
  See application file for complete search history.

(56) References Cited

U.S. PATENT DOCUMENTS

| | | | |
|---|---|---|---|
| 6,369,909 B1 | 4/2002 | Shima | |
| 6,940,615 B1 | 9/2005 | Shima | |
| 7,791,671 B2 * | 9/2010 | Schultz | H04N 5/23203 348/211.4 |

(Continued)

FOREIGN PATENT DOCUMENTS

| | | |
|---|---|---|
| GB | 2500846 A | 10/2013 |
| JP | 06-155349 A | 6/1994 |

(Continued)

OTHER PUBLICATIONS http://robots.epson.com/admin/uploads/product_catalog/files/EPSON_CV1_Vision%20(RevB), "Vision Guidance for Epson Robots", Epson CV1, Epson Robots, 2011, 2 pages.

(Continued)

*Primary Examiner* — Rachid Bendidi

(74) *Attorney, Agent, or Firm* — Harness, Dickey & Pierce, P.L.C.

(57) ABSTRACT

An image processing apparatus includes a first connecting unit connected to an image pickup apparatus, a plurality of second connecting units connected to one control apparatus or one other image processing apparatus, the control apparatus being configured to control a robot; and a processing unit configured to process picked-up images picked up by the image pickup apparatus.

6 Claims, 50 Drawing Sheets

(56) References Cited

U.S. PATENT DOCUMENTS

| | | | |
|---|---|---|---|
| 7,957,837 B2* | 6/2011 | Ziegler | B25J 5/007 318/568.1 |
| 2004/0125206 A1* | 7/2004 | Lohmann | B25J 9/1674 348/155 |
| 2005/0090907 A1 | 4/2005 | Hudson et al. | |
| 2005/0108408 A1* | 5/2005 | Ookubo | H04L 61/2015 709/228 |
| 2006/0064651 A1 | 3/2006 | Ito | |
| 2006/0161960 A1* | 7/2006 | Benoit | G08B 13/19656 725/105 |
| 2007/0230449 A1 | 10/2007 | Arai | |
| 2008/0205302 A1* | 8/2008 | Florit | H04L 12/462 370/255 |
| 2009/0027509 A1* | 1/2009 | Giesen | H04N 5/232 348/211.3 |
| 2011/0074970 A1* | 3/2011 | Sukegawa | G06K 9/00261 348/222.1 |
| 2012/0098969 A1* | 4/2012 | Wengrovitz | H04N 7/181 348/159 |
| 2014/0324220 A1* | 10/2014 | Gray | B25J 9/1679 700/259 |

FOREIGN PATENT DOCUMENTS

| | | |
|---|---|---|
| JP | 11-184649 A | 7/1999 |
| JP | 2004-088208 A | 3/2004 |
| JP | 2005-335034 A | 12/2005 |
| JP | 2006-039813 A | 2/2006 |
| JP | 2006-091987 A | 4/2006 |
| JP | 2006-127047 A | 5/2006 |
| JP | 2006-311583 A | 11/2006 |
| JP | 2007-274480 A | 10/2007 |
| JP | 2007-310690 A | 11/2007 |
| JP | 2008-193600 A | 8/2008 |
| JP | 2009-178813 A | 8/2009 |
| JP | 2009-218933 A | 9/2009 |
| JP | 2009-269110 A | 11/2009 |
| JP | 2011-011318 A | 1/2011 |
| JP | 2011-197990 A | 10/2011 |
| JP | 2012-018523 A | 1/2012 |
| JP | 2012-156925 A | 8/2012 |
| JP | 2012-242281 A | 12/2012 |
| JP | 2013-084111 A | 5/2013 |
| JP | 2013-098821 A | 5/2013 |
| JP | 2013-172382 A | 9/2013 |
| JP | 2014-502072 A | 1/2014 |
| JP | 2014-144516 A | 8/2014 |
| JP | 2014-151377 A | 8/2014 |

OTHER PUBLICATIONS

Extended European Search Report for Patent Application No. EP15185232.4 dated May 17, 2016 (8 pages).

* cited by examiner

| LAN PORT NAME | VIRTUAL LAN PORT NAME | IP ADDRESS OF VIRTUAL LAN PORT | IDENTIFICATION INFORMATION OF BRIDGE TARGET LAN PORT |
|---|---|---|---|
| FIRST COMMUNICATION CONNECTING UNIT | vbr0 | aaa. bbb. ccc. ddd | eth0 |
| SECOND COMMUNICATION CONNECTING UNIT | | | eth1 |

FIG. 3

| LAN PORT NAME | VIRTUAL LAN PORT NAME | IP ADDRESS OF VIRTUAL LAN PORT | IDENTIFICATION INFORMATION OF BRIDGE TARGET LAN PORT |
|---|---|---|---|
| FIRST COMMUNICATION CONNECTING UNIT | vbr0 | aaa. bbb. ccc. ddd | eth0 |
| SECOND COMMUNICATION CONNECTING UNIT | | | eth1 |
| THIRD COMMUNICATION CONNECTING UNIT | | | eth2 |

FIG.12

| IMAGE-PICKUP-APPARATUS CONNECTING UNIT (PORT) | IP ADDRESS | NETWORK SEGMENT |
|---|---|---|
| FIRST IMAGE-PICKUP-APPARATUS CONNECTING UNIT | 192. 168. 11. 1 | 192. 168. 11. xxx |
| SECOND IMAGE-PICKUP-APPARATUS CONNECTING UNIT | 192. 168. 12. 1 | 192. 168. 12. xxx |
| THIRD IMAGE-PICKUP-APPARATUS CONNECTING UNIT | 192. 168. 13. 1 | 192. 168. 13. xxx |
| FOURTH IMAGE-PICKUP-APPARATUS CONNECTING UNIT | 192. 168. 14. 1 | 192. 168. 14. xxx |

| IMAGE-PICKUP-APPARATUS CONNECTING UNIT (PORT) | IP ADDRESSES OF IMAGE PICKUP APPARATUSES CONNECTED TO PORTS |
|---|---|
| FIRST IMAGE-PICKUP-APPARATUS CONNECTING UNIT | 192. 168. 11. 11 |
| SECOND IMAGE-PICKUP-APPARATUS CONNECTING UNIT | 192. 168. 12. 11 |
| THIRD IMAGE-PICKUP-APPARATUS CONNECTING UNIT | 192. 168. 13. 11 |
| FOURTH IMAGE-PICKUP-APPARATUS CONNECTING UNIT | 192. 168. 14. 11 |

FIG.18

|  | NETWORK SEGMENT | IP ADDRESS |
|---|---|---|
| n-TH IMAGE PICKUP APPARATUS CONNECTING UNIT | 192. 168. 11. xxx | 192. 168. 11. 1 |
| IMAGE PICKUP APPARATUS 10-n | 192. 168. 50. xxx | 192. 168. 50. 1 | g101 g102

|  | NETWORK SEGMENT | IP ADDRESS |
|---|---|---|
| n-TH IMAGE PICKUP APPARATUS CONNECTING UNIT | 192. 168. 11. xxx | 192. 168. 11. 1 |
| IMAGE PICKUP APPARATUS 10-n | 192. 168. 50. xxx | 192. 168. 11. 11 | g111 g112

FIG.20

|  | NETWORK SEGMENT | IP ADDRESS |
|---|---|---|
| n-TH IMAGE PICKUP APPARATUS CONNECTING UNIT | 192. 168. 11. xxx | 192. 168. 11. 1 |
| IMAGE PICKUP APPARATUS 10-n | 192. 168. 11. xxx | 192. 168. 11. 1 | g121 g122

|  | NETWORK SEGMENT | IP ADDRESS |
|---|---|---|
| n-TH IMAGE PICKUP APPARATUS CONNECTING UNIT | 192. 168. 11. xxx | 192. 168. 11. 1 |
| IMAGE PICKUP APPARATUS 10-n | 192. 168. 11. xxx | 192. 168. 11. 11 | g131 g132

FIG.21

| | NETWORK SEGMENT | IP ADDRESS | g141 |
|---|---|---|---|
| EXTERNAL COMMUNICATION UNIT | 192.168.11.xxx | 192.168.11.3 | |
| n-TH IMAGE PICKUP APPARATUS CONNECTING UNIT | 192.168.11.xxx | 192.168.11.1 | g142 |
| IMAGE PICKUP APPARATUS 10-n | 192.168.11.xxx | 192.168.11.11 | g143 |

| | NETWORK SEGMENT | IP ADDRESS | g151 |
|---|---|---|---|
| EXTERNAL COMMUNICATION UNIT | 192.168.11.xxx | 192.168.11.3 | |
| n-TH IMAGE PICKUP APPARATUS CONNECTING UNIT | 192.168.21.xxx | 192.168.21.1 | g152 |
| IMAGE PICKUP APPARATUS 10-n | 192.168.21.xxx | 192.168.21.11 | g153 |

FIG.23

| SUCCESS OR FAILURE OF STATE INFORMATION SAVING | WARNING LED | STATE LED |
|---|---|---|
| SUCCESS | EXTINGUISHING | HIGH-SPEED BLINKING (300 ms INTERVAL) |
| FAILURE | HIGH-SPEED BLINKING (300 ms INTERVAL) | EXTINGUISHING |

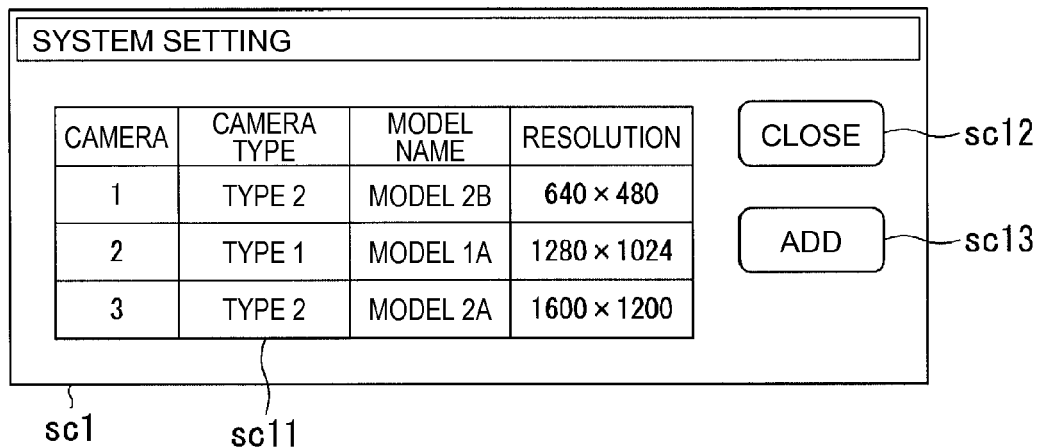
FIG.31
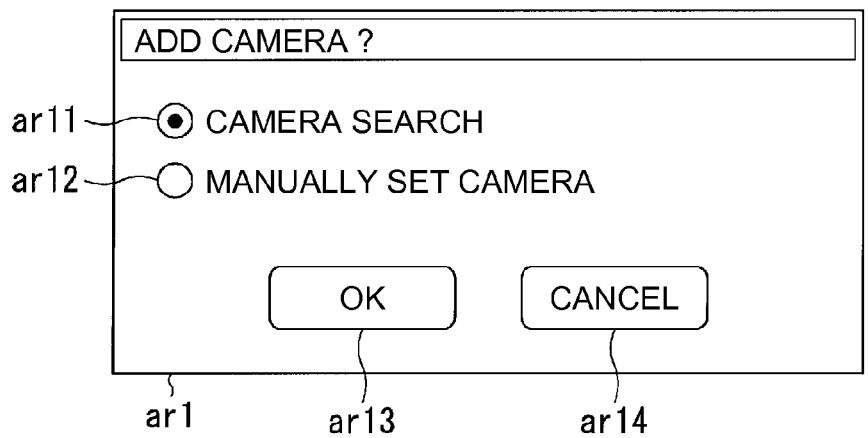
FIG.32
| | COMMAND | TRANSMISSION DESTINATION ADDRESS | PARAMETERS | PORT NUMBER |
|---|---|---|---|---|
| sp1 | RequestInfo | 255.255.255.255 | – | 50004 |
FIG.33

| INFORMATION TYPE | CONTENT | |
|---|---|---|
| IMAGE PROCESSING APPARATUS MODEL NAME | XX | ⎫ |
| IMAGE PROCESSING APPARATUS SERIAL NUMBER | 00001111 | ⎬ sp20 |
| IMAGE PROCESSING APPARATUS MAC ADDRESS | 00:11:22:AA:BB:CC | ⎭ |
| IMAGE PROCESSING APPARATUS IP ADDRESS | 192.168.0.3 | ⎫ |
| IMAGE PROCESSING APPARATUS NETWORK MASK | 255.255.255.0 | ⎬ sp21 |
| IMAGE PROCESSING APPARATUS GATEWAY | 192.168.0.1 | ⎭ |
| CAMERA 1 MODEL NAME | AAA-BBB | ⎫ |
| CAMERA 1 ID | 222333 | ⎬ sp22-1 |
| CAMERA 1 RESOLUTION | 640 × 480 | ⎭ |
| ... | ... | |
| ... | ... | |
| CAMERA 6 MODEL NAME | CCC-DDD | ⎫ |
| CAMERA 6 ID | 444555 | ⎬ sp22-6 |
| CAMERA 6 RESOLUTION | 1280 × 1024 | ⎭ | sp2

FIG.36

| SUB-NETWORK OF INFORMATION PROCESSING APPARATUS | RETURN DESTINATION |
|---|---|
| = SUB-NETWORK OF IMAGE PROCESSING APPARATUS | 192.168.0.2 |
| ≠ SUB-NETWORK OF IMAGE PROCESSING APPARATUS | 255.255.255.255 |

FIG.37

| COMMAND | TRANSMISSION DESTINATION | PARAMETERS | PORT NUMBER |
|---|---|---|---|
| SetIPAddress | 255. 255. 255. 255 | MAC ADDRESS, IP ADDRESS, NETWORK MASK, GATEWAY | 50004 | cp1

| MAC ADDRESS INCLUDED IN CHANGE PACKET | PROCESSING OF IMAGE PROCESSING APPARATUS |
|---|---|
| = MAC ADDRESS OF IMAGE PROCESSING APPARATUS | CHANGE NETWORK SETTING ACCORDING TO INFORMATION CONCERNING IP ADDRESS, NETWORK MASK, AND GATEWAY INCLUDED IN CHANGE PACKET |
| ≠ MAC ADDRESS OF IMAGE PROCESSING APPARATUS | — |

FIG.41

| TYPE | CONTENT |
|---|---|
| MAC ADDRESS OF IMAGE PROCESSING APPARATUS | 00 : 11 : 22 : AA : BB : CC |
| IP ADDRESS CHANGE PROCESSING RESULT | 0 (SUCCESS) ERROR NUMBER (FAILURE) | cp2

FIG.42

| EVENT INDICATING ABNORMALITY OF IMAGE PROCESSING APPARATUS 40E | CONDITION UNDER WHICH EVENT INDICATING ABNORMALITY OF IMAGE PROCESSING APPARATUS 40E IS DETECTED | STATE OF IMAGE PROCESSING APPARATUS 40E DETERMINED BY STATE DETERMINING UNIT 373 | STATE CODE |
|---|---|---|---|
| NO ABNORMALITY | EVENT INDICATING ABNORMALITY OF IMAGE PROCESSING APPARATUS 40E IS NOT DETECTED YET | NORMAL STATE | 0 |
| CPU FAN ABNORMALITY | NOT 0 RPM AND LESS THAN 1000 RPM | WARNING OCCURRENCE STATE | 551 |
| CPU FAN ABNORMALITY | 0 RPM | ERROR OCCURRENCE STATE | 552 |
| SYSTEM FAN ABNORMALITY | NOT 0 RPM AND LESS THAN 1000 RPM | WARNING OCCURRENCE STATE | 553 |
| SYSTEM FAN ABNORMALITY | 0 RPM | ERROR OCCURRENCE STATE | 554 |
| CPU TEMPERATURE ABNORMALITY | 90°C OR MORE AND LESS THAN 100°C | WARNING OCCURRENCE STATE | 555 |
| CPU TEMPERATURE ABNORMALITY | 100°C OR MORE | ERROR OCCURRENCE STATE | 556 |
| BUILT-IN BATTERY VOLTAGE DROP | 2.0 V OR MORE AND LESS THAN 2.5 V | WARNING OCCURRENCE STATE | 557 |
| BUILT-IN BATTERY VOLTAGE DROP | LESS THAN 2.0 V | ERROR OCCURRENCE STATE | 558 |
| CONTROL UNIT / COMMAND ABNORMALITY | ERROR CODE INCLUDES COMMAND ERROR | ERROR OCCURRENCE STATE | 559 |
| MEMORY FREE SPACE DECREASE | LESS THAN 10 MByte | WARNING OCCURRENCE STATE | 560 |
| DISK FREE SPACE DECREASE | LESS THAN 10 MByte | WARNING OCCURRENCE STATE | 561 |
| STATE INFORMATION ACQUISITION ERROR | ERROR CODE INCLUDES CODE INDICATING DETECTION INFORMATION ACQUISITION ERROR | WARNING OCCURRENCE STATE | 562 |
| LED CONTROL ERROR | ERROR CODE INCLUDES CODE INDICATING CONTROL ERROR OF OUTPUT UNIT 75 | WARNING OCCURRENCE STATE | 563 |
| ... | ... | ... | ... |

FIG.49

| STATE OF IMAGE PROCESSING APPARATUS 40 | LIGHTING STATE OF OUTPUT UNIT 75 |
|---|---|
| WARNING OCCURRENCE STATE | RED LED IS BLINKING |
| ERROR OCCURRENCE STATE | RED LED IS LIGHTING |

FIG.50

| STATE CODE DEFINED ON INSIDE OF CONTROL APPARATUS 30 | MESSAGE RECORDED IN ERROR HISTORY TOGETHER WITH WARNING CODE |
|---|---|
| 551 | CPU fan is not running. |
| 552 | CPU fan is not running. |
| 553 | System fan is not running. |
| 554 | System fan is not running. |
| 555 | CPU temperature is too high. |
| 556 | CPU temperature is too high. |
| 557 | Battery is low. |
| 558 | Battery is low. |
| 559 | Cannot process commands. Reboot required. |
| 560 | Free memory is low. |
| 561 | Disk space is low. |
| 562 | Cannot read sensor status. |
| 563 | Cannot control LEDs. |
| ... | ... |

FIG.51

```
Rescue mode:

1 Reset xxx settings.
 2 Reset yyy settings.
 3 Update Normal OS
 9 Exec shell

0 Exit Rescue mode. (reboot)

Input number :3
```

FIG.59

```
* Update yyy System.
WARNING: All data will be delete.
Does it update ? (yes/no):
```

FIG.60

```
Update done
Hit Enter, return to menu:
```

FIG.61

IMAGE PROCESSING APPARATUS AND ROBOT SYSTEM

BACKGROUND

1. Technical Field

The present invention relates to an image processing apparatus and a robot system.

2. Related Art

There has been proposed a robot system that calculates a position and a posture of a work target using an image picked up by an image pickup apparatus and causes a robot to perform predetermined work on the basis of the calculated position and the calculated posture.

The robot system includes the image pickup apparatus, an image processing apparatus, a robot controller, and a robot. The image processing apparatus calculates a center position of the work target using the image picked up by the image pickup apparatus. The robot controller recognizes the position and the posture of the work target on the basis of information indicating the center position of the work target calculated by the image processing apparatus. The robot controller generates, on the basis of recognized positions and postures of work targets, a command for positioning a hand mechanism of the robot in an appropriate position and an appropriate posture and controls a gripping action of the robot. In the robot system, the image pickup apparatus is connected to the image processing apparatus, the robot controller is connected to the image processing apparatus, and the robot is connected to the robot controller (see, for example, JP-A-2012-242281 (Patent Literature 1)).

The image processing apparatus in the past includes one LAN (Local Area Network) port for connection to the robot controller. The image processing apparatus and the robot controller are connected to each other, for example, by a LAN cable.

In recent years, in a site where a robot is used, for example, there is a demand that a plurality of image processing apparatuses are to one robot controller to control the robot. Alternatively, in a site where a robot is used, there is a demand that a plurality of robot controllers share and use one image processing apparatus.

In the robot system in the past, the image pickup apparatus is connected to the image processing apparatus via a USB (Universal Serial Bus) or a LAN cable.

When the image pickup apparatus and the image processing apparatus are connected via the LAN cable, a user performs setting concerning a network for the image pickup apparatus. Alternatively, in the robot system in the past, a DHCP (Dynamic Host Configuration Protocol) server is provided in the network to automatically perform setting concerning a network for the image pickup apparatus.

There has been researched and developed a method of calculating a position and a posture of a work target on the basis of a picked-up image picked up by an image pickup unit and causing a robot to perform predetermined work on the basis of the calculated position and the calculated posture.

Concerning the method, there is known an image processing apparatus connected to a control apparatus that controls the robot and separate from a control apparatus that performs image processing such as calculation of the position and the posture of the work target based on the picked-up image (see http://robots.epson.com/admin/uploads/product_catalog/files/EPSON_CV1_Vision %20 (RevB).pdf "Vision Guidance for Epson Robots" (Non Patent Literature 1).

There has been proposed a robot system that controls the operation of a robot using a picked-up image picked up by an image pickup apparatus. For example, JP-A-2009-218933 (Patent Literature 2) describes a robot system in which an image processing apparatus, a control apparatus, and a PC (Personal Computer) for control are connected via a network. The image processing apparatus processes a picked-up image around the robot acquired from the image pickup apparatus. The PC for control functions as a development environment for displaying the picked-up image acquired from the image pickup apparatus and creating a computer program for image processing.

For the image processing apparatus to apply the image processing to the picked-up image, physical connection of the image pickup apparatus to the image processing apparatus is not enough. Setting for the PC for control is necessary. For example, a user checks beforehand an IP (Internet Protocol) address of the image processing apparatus and performs operation for manually inputting the checked IP address to the PC for control. A plurality of image pickup apparatuses are connectable to the image processing apparatus. There is an image processing apparatus capable of using a plurality of models of image pickup apparatuses. Concerning such an image processing apparatus, a user checks in advance a camera of which model is connected to the image processing apparatus and performs operation for setting, in the PC for control, which of a plurality of cameras is selected. When the PC for control and the image processing apparatus are connected to the same network segment, the PC for control and the image processing apparatus can transmit and receive data immediately after the completion of the setting operation. Therefore, it is possible to use the image pickup apparatus for which the setting is completed. The network segment is a logically divided range of a LAN and is sometimes called sub-network.

However, the image processing apparatus in the past includes only one LAN port. Therefore, for example, when a plurality of image processing apparatuses are connected to one robot controller to control the robot, it is necessary to connect the robot controller and the plurality of image processing apparatuses via a network switch (a switching hub) and perform communication among the apparatuses.

In the image processing apparatus in the past, the DHCP server is necessary to automatically performing the setting concerning a network for the image pickup apparatus. When the DHCP server is not used, the user needs to manually perform the setting concerning a network for the image pickup apparatus. In this case, the user needs to grasp setting contents of the image processing apparatus and the robot controller, which are connected to the robot system, concerning a network.

In the image processing apparatus in the past, when a serious error that cannot be solved by operation by a person not having special knowledge (e.g., the user) occurs, for example, some trouble is caused by executed processing and, thereafter, the image processing apparatus cannot be started, the user has to disassemble the image processing apparatus to remove a storing unit included in the image processing apparatus, send the storing unit to a person having special knowledge (e.g., a technician of a manufacturer), and ask the person to repair the storing unit. Therefore, the user consumes time and labor.

When the PC for control and the image processing apparatus are connected to different network segments, the PC for control and the image processing apparatus cannot transmit and receive data even if the setting operation is completed. Therefore, the image pickup apparatus for which the setting is completed cannot be used unless the setting of the network segment of one of the PC for control and the image processing apparatus is adjusted to the setting of the network segment of the other. In particular, in a large robot system including a plurality of image processing apparatuses, the user consumes a lot of labor for the setting operation.

Even in a state in which some abnormality occurs in hardware of the image processing apparatus, the control apparatus in the past cannot detect the state.

The image processing apparatus in the past does not take into account that a person not having special knowledge (e.g., a user) is caused to update an OS (Operating System). When the user has to update the OS, the user has to disassemble the image processing apparatus, send the image processing apparatus to a person having special knowledge (e.g., a technician of a manufacture), and ask the person to update the OS. Therefore, the user needs to consume time and labor.

SUMMARY

An advantage of some aspects of the invention is to solve at least a part of the problems described above, and the invention can be implemented as the following aspects or application examples.

An aspect of the invention is directed to an image processing apparatus including: a first connecting unit connected to an image pickup apparatus; a plurality of second connecting units connected to one or more control apparatuses that control a robot or one or more other image processing apparatuses; and a processing unit configured to process picked-up images picked up by the image pickup apparatuses.

With this configuration, the image processing apparatus includes the plurality of second connecting units. Consequently, in the image processing apparatus, it is possible to connect external apparatuses respectively to the plurality of second connecting units without using a network switch.

In the aspect of the invention, each of the plurality of second connecting units may include a different identifier. The processing unit may be capable of setting the same IP address in at least two or more of the plurality of second connecting units.

With this configuration, the image processing apparatus can set the same IP address in at least two or more second connecting units. Consequently, in the image processing apparatus, a user can easily perform connection to a plurality of external apparatuses without being aware of the IP address.

In the aspect of the invention, the processing unit may be capable of setting an IP address different from the same IP address in the second connecting units other than the second connecting units in which the same IP address is set.

With this configuration, the image processing apparatus can set another IP address in the second connecting units other than the second connecting units in which the same IP address is set. Consequently, the image processing apparatus can perform connection to a plurality of external apparatuses using different IP addresses without using a network switch.

In the aspect of the invention, the same IP address may be information input from an information processing apparatus that outputs a control program for the robot to the control apparatus or information input from a setting screen on which an IP address can be set.

With the configuration, the same IP address can be input to the image processing apparatus from the control apparatus or the setting screen on which an IP address can be set. Consequently, in the image processing apparatus, the IP address can be set from both of the control apparatus and the setting screen.

Another aspect of the invention is directed to a robot system including: the image processing apparatus according to the aspect of the invention; a robot main body unit; the image pickup apparatus; and the control apparatus configured to perform driving control of the robot main body unit.

With this configuration, in the robot system, the image processing apparatus includes the plurality of second connecting units. Consequently, in the robot system, it is possible to connect the image processing apparatus and a plurality of external apparatuses and control the robot system without using a network switch.

According to the aspects of the invention, the image processing apparatus includes the plurality of second connecting units. Therefore, it is possible to connect an external apparatus to the image processing apparatus without using a network switch. As a result, according to the aspects of the invention, the image processing apparatus can communicate with a plurality of external apparatuses without using a network switch.

Still another aspect of the invention is directed to an image processing apparatus including: a connecting unit connected to an image pickup apparatus; a determining unit configured to determine, using setting information of the image pickup apparatus and setting information of the connecting unit, whether it is necessary to change the setting information of the image pickup apparatus; and a changing unit configured to change the setting information of the image pickup apparatus when the determining unit determines that it is necessary to change the setting information of the image pickup apparatus.

With this configuration, the image processing apparatus can change the setting information of the image pickup apparatus when it is determined using the setting information of the image pickup apparatus and the setting information of the connecting unit that it is necessary to change the setting information of the image pickup apparatus. Consequently, in the image processing apparatus, it is possible to automatically perform setting concerning a network for the image pickup apparatus.

In the aspect of the invention, the setting information of the image pickup apparatus and the setting information of the connecting unit may be respectively setting information concerning a network and include network segment information indicating a network segment and an IP address including the network segment information. The determining unit may compare the network segment information included in the setting information of the image pickup apparatus and the network segment information included in the setting information of the connecting unit, when these kinds of network segment information coincide with each other, compare the IP address included in the setting information of the image pickup apparatus and the IP address included in the setting information of the connecting unit, and, when the IP addresses coincide with each other, determine that it is necessary to change a fourth segment of the IP address included in the setting information of the image pickup apparatus.

With this configuration, the image processing apparatus can change the fourth segment of the IP address of the image pickup apparatus when the network segment of the connecting unit and the network segment of the image pickup apparatus coincide with each other and the IP address of the connecting unit and the IP address of the image pickup apparatus coincide with each other. Consequently, in the image processing apparatus, even when the IP addresses of the connecting unit and the image pickup apparatus coincide with each other, it is possible to automatically perform setting concerning a network for the image pickup apparatus.

In the aspect of the invention, when the network segment information included in the setting information of the image pickup apparatus and the network segment information included in the setting information of the connecting unit do not coincide with each other, the determining unit may determine that it is necessary to change the network segment information of the IP addresses to coincide and change the fourth segment to be different in the setting information of the image pickup apparatus and the setting information of the connecting unit.

With this configuration, when the network segment of the connecting unit and the network segment of the image pickup apparatus do not coincide with each other, the image processing apparatus can change the IP address of the image pickup apparatus to coincide with the network segment of the connecting unit and change the fourth segment to be different. Consequently, in the image processing apparatus, even when the network segments of the connecting unit and the image pickup apparatus coincide with each other, it is possible to automatically perform setting concerning a network for the image pickup apparatus.

In the aspect of the invention, the image processing apparatus may further include an external-communication connecting unit connected to a control apparatus that controls a robot or other image processing apparatuses. The determining unit may determine, using setting information of the external-communication connecting unit, whether it is necessary to change the setting information of the image pickup apparatus.

With this configuration, the image processing apparatus can change the setting information of the image pickup apparatus when it is determined using the setting information of the external-communication connecting unit and the setting information of the connecting unit that it is necessary to change the setting information of the image pickup apparatus. Consequently, in the image processing apparatus, it is possible to automatically perform setting concerning a network for the image pickup apparatus.

In the aspect of the invention, the setting information of the image pickup apparatus and the setting information of the external-communication connecting unit may be respectively setting information concerning a network and include network segment information indicating a network segment and an IP address including the network segment information. The determining unit may compare the network segment information included in the setting information of the image pickup apparatus and the network segment information included in the setting information of the external-communication connecting unit and, when these kinds of network segment information coincide with each other, determine that it is necessary to change the network segment information of the IP address included in the setting information of the image pickup apparatus.

With this configuration, the image processing apparatus can change the network segment of the image pickup apparatus when the network segment of the connecting unit and the network segment of the external-communication connecting unit coincide with each other. Consequently, in the image processing apparatus, when the IP address of the external-communication connecting unit is changed, even when the network segments of the external-communication connecting unit and the image pickup apparatus coincide with each other, it is possible to automatically perform setting concerning a network for the image pickup apparatus.

Yet another aspect of the invention is directed to a robot system including: the image processing apparatus according to the aspect of the invention; a robot main body unit; and a robot control apparatus configured to perform communication using the setting information changed by the changing unit of the image processing apparatus and perform driving control of the robot main body unit.

With this configuration, in the robot system, the image processing apparatus can change the setting information of the image pickup apparatus when it is determined using the setting information of the image pickup apparatus and the setting information of the connecting unit that it is necessary to change the setting information of the image pickup apparatus. Consequently, the robot system can control the robot using a result of the image processing apparatus automatically performing setting concerning a network for the image pickup apparatus.

According to the aspects of the invention, the image processing apparatus determines, using the network setting information of the image pickup apparatus and the network setting information of the connecting unit to which the image pickup apparatus is connected or the external-communication connecting unit to which another apparatus is connected, whether it is necessary to change the network setting information of the image pickup apparatus and, when it is necessary to change the network setting information of the image pickup apparatus, changes the network setting information of the image pickup apparatus. Therefore, it is possible to automatically perform setting concerning a network for the image pickup apparatus.

Still yet another aspect of the invention is directed to an image processing apparatus including: a processing unit configured to process a picked-up image picked up by an image pickup apparatus; and a storing unit configured to store data concerning the image processing apparatus. When a reset signal is input, the processing unit deletes at least a part of the data stored in the storing unit.

With this configuration, when the reset signal is input, the image processing apparatus deletes at least a part of the data concerning the image processing apparatus stored in the storing unit. Consequently, it is possible to easily restore the image processing apparatus to a predetermined state.

In the aspect of the invention, in the image processing apparatus, the data stored in the storing unit may include history information of hardware monitoring of the image processing apparatus, information related to processing performed by the processing unit, and a system log.

With this configuration, when the reset signal is input, the image processing apparatus deletes at least a part of the history information of the hardware monitoring of the image processing apparatus stored in the storing unit, the information related to the processing performed by the processing unit, and the system log. Consequently, it is possible to restore the image processing apparatus to a predetermined state based on a part or all of the history information of the hardware monitoring of the image processing apparatus, the information related to the processing performed by the processing unit, and the system log.

In the aspect of the invention, in the image processing apparatus, when a data saving signal is input, the processing unit may store, in an external storage device, at least a part of the data stored in the storing unit.

With this configuration, when the data saving signal is input, the image processing apparatus stores, in the external storage device, at least apart of the data concerning the image processing apparatus stored in the storing unit. Consequently, the image processing apparatus can cause the user to check a state of the image processing apparatus on the basis of the data concerning the image processing apparatus stored in the external storage device.

In the aspect of the invention, the image processing apparatus may further include: an input receiving unit including one or more buttons; and an input determining unit configured to input the data saving signal to the processing unit when a predetermined button among the one or more buttons included in the input receiving unit is released before a predetermined time elapses from depression of the predetermined button and input the reset signal to the processing unit when the predetermined button is released after the predetermined time or more elapses from the depression of the predetermined button.

With this configuration, the image processing apparatus inputs the data saving signal to the processing unit when the predetermined button among the one or more buttons included in the input receiving unit is released before the predetermined time elapses from the depression of the predetermined button and inputs the reset signal to the processing unit when the predetermined button is released after the predetermined time or more elapses from the depression of the predetermined button. Consequently, the image processing apparatus can select, according to time from the depression until the release of the predetermined button, processing performed by the processing unit.

In the aspect of the invention, the image processing apparatus may further include an output control unit configured to change an output state of the output unit for time determined in advance when the predetermined button continues to be depressed for the predetermined time or more.

With this configuration, the image processing apparatus changes the output state of the output unit for the time determined in advance when the predetermined button continues to be pressed for the predetermined time or more. Consequently, the image processing apparatus can notify the user whether the predetermined button continues to be depressed for the predetermined time or more.

In the aspect of the invention, in the image processing apparatus, the output control unit may change the output state of the output unit according to success or failure of the deletion of at least part of the data by the processing unit or the storage in the external storage device of at least part of the data by the processing unit.

With this configuration, the image processing apparatus changes the output state of the output unit according to success or failure of the deletion of at least part of the data concerning the image processing apparatus by the processing unit or the storage in the external storage device of at least part of the data concerning the image processing apparatus by the processing unit. Consequently, the image processing apparatus can notify the user of success or failure of the deletion of at least part of the data concerning the image processing apparatus by the processing unit or the storage in the external storage device of at least a part of the data concerning the image processing apparatus by the processing unit.

In the aspect of the invention, in the image processing apparatus, when the external storage device is not connected to the image processing apparatus, the processing unit may not store at least a part of the data in the external storage device even when the data saving signal is input.

With this configuration, when the external storage device is not connected to the image processing apparatus, the image processing apparatus does not store at least a part of the data in the external storage device even when the data saving signal is input. Consequently, the image processing apparatus can suppress continuation of processing of the processing unit by wrong operation in a state in which preparation for storing at least a part of the data concerning the image processing apparatus in the external storage device is not completed.

Further another aspect of the invention is directed to a robot system including: a robot configured to perform predetermined work; an image pickup apparatus configured to pick up an image of a range related to the predetermined work; an image processing apparatus configured to process the picked-up image picked up by the image pickup apparatus; and a control apparatus configured to control the robot on the basis of a result of the processing by the image processing apparatus. The image processing apparatus includes: a processing unit configured to process the picked-up image picked up by the image pickup apparatus; and a storing unit configured to store data concerning the image processing apparatus. When a reset signal is input, the processing unit deletes at least a part of the data stored in the storing unit.

With this configuration, when the reset signal is input, the robot system deletes at least a part of the data stored in the storing unit. Consequently, it is possible to easily restore the robot system to a predetermined state.

As explained above, when the reset signal is input, the image processing apparatus and the robot system delete at least a part of the data stored in the storing unit. Consequently, it is possible to easily restore the image processing apparatus and the robot system to predetermined states.

Still further another aspect of the invention is directed to an image processing system including: an image processing apparatus configured to process a picked-up image; and a display apparatus configured to display a screen on which setting of the image processing apparatus is performed. The image processing apparatus searches for image pickup apparatuses communicable with the image processing apparatus. The display apparatus displays information concerning the communicable image pickup apparatuses found by the image processing apparatus.

With this configuration, the information concerning the communicable image pickup apparatuses found by the image processing apparatus is displayed. Therefore, it is possible to select, from the displayed image pickup apparatuses, an image pickup apparatus that the user desires to use. Therefore, in the setting of the image processing apparatus, it is unnecessary to check in advance information concerning an image pickup apparatus that the user desires to use.

In the aspect of the invention, in the image processing system, the display apparatus may broadcast, to a network connected to the display apparatus, a search packet including a command for inquiring about information set in an apparatus at a transmission destination. When receiving the search packet from the display apparatus, the image processing apparatus may broadcast, to the network, a search response packet including information concerning the found communicable image pickup apparatuses.

With this configuration, even when the image processing apparatus to which the image pickup apparatus is connected belongs to a sub-network different from a sub-network to which the display apparatus belongs, the display apparatus can acquire information concerning the image pickup apparatus connected to the image processing apparatus. Therefore, the user can obtain a clue for using, without omission, the image pickup apparatuses found by the image processing apparatus connected to the network.

In the aspect of the invention, in the image processing system, a network address of the image processing apparatus may be included in the search response packet. The display apparatus may display the network address in association with information concerning the image pickup apparatus.

With this configuration, a network address of an image processing address related to the image pickup apparatus that the user desires to use is displayed. Therefore, in setting for using the image pickup apparatus, the user can recognize the network address of the image processing apparatus.

In the aspect of the invention, in the image processing system, the display apparatus may acquire a new network address and broadcast a change packet including the acquired network address to a network connected to the display apparatus. The image processing apparatus may change a network address set in the image processing apparatus to the network address included in the change packet received from the display apparatus.

With this configuration, even when the image processing apparatus connected to the image pickup apparatus belongs to a sub-network different from a sub-network to which the display apparatus belongs, it is possible to change the network address set in the image processing apparatus to the network address acquired by the display apparatus. For example, by setting, in the display apparatus, an unused network address belonging to a sub-network same as the sub-network to which the display apparatus belongs, it is possible to cause the image processing apparatus to belong to the sub-network same as the sub-network to which the display apparatus belongs.

In the aspect of the invention, in the image processing system, the display apparatus may belong to the sub-network same as the sub-network to which the display apparatus belongs and decide the unused network address as a network address of the image processing apparatus.

With this configuration, the user can cause the image processing apparatus to belong to the sub-network same as the sub-network to which the display apparatus belongs without checking a network address in advance and inputting the network address. Consequently, it is possible to perform communication between the display apparatus and the image pickup apparatus connected to the image processing apparatus.

In the aspect of the invention, in the image processing system, when the image processing apparatus belongs to the sub-network same as the sub-network to which the display apparatus belongs, the image processing apparatus may include the network address of the display apparatus in the search response packet as a network address of a transmission destination.

With this configuration, by broadcasting the search response packet, it is possible to avoid useless communication in which the search response packet is transmitted to apparatuses other than the display apparatus.

Yet further another aspect of the invention is directed to a robot system including: a robot; an image processing apparatus configured to process a picked-up image; a display apparatus configured to display a screen for performing setting of the image processing apparatus; and a control apparatus configured to control the operation of the robot on the basis of a processing result of the image processing apparatus. The image processing apparatus searches for image pickup apparatuses communicable with the image processing apparatus. The display apparatus displays information concerning the communicable image pickup apparatuses found by the image processing apparatus.

With this configuration, the information concerning the communicable image pickup apparatuses found by the image processing apparatus is displayed. Therefore, the user can select, from the displayed image pickup apparatuses, an image pickup apparatus that the user desires to use. Therefore, in setting of the image pickup apparatus, it is unnecessary to check in advance information concerning the image pickup apparatus that the user desires to use.

According to the aspects of the invention explained above, it is possible to easily perform setting concerning the image pickup apparatus.

Still yet further another aspect of the invention is directed to a controller including: a receiving unit configured to receive, from an image processing apparatus that processes a picked-up image, state information of the image processing apparatus; a determining unit configured to determine a state of the image processing apparatus on the basis of the state information; and a generating unit configured to generate, on the basis of a determination result by the determining unit, a transmission signal to be transmitted to an external apparatus.

With this configuration, the controller receives, from the image processing apparatus that processes a picked-up image, state information of the image processing apparatus, determines a state of the image processing apparatus on the basis of the state information, and generates, on the basis of a result of the determination, a transmission signal to be transmitted to the external apparatus. Consequently, it is possible to notify a state of the image processing apparatus.

In the aspect of the invention, in the controller, the determining unit may determine, as the state of the image processing apparatus, any one of a normal state, a state in which the image processing apparatus is highly likely be out of order, and a state in which the image processing apparatus is highly likely to fail in future.

With this configuration, the controller determines, as the state of the image processing apparatus, any one of the normal state, the state in which the image processing apparatus is highly likely to be out of order, and the state in which the image processing apparatus is highly likely to fail in future. Consequently, the controller makes it possible to notify, as the state of the image processing apparatus, any one of the normal state, the state in which the image processing apparatus is highly likely to be out of order, and the state in which the image processing apparatus is highly likely to fail in future.

In the aspect of the invention, in the controller, the state information may include information indicating one or more physical quantities indicating states of hardware included in the image processing apparatus. The controller may further include an event detecting unit configured to detect, on the basis of the one or more physical quantities, an event including abnormality of the image processing apparatus. The determining unit may determine the state of the image processing apparatus on the basis of the event detected by the state detecting unit.

With this configuration, the controller detects an event indicating abnormality of the image processing apparatus on the basis of the one or more physical quantities indicating the states of hardware included in the image processing apparatus and determine the state of the image processing apparatus on the basis of the detected event. Consequently, the controller can generate a transmission signal based on the state of the image processing apparatus determined on the basis of the event indicating the abnormality of the image processing apparatus.

In the aspect of the invention, in the controller, the state information may include an error code related to control of the image processing apparatus. The event detecting unit may detect an event indicating abnormality of the image processing apparatus on the basis of an error code related to control of the image processing apparatus.

With this configuration, the controller detects an event indicating abnormality of the image processing apparatus on the basis of the error code related to the control of the image processing apparatus. Consequently, the controller can generate, as the state of the image processing apparatus, a transmission signal based on the state of the image processing apparatus determined on the basis of the event indicating the abnormality of the image processing apparatus detected on the basis of the error code related to the control of the image processing apparatus.

In the aspect of the invention, in the controller, the determining unit may associate information for identifying the state of the image processing apparatus with the state of image processing apparatus determined on the basis of the event. The generating unit may include, in the transmission signal, the information for identifying the state of the image processing apparatus associated by the determining unit.

With this configuration, the controller associates the information for identifying the state of the image processing apparatus with the state of image processing apparatus determined on the basis of the event indicating the abnormality of the image processing apparatus and includes, in the transmission signal, the associated information for identifying the state of the image processing apparatus. Consequently, the controller can generate the transmission signal including the information for identifying the state of the image processing apparatus.

In the aspect of the invention, the controller may further include a communication control unit configured to cause a communication unit to transmit the transmission signal generated by the generating unit to the external apparatus.

With this configuration, the controller causes the communication unit to transmit the transmission signal generated on the basis of the determination result of the state of the image processing apparatus to the external apparatus. Consequently, the controller can notify a user of the external apparatus of the state of the image processing apparatus.

In the aspect of the invention, in the controller, the communication control unit may cause, according to a request from the external apparatus, the communication unit to transmit the information indicating the one or more physical quantities to the external apparatus.

With this configuration, the controller causes, according to a request from the external apparatus, the communication unit to transmit the information indicating one or more physical quantities indicating the states of the hardware included in the image processing apparatus to the external apparatus. Consequently, the controller can notify the user of the one or more physical quantities indicating the states of the hardware included in the image processing apparatus.

In the aspect of the invention, in the controller, the communication control unit may cause, according to the determination result by the determining unit, the communication unit to transmit information for requesting a change of the output state of the output unit included in the image processing apparatus to the image processing apparatus.

With this configuration, the controller causes, according to the determination result of the state of the image processing apparatus, the communication unit to transmit the information for requesting a change of the output state of the output unit included in the image processing apparatus to the image processing apparatus. Consequently, the controller can cause, with the image processing apparatus, the user to check the state of the image processing apparatus.

A further aspect of the invention is directed to an information processing apparatus that displays a GUI (Graphical User Interface) for displaying the one or more physical quantities acquired from the controller.

With this configuration, the information processing apparatus displays the GUI for displaying the one or more physical quantities indicating the states of the hardware included in the image processing apparatus acquired from the controller. Consequently, the information processing apparatus can facilitate management of the state of the image processing apparatus by providing the user with the GUI for displaying the one or more physical quantities indicating the states of the hardware included in the image processing apparatus.

A still further aspect of the invention is directed to a robot system including: a robot configured to perform predetermined work; an image pickup apparatus configured to pick up an image of a range related to the predetermined work; an image processing apparatus configured to process the picked-up image picked up by the image pickup apparatus; and a controller configured to control the robot on the basis of a result of the processing by the image processing apparatus. The controller includes: a receiving unit configured to receive state information of the image processing apparatus from the image processing apparatus; a determining unit configured to determine a state of the image processing apparatus on the basis of the state information; and a generating unit configured to generate, on the basis of a determination result by the determining unit, a transmission signal to be transmitted to the external apparatus.

With this configuration, the processing system receives the state information of the image processing apparatus from the image processing apparatus, determines the state of the image processing apparatus on the basis of the state information, and generates, on the basis of a result of the determination, the transmission signal to be transmitted to the external apparatus. Consequently, the robot system enables notification of the state of the image processing apparatus.

As explained above, the controller and the robot system receive the state information of the image processing apparatus from the image processing apparatus, determine the state of the image processing apparatus on the basis of the state information, and generate, on the basis of a result of the determination, the transmission signal to be transmitted to the external apparatus. Consequently, the controller and the robot system enable notification of the state of the image processing apparatus.

The information processing apparatus displays a GUI for displaying the one or more physical quantities indicating the states of the hardware included in the image processing apparatus acquired from the controller. Consequently, the information processing apparatus can facilitate management of the state of the image processing apparatus by providing a user with the GUI for displaying the one or more physical quantities indicating the states of the hardware included in the image processing apparatus.

A yet further aspect of the invention is directed to an image processing apparatus including: a storing unit configured to store a first computer program and a second computer program; and a processing unit configured to process a picked-up image picked up by an image pickup apparatus. The first computer program is updated using first data stored in an external storage device. The second computer program is updated using second data stored in an information processing apparatus.

With this configuration, in the image processing apparatus, the first computer program is updated using the first data stored in the external storage device and the second computer program is updated using the second data stored in the information processing apparatus. Consequently, the image processing apparatus can easily update the computer programs.

In the aspect of the invention, in the image processing apparatus, the image processing apparatus may include a first updating unit configured to operate according to execution of another program different from the first computer program and the second computer program, read the first data stored in the external storage device, and update the first computer program on the basis of the read first data.

With this configuration, the image processing apparatus operates according to the execution of another program different from the first computer program and the second computer program, reads the first data stored in the external storage device, and updates the first computer program on the basis of the read first data. Consequently, the image processing apparatus can update the first computer program without executing the first computer program. Therefore, it is possible to suppress the first computer program from being damaged by the update of the first computer program during the execution of the first computer program.

In the aspect of the invention, in the image processing apparatus, the first updating unit may back up the first computer program before the update in a storage region of the external storage device and thereafter update the first computer program on the basis of the first data.

With this configuration, the image processing apparatus backs up the first computer program before the update in the storage region of the external storage device and thereafter updates the first computer program on the basis of the first data. Consequently, the image processing apparatus does not need to secure a storage region for backup in a storage region of the image processing apparatus. It is possible to reduce costs related to securing of the storage region of the image processing apparatus.

In the aspect of the invention, the image processing apparatus may further include: a checking unit configured to determine whether the first data is stored in the external storage device; and a display control unit configured to cause the display unit to display information indicating an error when the checking unit determines that the first data is not stored in the external storage device. When the checking unit determines that the first data is stored in the external storage device, the first updating unit may update the first computer program on the basis of the first data.

With this configuration, the image processing apparatus determines whether the first data is stored in the external storage device, when it is determined that the first data is not stored in the external storage device, causes the display unit to display the information indicating an error, and, when it is determined that the first data is stored in the external storage device, updates the first computer program on the basis of the first data. Consequently, the image processing apparatus can suppress the update of the first computer program from being continued by mistake in a state in which the first data is not stored in the external storage device.

In the aspect of the invention, the image processing apparatus may further includes: a communication unit configured to communicate with an external apparatus; and a second updating unit configured to operate according to the execution of the first computer program, acquire the second data from the information processing apparatus via the communication unit, and update the second computer program on the basis of the acquired second data.

With this configuration, the image processing apparatus operates according to the execution of the first computer program, acquires the second data from the information processing apparatus via the communication unit, and updates the second computer program on the basis of the acquired second data. Consequently, the image processing apparatus can easily update the second computer program with the information processing apparatus.

A still yet further aspect of the invention is directed to a robot system including: a robot configured to perform predetermined work; an image pickup apparatus configured to pick up an image of a range related to the predetermined work; an image processing apparatus configured to process the picked-up image picked up by the image pickup apparatus; and a control apparatus configured to control the robot on the basis of a result of the processing by the image processing apparatus. The image processing apparatus includes: a storing unit configured to store a first computer program and a second computer program; and a processing unit configured to process a picked-up image picked up by the image pickup apparatus. The first computer program is updated using first data stored in an external storage device. The second computer program is updated using second data stored in an information processing apparatus.

With this configuration, in the robot system, the first computer program is updated using the first data stored in the external storage device and the second computer program is updated using the second data stored in the information processing apparatus. Consequently, the image processing apparatus can easily update the computer programs.

As explained above, in the image processing apparatus and the robot system, the first computer program is updated using the first data stored in the external storage device and the second computer program is updated using the second data stored in the information processing apparatus. Consequently, the image processing apparatus and the robot system can easily update the computer programs.

BRIEF DESCRIPTION OF THE DRAWINGS

The invention will be described with reference to the accompanying drawings, wherein like numbers reference like elements.

FIG. 3 is a diagram for explaining an example of LAN port names, a virtual LAN port name, an IP address of the virtual LAN port, and identification information of a bridge target LAN port of a first communication connecting unit and a second communication connecting unit according to the first embodiment.

FIG. 12 is a diagram for explaining an example of LAN port names, a virtual LAN port name, an IP address of the virtual LAN port, and identification information of a bridge target LAN port of a first communication connecting unit to a third communication connecting unit according to the second embodiment.

FIG. 18 is a diagram for explaining an example of IP addresses allocated in advance to image pickup apparatuses connected to the first image-pickup-apparatus connecting unit to the fourth image-pickup-apparatus connecting unit and stored in the storing unit according to the third embodiment.

FIG. 20 is a diagram for explaining an example of network segments and IP addresses in which the network segments are different in an n-th image-pickup-apparatus connecting unit and an image pickup apparatus according to the third embodiment.

FIG. 21 is a diagram for explaining an example of network segments and IP addresses in which the network segments and the IP addresses are the same in the n-th image-pickup-apparatus connecting unit and the image pickup apparatus according to the third embodiment.

FIG. 23 is a diagram for explaining an example of network segments and IP addresses in which the network segments are the same in an external-communication connecting unit, an n-th image-pickup-apparatus connecting unit, and an image pickup apparatus according to the fourth embodiment.

FIG. 31 is a diagram showing an example of a system display screen.

FIG. 32 is a diagram showing an example of an addition method inquiry screen.

FIG. 33 is a diagram showing an example of a search packet.

FIG. 36 is a diagram showing an example of a search response packet.

FIG. 37 is a diagram for explaining a return destination of the search response packet.

FIG. 41 is a diagram for explaining determination of necessity of a network setting information change.

FIG. 42 is a diagram showing an example of a change response packet.

FIG. 49 is a diagram showing an example of a correspondence relation among an event indicating abnormality of the image processing apparatus, a condition under which the event indicating the abnormality of the image processing apparatus is detected, a state of the image processing apparatus, and a state code for identifying the state of the image processing apparatus.

FIG. 50 is a table showing an example of rules for a change of a lighting state of an output unit by an output control unit.

FIG. 51 is a table showing an example of a correspondence relation between a state code for identifying a state of the image processing apparatus determined by a state determining unit in step S330 and a message recorded in an error history together with the state code.

FIG. 59 is a diagram showing an example of a CUI for displaying a menu of the failure time start OS.

FIG. 60 is an example of a CUI for displaying a warning for an event that occurs when update of the normal time start OS is executed and checking whether the update of the normal time start OS is executed.

FIG. 61 is a diagram showing an example of a CUI for displaying information indicating success of the update of the normal time start OS.

DESCRIPTION OF EXEMPLARY
EMBODIMENTS

First Embodiment

An embodiment of the invention is explained below with reference to the drawings.

Figure 1:
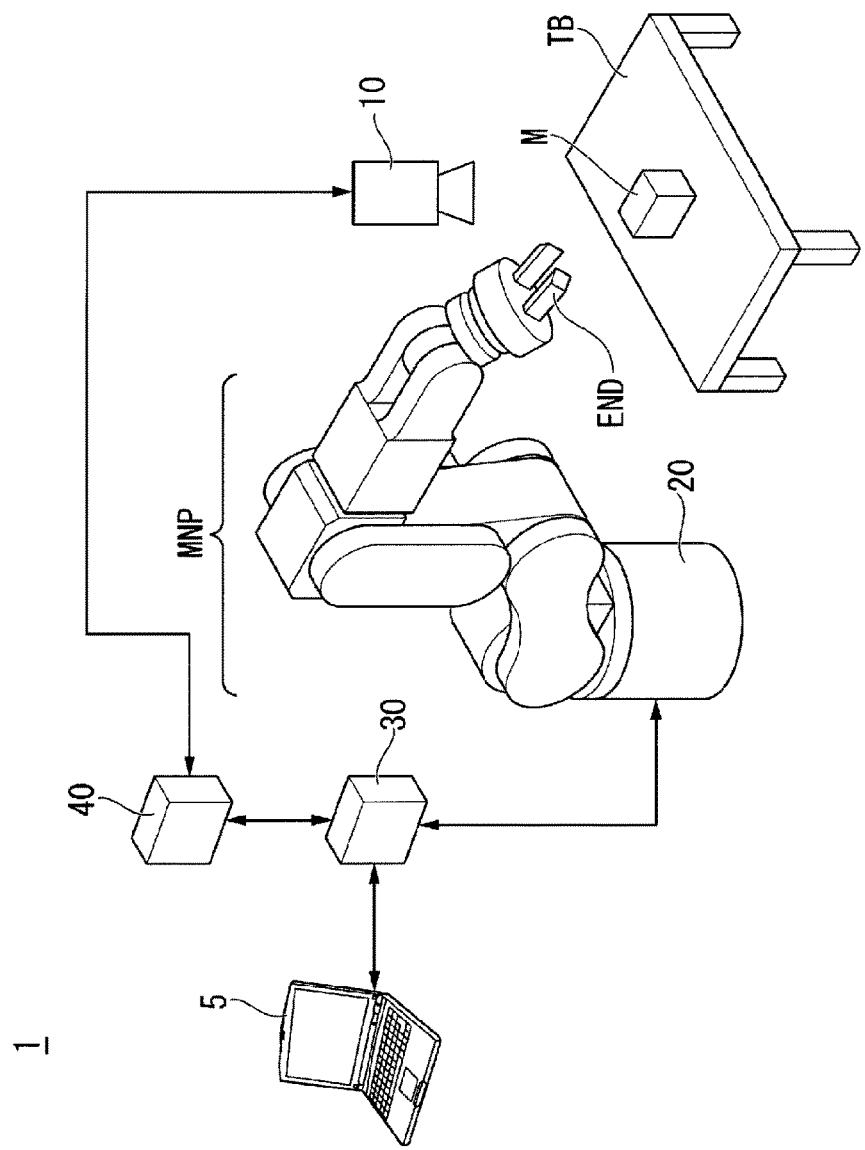
FIG. 1 is a configuration diagram showing an example of a robot system according to a first embodiment.

FIG. 1 is a configuration diagram showing an example of a robot system 1 according to this embodiment. The robot system 1 includes an information processing apparatus 5, an image pickup apparatus 10, a robot 20, a control apparatus 30, and an image processing apparatus 40.

The robot system 1 receives, with the information processing apparatus 5, operation from a user and causes the robot 20 to perform predetermined work on the basis of the received operation. The predetermined work indicates, for example, as shown in FIG. 1, work for rearranging a work target M, which is arranged on the upper surface of a workbench TB, in a predetermined position. However, the predetermined work may be other work. The workbench TB is a stand such as a table. However, instead of the stand, the workbench TB may be a floor surface, a wall surface, or the like as long as it is possible to arrange the work target M thereon.

The work target M is an object that can be gripped by the robot 20 and is, for example, a component of an industrial product such as a screw or a bolt, and may be another object. In FIG. 1, the work target M is shown as an object having a rectangular parallelepiped shape. The robot system 1 causes the robot 20 to perform the predetermined work on the basis of the position and the posture of the work target M calculated by the image processing apparatus 40.

The information processing apparatus 5 is, for example, a display equipped apparatus, in which an application program for controlling the robot 20 can be installed, such as a notebook PC, a desktop PC, a tablet PC, or a multi-function cellular phone terminal (a smart phone). The application program causes a display unit of the information processing apparatus 5 to display GUIs having various functions such as a GUI for creating a control program for controlling the robot 20 and a GUI for displaying a state of the robot system 1 (respective states of the control apparatus 30 and the image processing apparatus 40 (e.g., various statuses and presence or absence of a failure)). The GUIs are, for example, a GUI for creating an image processing program for processing an image picked up by the image pickup apparatus 10 and a control program for controlling the robot 20 and a GUI for displaying an operation state of the robot system 1.

The information processing apparatus 5 receives operation from the user via a GUI displayed on the display unit, creates the control program on the basis of the received operation, and compiles the control program. The control program is converted by the compile into an object code of a format executable by the control apparatus 30. The information processing apparatus 5 receives operation from the user via the GUI displayed on the display unit and outputs the object code to the control apparatus 30 on the basis of the received operation. For example, a plurality of processing procedures are described in the object code. In a processing procedure in which an apparatus that executes the object code performs communication with an external apparatus, for each kind of processing, information indicating a transmission source of a request for the processing (the apparatus that executes the object code) and information indicating a transmission destination (the external apparatus) are described in association with each other. The information indicating the transmission source is an IP address set in the information processing apparatus 5 or the control apparatus 30. The information indicating the transmission destination is an IP address set in the control apparatus 30 or a communication connecting unit 41 (FIG. 2) of the image processing apparatus 40.

The information processing apparatus 5 receives operation from the user via the GUI displayed on the display unit and performs setting concerning a network for the image processing apparatus 40. The setting concerning a network includes setting of an IP address of the image processing apparatus 40, an IP mask (also referred to as IP address sub-network mask), and an address of a gateway (hereinafter also referred to as gateway address) and setting for changing a bridge mode to an ON state. The bridge mode is a mode for setting the same LAN port name and the same LAN port IP address in a first communication connecting unit 411 (FIG. 2) and a second communication connecting unit 412 (FIG. 2) included in the image processing apparatus 40 and using the LAN port name and the LAN port IP address.

The information processing apparatus 5 is communicably connected to the control apparatus 30 by a cable. Wired communication via the cable is performed according to a standard such as Ethernet (registered trademark).

The image pickup apparatus 10 is, for example, a camera including a CCD (Charge Coupled Device), which is an image pickup device that converts condensed light into an electric signal, and a CMOS (Complementary Metal Oxide Semiconductor). The image pickup apparatus 10 is communicably connected to the image processing apparatus 40 by a cable. Wired communication via the cable is performed, for example, according to a standard such as the Ethernet (registered trademark) or the USB. Note that the image pickup apparatus 10 and the image processing apparatus 40 may be connected by radio communication performed according to a communication standard such as Wi-Fi (registered trademark). When the image processing apparatus 40 is connectable to a plurality of image pickup apparatuses 10, the plurality of image pickup apparatuses 10 may be provided.

The image pickup apparatus 10 is set in a position where an image of a range including the work target M can be picked up as a picked-up image. The image pickup apparatus 10 is configured to pick up a still image as the picked-up image. Instead, the image pickup apparatus 10 may be configured to pick up a moving image as the picked-up image.

The robot 20 acquires a control signal based on the position and the posture of the work target M from the control apparatus 30 and performs predetermined work on the basis of the acquired control signal. The robot 20 is a single-arm robot including an end effector END including nail sections capable of gripping an object (in this example, the work target M), a manipulator MNP, and a not-shown plurality of actuators. The single-arm robot indicates a robot including one arm configured by the end effector END and the manipulator MNP (or only the manipulator MNP).

Note that the robot 20 may be a SCARA robot (a horizontal articulated robot), a double-arm robot, or the like instead of the single-arm robot. The SCARA robot is a robot in which a manipulator moves only in the horizontal direction and only a slide shaft at the distal end of the manipulator moves up and down. The double-arm robot is a robot including two arms, each configured by the end effector END and the manipulator MNP (or only the manipulator MNP).

The arm of the robot 20 is a six-axis vertical articulated type in the example shown in FIG. 1. A support stand, the manipulator MNP, and the end effector END can perform actions of a six-axis degree of freedom according to an associated action by the actuators. Note that the arm of the robot 20 may act at five degrees of freedom (five axes) or less or may act at seven degrees of freedom (seven axes) or more. In the following explanation, the operation of the robot 20 performed by the arm including the end effector END and the manipulator MNP is explained.

The robot 20 is communicably connected to the control apparatus 30 by, for example, a cable. Wired communication via the cable is performed, for example, according to a standard such as the Ethernet (registered trademark) or the USB. Note that the robot 20 and the control apparatus 30 may be connected by radio communication performed according to a communication standard such as the Wi-Fi (registered trademark). Note that, as shown in FIG. 1, the robot 20 is connected to the control apparatus 30 set on the outside of the robot 20. However, instead, the control apparatus 30 may be incorporated in the robot 20.

The control apparatus 30 acquires an object code from the information processing apparatus 5 and controls, on the basis of the acquired object code, the robot 20 to perform the predetermined work. More specifically, in this example, the control apparatus 30 outputs, on the basis of the object code, to the image processing apparatus 40, a request for acquiring a picked-up image of the range including the work target M picked up by the image pickup apparatus 10 and performing, on the basis of the acquired picked-up image, image processing for calculating a position and a posture of the work target M. Note that the request output to the image processing apparatus 40 by the control apparatus 30 includes, as information indicating a transmission destination, information indicating setting concerning a network for the communication connecting unit 41 (FIG. 2) of the image processing apparatus 40.

The control apparatus 30 is communicably connected to the image processing apparatus 40 by a LAN cable. Wired communication via the LAN cable is performed, for example, according to a standard such as the Ethernet (registered trademark). The control apparatus 30 outputs, to the information processing apparatus 5, the information indicating the setting concerning a network for the communication connecting unit 41 (FIG. 2) output from the image processing apparatus 40 during the start of the image processing apparatus 40. The control apparatus 30 shares the information with the information processing apparatus 5.

After the image processing is finished by the image processing apparatus 40, the control apparatus 30 acquires information indicating the position and the posture of the work target M from the image processing apparatus 40. The control apparatus 30 generates a control signal based on the acquired information concerning the position and the posture of the work target M and outputs the generated control signal to the robot 20 to control the robot 20 to perform the predetermined work.

The image processing apparatus 40 acquires, according to the request from the control apparatus 30 based on the object code, a picked-up image of the range including the work target M from the image pickup apparatus 10. After acquiring the picked-up image from the image pickup apparatus 10, the image processing apparatus 40 performs, on the basis of the acquired picked-up image, image processing for calculating a position and a posture of the work target M. The image processing apparatus 40 outputs information indicating the position and the posture of the work target M obtained as a result of the image processing to the control apparatus 30 via the LAN cable.

Figure 2:
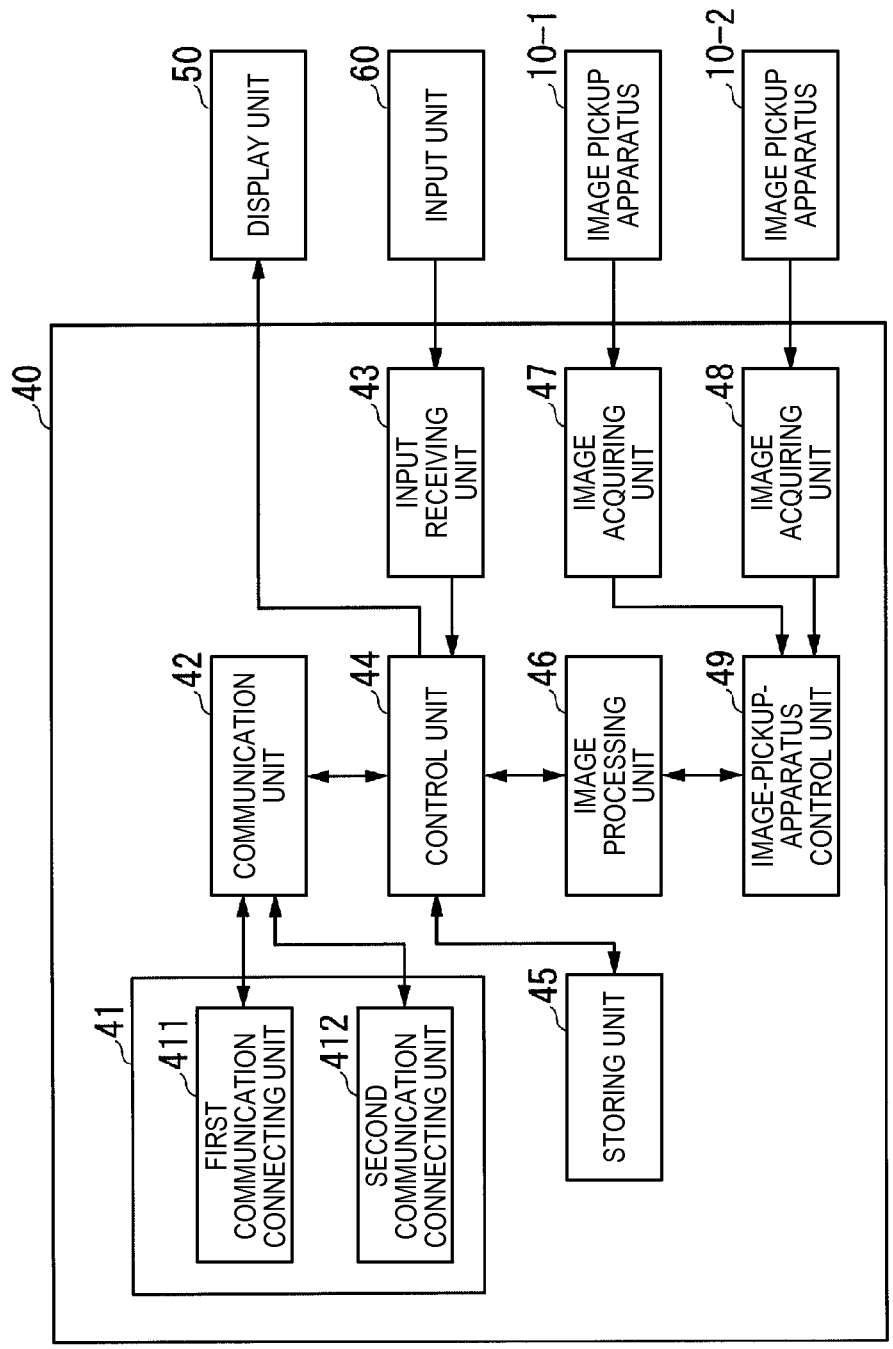
FIG. 2 is a schematic block diagram showing the configuration of an image processing apparatus according to the first embodiment.

The image processing apparatus 40 performs the setting concerning a network for the communication connecting unit 41 (FIG. 2) according to operation by the user from the information processing apparatus 5. Alternatively, the user operates an input unit 60 (FIG. 2) on the basis of an image displayed on a display unit 50 (FIG. 2) connected to the image processing apparatus 40, whereby the image processing apparatus 40 performs the setting concerning a network for the communication connecting unit 41 (FIG. 2).

When the image processing apparatus 40 is started, the image processing apparatus 40 outputs the information indicating the setting concerning a network for the communication connecting unit 41 (FIG. 2) to the control apparatus 30.

Note that, instead of being configured to perform these kinds of processing according to the request from the control apparatus 30 based on the object code, the image processing apparatus 40 may be configured to cyclically acquire a picked-up image from the image pickup apparatus 10 and, every time the picked-up image is acquired, apply the image processing to the acquired picked-up image to calculate a position and a posture of the work target M. In this case, the image processing apparatus 40 outputs the information indicating the position and the posture of the work target M calculated according to the request from the control apparatus 30 to the control apparatus 30.

The schematic configuration of the image processing apparatus 40 is explained.

FIG. 2 is a schematic block diagram showing the configuration of the image processing apparatus 40 according to this embodiment. As shown in FIG. 2, the image processing apparatus 40 includes a communication connecting unit 41 (a second connecting unit), a communication unit 42, an input receiving unit 43, a control unit 44 (a processing unit), a storing unit 45, an image processing unit 46 (a processing unit), an image acquiring unit 47 (a first connecting unit), an image acquiring unit 48 (a first connecting unit), and an image-pickup-apparatus control unit 49. The communication connecting unit 41 includes a first communication connecting unit 411 and a second communication connecting unit 412. The display unit 50 and the input unit 60 are connected to the image processing apparatus 40. Note that, in this embodiment, an n-th communication connecting unit 41n (n is an integer 1 or 2) is also referred to as port or LAN port.

The display unit 50 displays image information output by the control unit 44. The display unit 50 is, for example, a liquid crystal display device. The image information displayed on the display unit 50 is, for example, information concerning images such as images picked up by an image pickup apparatus 10-1 and an image pickup apparatus 10-2 and an image of a setting screen for a network (hereinafter referred to as network setting screen).

The input unit 60 is an input device operated by the user and is, for example, a mouse, a keyboard, a pointing device, or a touch panel provided on the display unit 50. The input unit 60 outputs operation information indicating a result of the operation to the image processing apparatus 40. For example, the user operates the input unit 60 to perform setting concerning a network on the setting screen for a network displayed on the display unit 50.

LAN cables are respectively connected to the first communication connecting unit 411 and the second communication connecting unit 412. The first communication connecting unit 411 and the second communication connecting unit 412 respectively include LAN connectors. When the communication connecting unit 41 is used in a bridge mode, as shown in FIG. 3, a common virtual LAN port name is initially set in the first communication connecting unit 411 and the second communication connecting unit 412. A common virtual LAN port address is set by the user.

FIG. 3 is a diagram for explaining an example of LAN port names, a virtual LAN port name, an IP address of the virtual LAN port, and identification information of a bridge target LAN port of the first communication connecting unit 411 and the second communication connecting unit 412 according to the this embodiment. When the communication connecting unit 41 is used in the bridge mode, the first communication connecting unit 411 and the second communication connecting unit 412 are recognized as having the same LAN port name and the same IP address from the information processing apparatus 5 and the control apparatus 30 connected to the image processing apparatus 40 via the network. That is, in the robot system 1, an object code can be used without being rewritten irrespective of whether the control apparatus 30 is connected to the first communication connecting unit 411 or the second communication connecting unit 412 by the LAN cable because the first communication connecting unit 411 and the second communication connecting unit 412 have the same IP address. In the example shown in FIG. 3, in the first communication connecting unit 411 and the second communication connecting unit 412, vbr0 is initially set as a common virtual LAN port name and aaa. bbb. ccc. ddd is set as an IP address of a common virtual LAN port by the user. In the example shown in FIG. 3, eth0 is initially set as individual identification information in the first communication connecting unit 411 and eth1 is initially set as individual identification information in the second communication connecting unit 412. The information shown in FIG. 3 is stored in the storing unit 45 or the communication unit 42. Note that the identification information is information invisible from an external apparatus. Information recognizable by the external apparatus is the virtual LAN port name vbr0 and the virtual LAN port IP address aaa. bbb. ccc. ddd.

The first communication connecting unit 411 or the second communication connecting unit 412 associates received identification information of the n-th communication connecting unit 41n (n is an integer 1 or 2) with a request received from the control apparatus 30 via the LAN cable and outputs the request to the communication unit 42. The first communication connecting unit 411 or the second communication connecting unit 412 transmits, according to the control by the communication unit 42, from the n-th communication connecting unit 41n that receives the request, an image processing result and image information output by the communication unit 42 to the control apparatus 30 via the LAN cable. Note that the request received by the n-th communication connecting unit 41n and the image processing result and the image information to be transmitted include information indicating a transmission destination of the image processing result and the image information and information indicating a transmission source of the image processing result and the image information.

When the image processing apparatus 40 is started, the communication unit 42 acquires and shares an IP address of an external apparatus connected via the LAN cable and the first communication connecting unit 411 and the second communication connecting unit 412. The external apparatus is any one of the information processing apparatus 5, the robot 20, the control apparatus 30, and the image processing apparatus 40.

When the image processing apparatus 40 is started, the communication unit 42 transmits information indicating setting concerning a network for the communication connecting unit 41 to the control apparatus 30 via the n-th communication connecting unit 41n, to which the control apparatus 30 is connected, and the LAN cable.

The communication unit 42 receives a request output by the communication connecting unit 41. The communication unit 42 extracts information indicating a transmission destination included in the received request and the identification information of the n-th communication connecting unit 41n that outputs the request. The communication unit 42 discriminates whether the extracted information indicating the transmission destination of the request and information indicating the IP address of the first communication connecting unit 411 and the second communication connecting unit 412 coincide with each other. When the kinds of information coincide with each other, the communication unit 42 outputs the received request and information indicating a transmission source to the control unit 44. When the kinds of information do not coincide with each other, the communication unit 42 outputs the received request to an m-th communication connecting unit 41m (m is other than n and is an integer or 1 or 2) different from the n-th communication connecting unit 41n that outputs the request. For example, when the kinds of information do not coincide with each other, the communication unit 42 outputs the request received from the first communication connecting unit 411 to the second communication connecting unit 412. That is, in the case of the bridge mode, the first communication connecting unit 411 and the second communication connecting unit 412 function as a network switch.

The communication unit 42 extracts identification information included in the image processing result and the image information output by the control unit 44. The communication unit 42 outputs the image processing result and the image information output by the control unit 44 to the n-th communication connecting unit 41n corresponding to the extracted identification information.

The input receiving unit 43 receives operation information from the input unit 60 and outputs the received operation information to the control unit 44.

The request output by the communication unit 42, the identification information of the n-th communication connecting unit 41n that receives the request, the operation information output by the input receiving unit 43, and the image processing result output by the image processing unit 46 are input to the control unit 44. When the request output by the communication unit 42 is a request for performing setting concerning a network, the control unit 44 causes the display unit 50 to display a network setting image. The control unit 44 performs the setting concerning a network according to an operation result of the user operating the input unit 60 according to the network setting image. The control unit 44 causes the storing unit 45 to store a set result and outputs the set result to the communication unit 42. Note that the setting concerning a network is explained below.

When the request output by the communication unit 42 is a request for image processing and an image pickup apparatus, the control unit 44 outputs the input request and the identification information to the image processing unit 46.

An image processing result to be input includes information indicating the position and the posture of the work target M. The control unit 44 associates the information indicating the transmission source of the request included in the request and the identification information with the image processing result output by the image processing unit 46 and outputs the image processing result to the communication unit 42. The control unit 44 associates the information indicating the transmission source of the request included in the request and the identification information with the image information output by the image processing unit 46 and outputs the image information to the communication unit 42.

In the storing unit 45, a control program for the control unit 44 to control the units of the image processing apparatus 40 is stored. In the storing unit 45, initial setting concerning the communication connecting unit 41 shown in FIG. 3 and setting concerning a network set by the user are associated with each other and stored in the storing unit 45.

The image processing unit 46 applies, according to the request input from the control unit 44, image processing to image information output by the image-pickup-apparatus control unit 49 using a well-known method and calculates a position and a posture of the work target M. The image processing unit 46 outputs information indicating the calculated position and the calculated posture of the work target M to the control unit 44. When a request to the image-pickup-apparatus control unit 49 is included in the information output by the control unit 44, the image processing unit 46 outputs the request to the image-pickup-apparatus control unit 49. The image processing unit 46 outputs the image information output by the image-pickup-apparatus control unit 49 to the control unit 44.

The image acquiring unit 47 acquires image information output by the image pickup apparatus 10-1 and outputs the acquired image information to the image-pickup-apparatus control unit 49. Note that the image information includes image pickup apparatus identification information indicating the image pickup apparatus 10-1.

The image acquiring unit 48 acquires image information output by the image pickup apparatus 10-2 and outputs the acquired image information to the image-pickup-apparatus control unit 49. Note that the image information includes image pickup apparatus identification information indicating the image pickup apparatus 10-2.

Note that, when the image information is an analog signal, the image acquiring unit 47 and the image acquiring unit 48 may convert the acquired analog signal into a digital signal and output the digital signal to the image-pickup-apparatus control unit 49.

The image-pickup-apparatus control unit 49 selects, according to the request input from the image processing unit 46, the image information input from the image acquiring unit 47 or the image acquiring unit 48 and outputs the selected image information to the image processing unit 46. Note that the image-pickup-apparatus control unit 49 may control, according to the request input from the image processing unit 46, sensitivity of image pickup of the image pickup apparatus 10-1 and the image pickup apparatus 10-2, selection of a region for the image pickup, an angle of view of the image pickup, and the like.

An example of a configuration in which a plurality of image processing apparatuses 40 set in the bridge mode are connected is explained.

Figure 4:
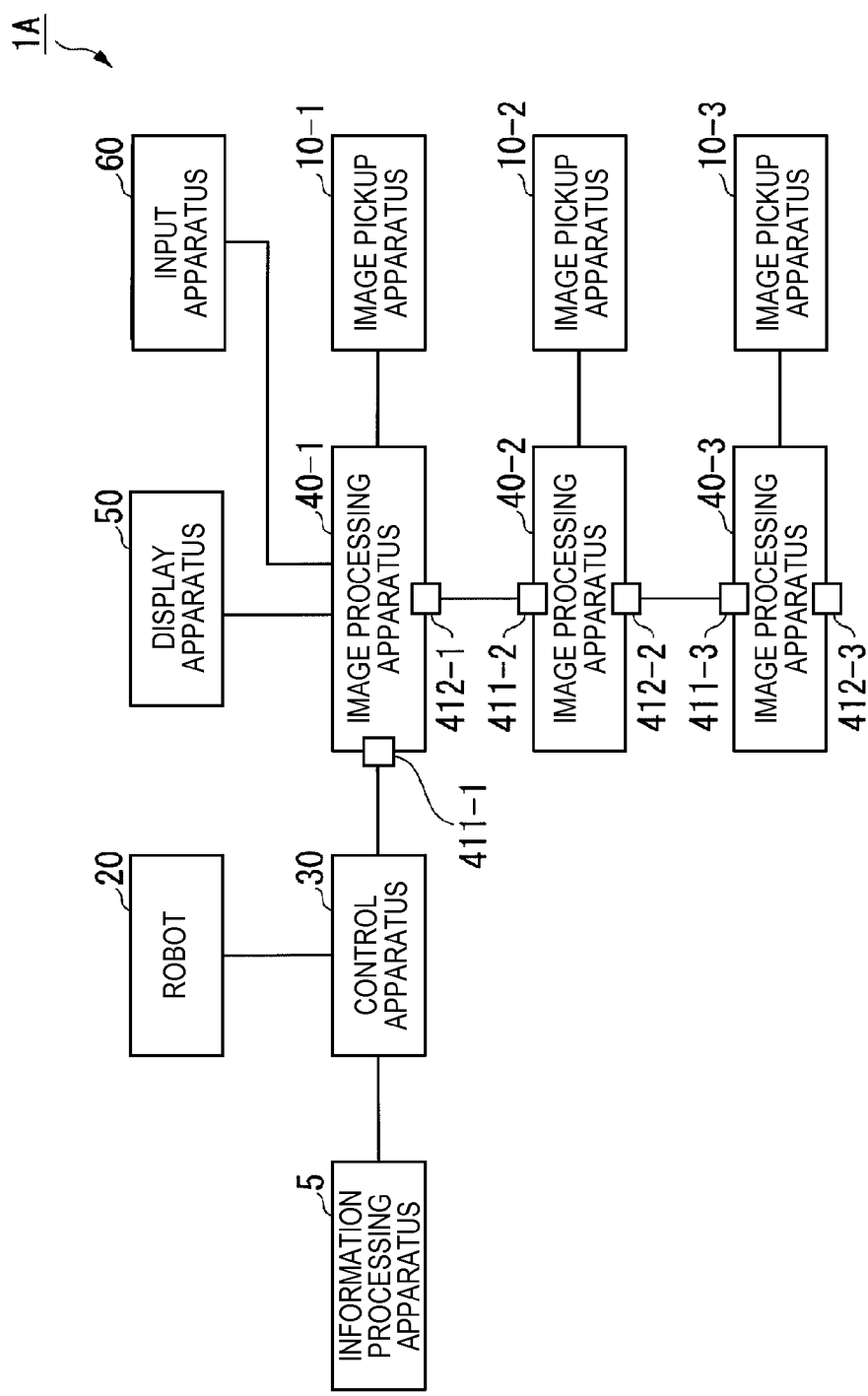
FIG. 4 is a diagram for explaining an example of the configuration of a robot system in which a plurality of image processing apparatuses are connected according to the first embodiment.

FIG. 4 is a diagram for explaining an example of the configuration of a robot system 1A in which the plurality of image processing apparatuses 40 are connected according to this embodiment. Note that, in FIG. 4, apparatuses having functions same as the functions in the robot system 1 shown in FIG. 1 are denoted by the same reference numerals and signs and explanation of the apparatuses is omitted.

In the robot system 1A shown in FIG. 4, the control apparatus 30 is connected to a first communication connecting unit 411-1 of an image processing apparatus 40-1 via a LAN cable. An image processing apparatus 40-2 is connected to a second communication connecting unit 412-1 via a LAN cable. The image pickup apparatus 10-1, the display unit 50, and the input unit 60 are connected to the image processing apparatus 40-1.

The image processing apparatus 40-1 is connected to a first communication connecting unit 411-2 of the image processing apparatus 40-2 via a LAN cable. An image processing apparatus 40-3 is connected to a second communication connecting unit 412-2 via a LAN cable. The image pickup apparatus 10-2 is connected to the image processing apparatus 40-2.

The image processing apparatus 40-2 is connected to a first communication connecting unit 411-3 of the image processing apparatus 40-3 via a LAN cable. Nothing is connected to a second communication connecting unit 412-3. An image pickup apparatus 10-3 is connected to the image processing apparatus 40-3.

In the example shown in FIG. 4, a common first virtual LAN port name (e.g., vbr0) and a common first IP address (e.g., aaa. bbb. ccc. dd0) are set in the first communication connecting unit 411-1 and the second communication connecting unit 412-1 of the image processing apparatus 40-1. A common second virtual LAN port name (e.g., vbr1) and a common second IP address (e.g., aaa. bbb. ccc. dd1) are set in the first communication connecting unit 411-2 and the second communication connecting unit 412-2 of the image processing apparatus 40-2. A common third virtual LAN port name (e.g., vbr2) and a common third IP address (e.g., aaa. bbb. ccc. dd2) are set in the first communication connecting unit 411-3 and the second communication connecting unit 412-3 of the image processing apparatus 40-3.

As shown in FIG. 4, the image processing apparatuses 40-1 to 40-3 are tied in a row (daisy-chain connected) without using a network switch.

In the robot system in the past, the image processing apparatus includes only one communication connecting unit. Therefore, when a plurality of image processing apparatuses are connected, it is necessary to provide a network switch and a power supply for the network switch between the control apparatus 30 and the plurality of image processing apparatuses. When the network switch is provided in this way, compared with FIG. 4, a degree of freedom of wiring in a site where the robot system 1 is used is limited. On the other hand, according to this embodiment, it is possible to directly connect the control apparatus 30 and the image processing apparatus 40-1 and directly connect the image processing apparatus 40-1 and the image processing apparatus 40-2 without using a network switch. Consequently, it is possible to improve a degree of freedom of wiring in a site where the robot system 1A is used.

Note that, in the example shown in FIG. 4, the image pickup apparatuses 10 among the image pickup apparatuses 10-1 to 10-3 are connected the corresponding image processing apparatuses 40-1 to 40-3 one by one. However, not only this, but two of the image pickup apparatuses 10 are connected to each of the image processing apparatuses 40-1 to 40-3 as shown in FIG. 2.

In the example shown in FIG. 4, the display unit 50 and the input unit 60 are connected only to the image processing apparatus 40-1. However, not only this, but the display unit 50 and the input unit 60 may be connected to the image processing apparatus 40-2 or the image processing apparatus 40-3. Alternatively, the display unit 50 and the input unit 60 may be connected to each of the image processing apparatuses 40-1 to 40-3.

In the example shown in FIG. 4, the robot system 1A includes the three image processing apparatuses 40. However, the number of image processing apparatuses 40 may be two or four or more.

Setting concerning a network for the image processing apparatus 40 is explained. The user performs the setting concerning a network by operating the information processing apparatus 5 and the image processing apparatus 40.

First, an example is explained in which the user performs the setting concerning a network by operating the information processing apparatus 5.

Figure 5:
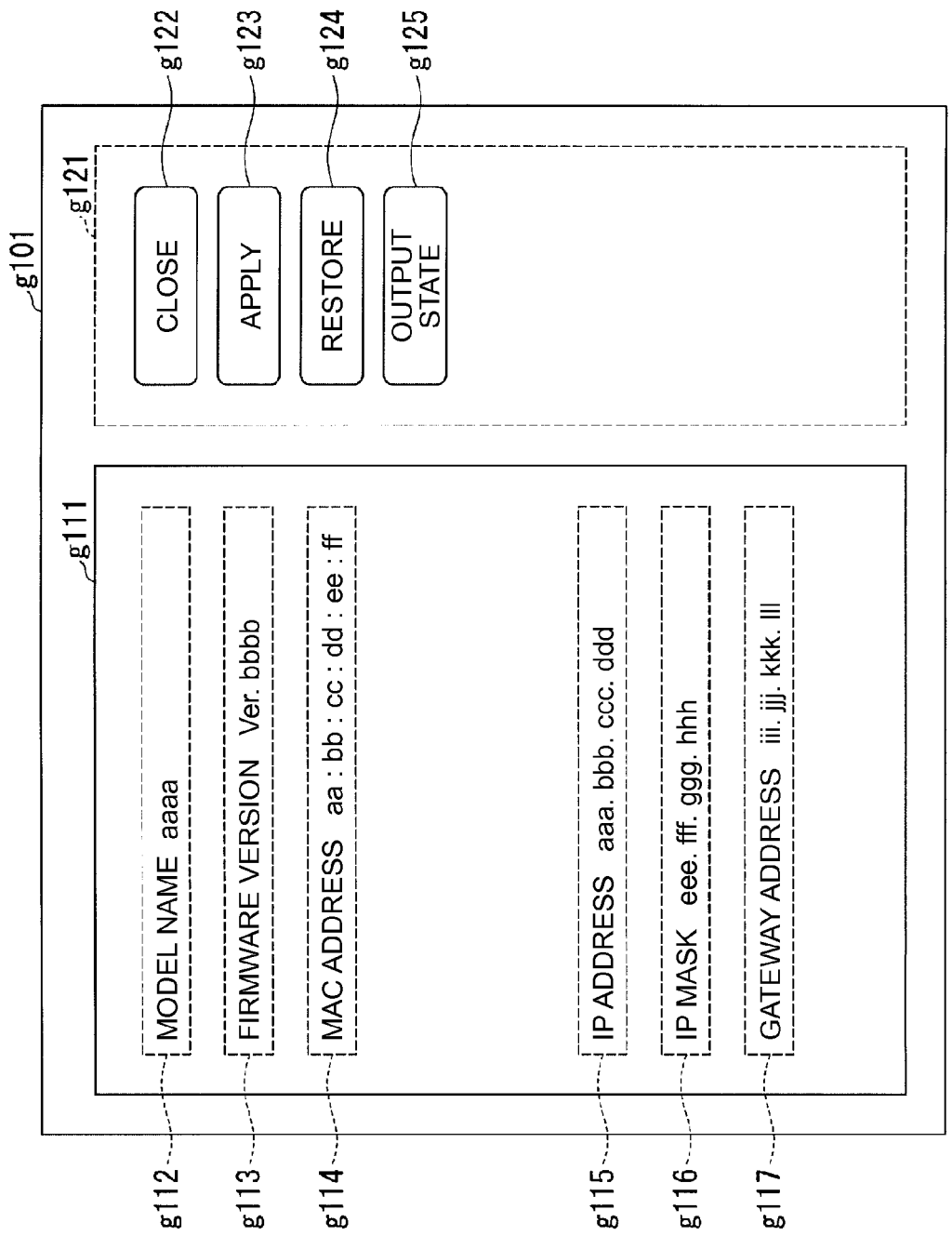
FIG. 5 is a diagram for explaining an example of a network setting image displayed on a display of an information processing apparatus according to the first embodiment.

FIG. 5 is a diagram for explaining an example of a network setting image g101 displayed on a display of the information processing apparatus 5 according to this embodiment. As shown in FIG. 5, the network setting image g101 includes an image gill including images of various kinds of information and images of addresses related to a network and an image g121 including images of buttons for performing various setting.

The image gill includes, as the images of the various kinds of information, an image g112 indicating a model name of the image processing apparatus 40, an image g113 indicating a firmware version of the image processing apparatus 40, and an image g114 indicating a MAC (Media Access Control) address of the image processing apparatus 40. The image g101 includes, as the images of the addresses related to a network, an image g115 indicating an IP address, an image g116 indicating an IP mask, and an image g117 indicating a gateway address set in common in the first communication connecting unit 411 and the second communication connecting unit 412 of the image processing apparatus 40. Note that the images g115 to g117 shown in FIG. 4 are images already input by the user. The image g121 includes an image g122 of a (Close) button for closing the network setting image g101 and an image g123 of an (Apply) button for applying input setting. The image g121 includes an image g124 of a (Restore) button for restoring input setting, and an image g125 of an (Export Status) button for outputting a set state.

Note that the network setting image g101 shown in FIG. 5 is an example. The arrangement of the images of the buttons and the like is not limited to the arrangement shown in the figure. Images of other buttons may be displayed.

First, the user operates, on a not-shown setting screen, a keyboard included in the information processing apparatus 5 or a mouse connected to the information processing apparatus 5 to select whether the first communication connecting unit 411 and the second communication connecting unit 412 of the image processing apparatus 40 are used in the bridge mode.

In the following explanation, the bridge mode is selected.

The user operates an input unit (e.g., the keyboard) included in the information processing apparatus 5 to input an IP address, an IP mask, and a gateway address. First, the user operates the keyboard to input the IP address. After the input, the user operates an input unit such as the mouse connected to the information processing apparatus 5 to select the image g123 of the Apply button. Subsequently, similarly, the user operates the keyboard to input the IP mask and operates the mouse to select the image g123 of the Apply button. Further, similarly, the user operates the keyboard to input the gateway address and operates the mouse to select the image g123 of the Apply button. When all the settings end, the user selects the image g125 of the button for outputting a state. Note that, when redoing the settings, the user operates the mouse to select the image g124 of the restore button. According to the operation explained above, the information processing apparatus 5 performs network setting of the image processing apparatus 40 via the control apparatus 30. Note that, after inputting all of the IP address, the IP mask, and the gateway address, the user may operate the input unit to select the image g123 of the Apply button to reflect an input result. Consequently, the user can apply, with simple operation, the same network setting to the first communication connecting unit 411 and the second communication connecting unit 412.

An example is explained in which the user operates the image processing apparatus 40 to perform setting concerning a network.

Figure 6:
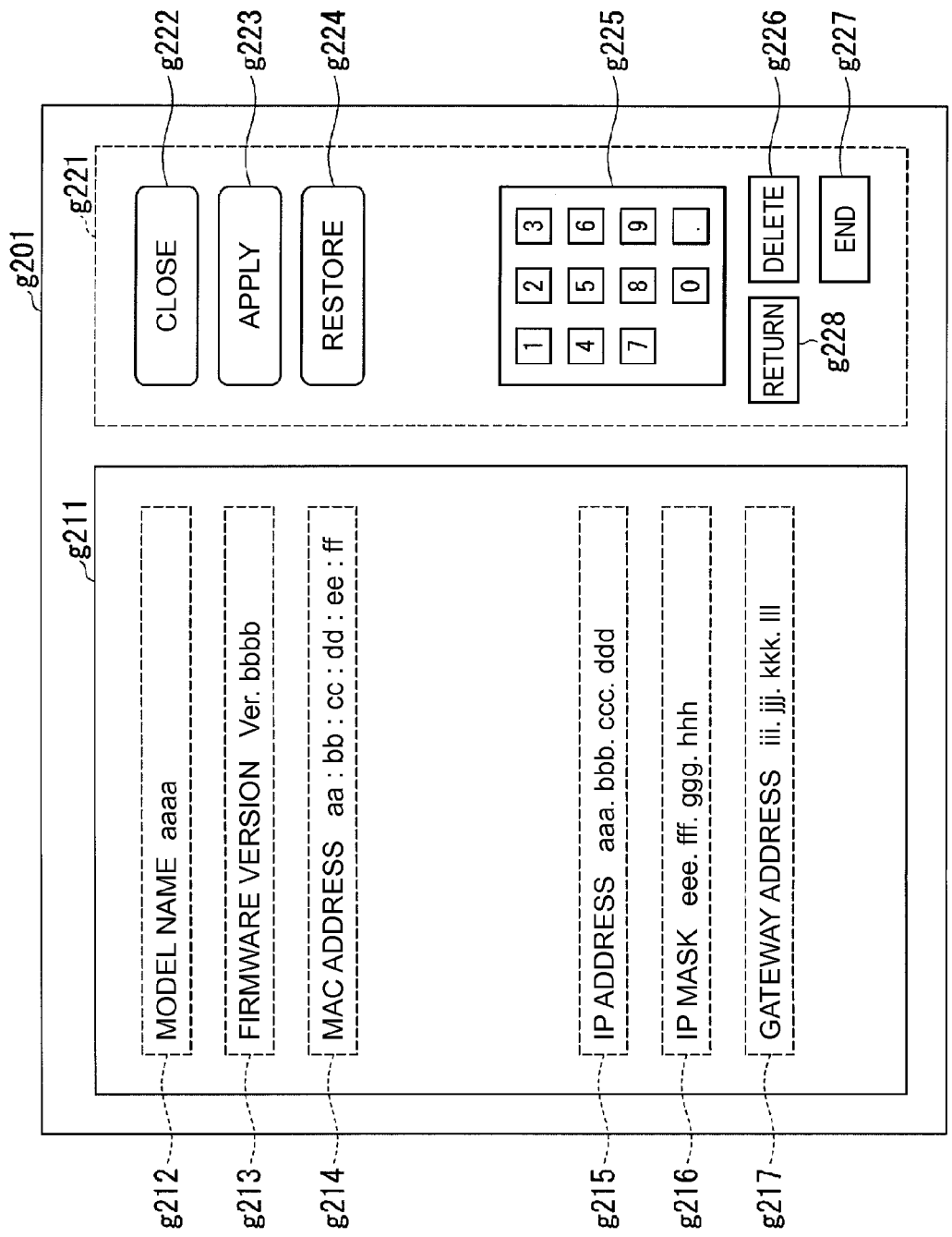
FIG. 6 is a diagram for explaining an example of a network setting screen displayed on a display unit connected to the image processing apparatus according to the first embodiment.

FIG. 6 is a diagram for explaining an example of a network setting image g201 displayed on the display unit 50 connected to the image processing apparatus 40 according to this embodiment. As shown in FIG. 6, the network setting image g201 includes an image g211 including images of various kinds of information and images of addresses related to a network and an image g221 including images of buttons for performing various settings.

The image g211 is the same as the image gill shown in FIG. 5.

The image g221 includes an image g222 of a (Close) button for closing the network setting image g201, an image g223 of an (Apply) button for applying input setting, and an image g224 of a (Restore) button for restoring the input setting. The image g221 includes an image g225 of a ten key button, an image g226 of a (Del) button for deleting an input value, an image g227 of an (End) button for ending an input, and an image g228 of a (Bksp) button for backspacing. Note that the image g225 of the ten key button includes buttons corresponding to numbers 0 to 9 and a button of a dot (.).

Note that the network setting image g201 shown in FIG. 6 is an example. The arrangement of the images of the buttons and the like is not limited to the arrangement shown in the figure. Images of other buttons may be displayed.

First, the user operates, on a not-shown setting screen, the input unit 60 to select whether the first communication connecting unit 411 and the second communication connecting unit 412 of the image processing apparatus 40 are used in the bridge mode. In the following explanation, the bridge mode is selected.

The user selects, with the input unit 60, the network setting image g201 displayed on the display unit 50 and performs network setting. For example, the user selects, with the mouse, the images of the buttons of the ten key button to input an IP address and selects, with the mouse, the image g223 of the Apply button to decide the input.

Subsequently, the user selects, with the mouse, the images of the buttons of the ten key button and the image g223 of the Apply button to perform network setting. Consequently, the user can easily apply the same network setting to the first communication connecting unit 411 and the second communication connecting unit 412.

Note that, as in the example shown in FIG. 4, when a plurality of image processing apparatuses 40 are provided, the user sequentially connects, for example, the display unit 50 and the input unit 60 to the plurality of image processing apparatuses 40, for which setting concerning a network is performed, and operates the input unit 60 to perform the setting concerning a network for each of the image processing apparatuses 40.

An example is explained in which the user performs setting of the plurality of image processing apparatuses 40 concerning a network using the information processing apparatus 5. The user switches, for example, with the image g114 indicating a MAC address displayed on the network setting image g101, the network setting image g101 for each of the image processing apparatuses 40 and performs the setting concerning a network for each of the image processing apparatuses 40 in the same manner as the procedure explained with reference to FIG. 4. However, in this case, an IP address is input using the keyboard of the information processing apparatus 5.

In the examples shown in FIGS. 5 and 6, the setting concerning whether the bridge mode is used is performed on not-shown another screen. However, not only this, but the network setting image g101 shown in FIG. 5 and the network setting image g201 shown in FIG. 6 may include an image of a setting button for the bridge mode.

In the example explained above, the user uses the first communication connecting unit 411 and the second communication connecting unit 412 in the bridge mode. However, in modes other than the bridge mode, the first communication connecting unit 411 and the second communication connecting unit 412 can be used in another IP address. In this case, the user operates the information processing apparatus 5 or the image processing apparatus 40 to perform the setting of each of the first communication connecting unit 411 and the second communication connecting unit 412 concerning a network. In this case, for example, vbr0 is allocated to the first communication connecting unit 411 as a LAN port name by the communication unit 42. For example, aaa. bbb. ccc. dd0 is set in the first communication connecting unit 411 as an IP address by the user. For example, vbr1 is allocated to the second communication connecting unit 412 as a LAN port name by the communication unit 42. For example, aaa. bbb. ccc. dd1 is set in the second communication connecting unit 412 as an IP address by the user.

Processing of network-related setting performed by the image processing apparatus 40 is explained.

Figure 7:
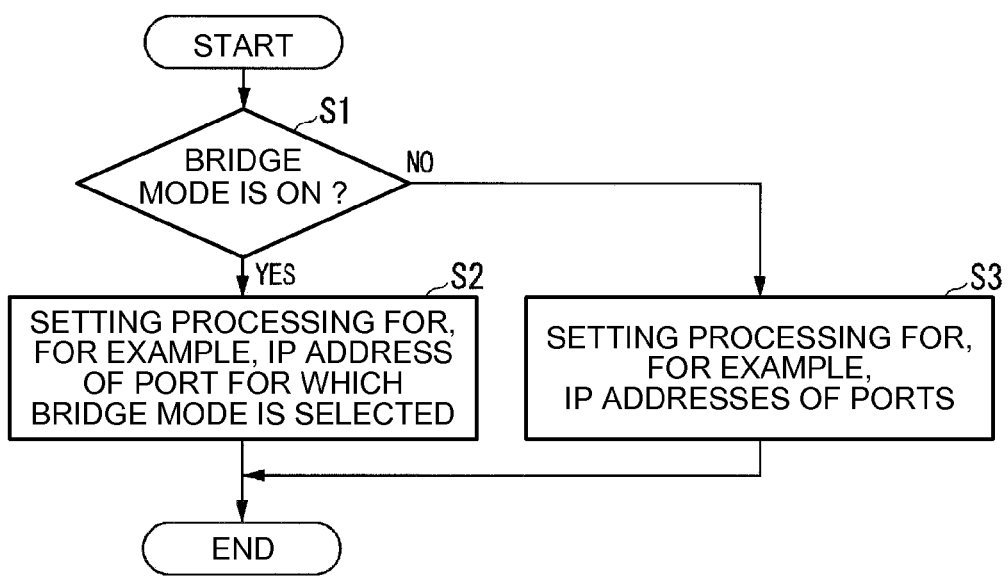
FIG. 7 is a flowchart of a processing procedure of setting of a network relation performed by the image processing apparatus according to the first embodiment.

FIG. 7 is a flowchart for explaining a processing procedure of the network-related setting performed by the image processing apparatus 40 according to this embodiment. Note that, as explained above, the user operates the information processing apparatus 5 or the image processing apparatus 40 to perform the network-related setting.

(Step S1) The control unit 44 discriminates whether the bridge mode is used in setting (hereinafter referred to as bridge mode ON). When the bridge mode is ON (YES in step S1), the control unit 44 proceeds to step S2. When the bridge mode is not ON (NO in step S1), the control unit 44 proceeds to step S3.

(Step S2) The user inputs a common IP address, a common IP mask, and a common gateway address to a plurality of n-th communication connecting units 41n (n is integer 1 and 2) used in the bridge mode of the first communication connecting unit 411 and the second communication connecting unit 412. The control unit 44 receives information concerning a network input by the user and performs setting concerning a network for the first communication connecting unit 411 and the second communication connecting unit 412. The control unit 44 causes the storing unit 45 to store the set information concerning a network and ends the processing.

(Step S3) The control unit 44 sets IP addresses, IP masks, and gateway addresses set by the user respectively for the first communication connecting unit 411 and the second communication connecting unit 412. The control unit 44 causes the storing unit 45 to store the set information concerning a network and ends the processing.

The processing of the network-related setting performed by the image processing apparatus 40 ends.

Processing for a received request performed by the image processing apparatus 40 is explained.

Figure 8:
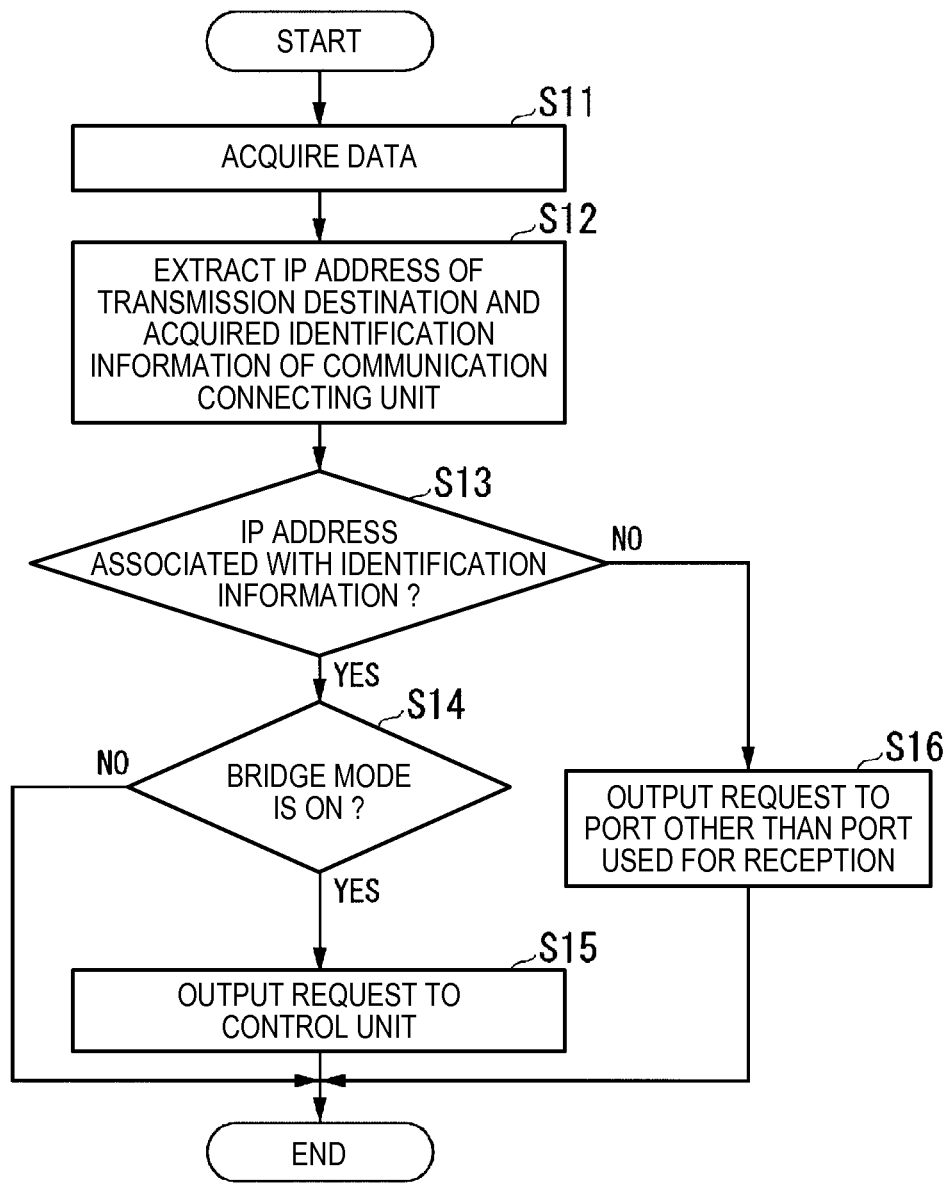
FIG. 8 is a flowchart of a processing procedure for a received request performed by the image processing apparatus according to the first embodiment.

FIG. 8 is a flowchart of a processing procedure for a received request performed by the image processing apparatus 40 according to this embodiment.

(Step S11) The communication unit 42 acquires a request output by the control apparatus 30.

(Step S12) The communication unit 42 extracts an IP address of a transmission destination included in the acquired request and extracts identification information of the n-th communication connecting units 41n for which the request is received.

(Step S13) The communication unit 42 discriminates whether the IP address extracted in step S12 coincides with an IP address associated with the identification information. When discriminating that the extracted IP address coincides with the IP address associated with the identification information (YES in step S13), the communication unit 42 proceeds to step S14. When discriminating that the extracted IP address does not coincide with the IP address associated with the identification information (NO in step S13), the communication unit 42 proceeds to step S16.

(Step S14) The communication unit 42 discriminates whether the bridge mode is ON. When discriminating that the bridge mode is ON (YES in step S14), the communication unit 42 proceeds to step S15. When determining that the bridge mode is not ON (NO in step S14), the communication unit 42 ends the processing.

(Step S15) The communication unit 42 outputs a request to the control unit 44. After the output, the communication unit 42 ends the processing.

(Step S16) The communication unit 42 outputs a request to a communication connecting unit having identification information different from the received identification information. After the output, the communication unit 42 ends the processing.

The processing for the received request performed by the image processing apparatus 40 ends.

A specific example of the processing performed by the image processing apparatuses 40-1 to 40-3 is explained with reference to FIG. 4. Note that, in the following explanation, it is assumed that, in each of the image processing apparatuses 40-1 to 40-3, the bridge mode is ON. An IP address common to the first communication connecting unit 411-1 and the second communication connecting unit 412-1 of the image processing apparatus 40-1 is represented as aaa. bbb. ccc. dd0, identification information of the first communication connecting unit 411-1 is represented as eth0, and identification information of the second communication connecting unit 412-1 is represented as eth1. An IP address common to the first communication connecting unit 411-2 and the second communication connecting unit 412-2 of the image processing apparatus 40-2 is represented as aaa. bbb. ccc. dd1, identification information of the first communication connecting unit 411-2 is represented as eth0, and identification information of the second communication connecting unit 412-2 is represented as eth1. An IP address common to the first communication connecting unit 411-3 and the second communication connecting unit 412-3 of the image processing apparatus 40-3 is represented as aaa. bbb. ccc. dd2, identification information of the first communication connecting unit 411-3 is represented as eth0, and identification information of the second communication connecting unit 412-3 is represented as eth1. In the following explanation, the communication units 42 respectively included in the image processing apparatuses 40-1 to 40-3 are referred to as communication units 42-1 to 42-3 and the control units 44 respectively included in the image processing apparatuses 40-1 to 40-3 are referred to as control units 44-1 to 44-3. In the following explanation, when one of the image processing apparatuses 40-1 to 40-3 is not specified, the image processing apparatuses 40-1 to 40-3 are referred to as image processing apparatuses 40.

The communication unit 42-1 of the image processing apparatus 40-1 receives and acquires, with the first communication connecting unit 411-1, a request output by the control apparatus 30. Subsequently, the communication unit 42-1 extracts the IP address aaa. bbb. ccc. dd1 of a transmission destination and the identification information eth0 included in the request received by the first communication connecting unit 411-1. The extracted IP address is different from the IP address associated with the first communication connecting unit 411-1. Therefore, the communication unit 42-1 transmits the received request from the second communication connecting unit 412-1 to the image processing apparatus 40-2 via a LAN cable.

The communication unit 42-2 of the image processing apparatus 40-2 receives and acquires, with the first communication connecting unit 411-2, a request output by the image processing apparatus 40-1. Subsequently, the communication unit 42-2 extracts the IP address aaa. bbb. ccc. dd1 of the transmission destination and the identification information eth0 included in the request received by the first communication connecting unit 411-2. The extracted IP address coincides with the IP address associated with the first communication connecting unit 411-2. Therefore, the communication unit 42-2 outputs the acquired request to the control unit 44-2.

An example is explained in which apparatuses other than the image processing apparatuses 40 are connected to the plurality of n-th communication connecting units 41n (n is integers 1 and 2) included in the communication connecting unit 41.

Figure 9:
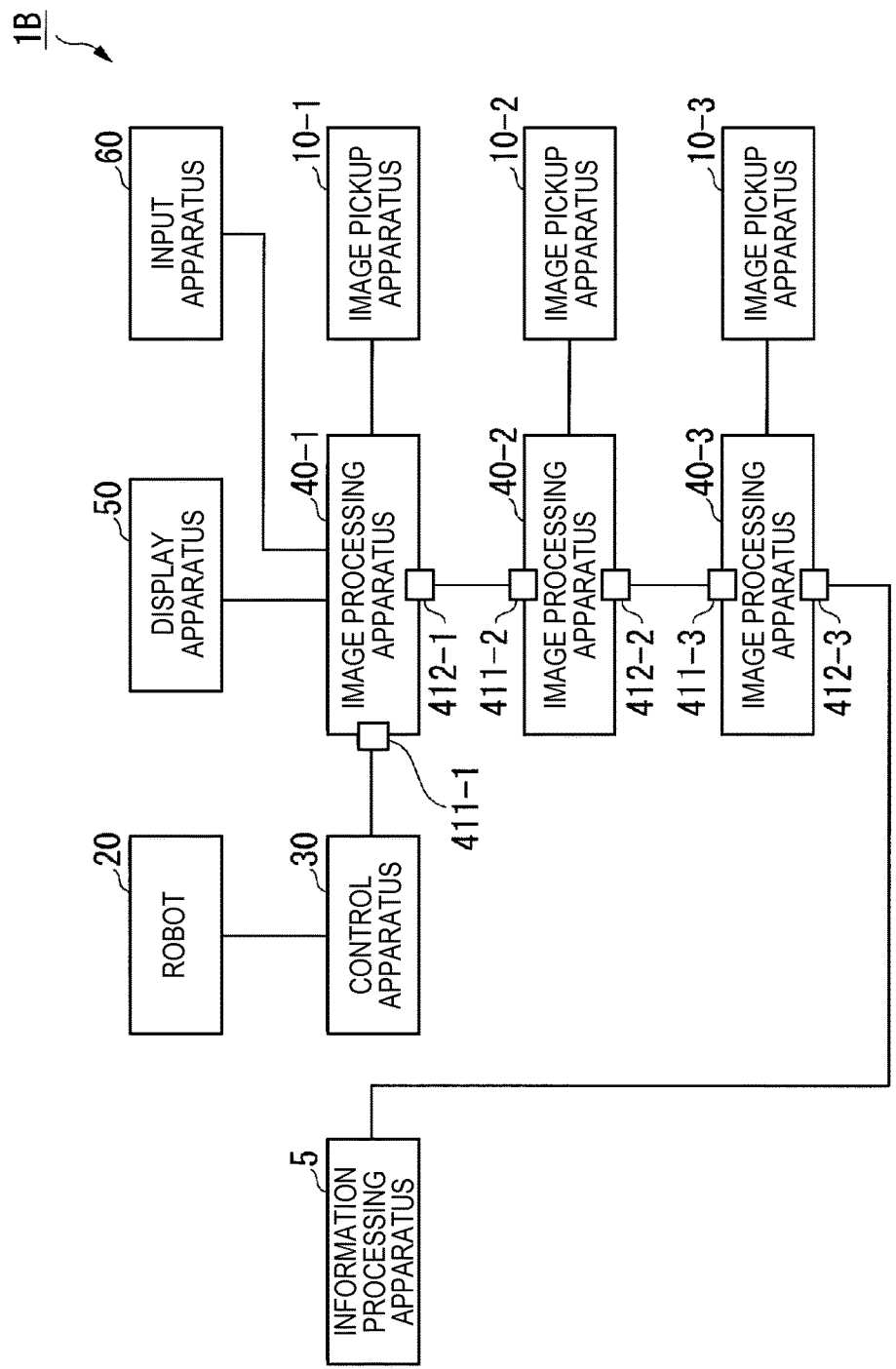
FIG. 9 is a diagram for explaining an example of the configuration of a robot system in which an information processing apparatus is connected to one of the plurality of image processing apparatuses according to the first embodiment.

FIG. 9 is a diagram for explaining an example of the configuration of a robot system 1B in which an information processing apparatus is connected to one of a plurality of image processing apparatuses according to this embodiment. As shown in FIG. 9, the components of the robot system 1A and the robot system 1B are the same. However, connection of the components is different. The robot system 1B is different from the robot system 1A shown in FIG. 4 in that the information processing apparatus 5 is connected to the second communication connecting unit 412-3 of the image processing apparatus 40-3 via a LAN cable. Consequently, the information processing apparatus 5 can transmit a request to the image processing apparatus 40 via the LAN cable not through the control apparatus 30. For example, after an object code is output to the control apparatus 30, when a change of the object code is unnecessary, the connection may be changed to a connection state shown in FIG. 9 and used.

In the configuration shown in FIG. 9, the information processing apparatus 5 receives a control request to the n-th communication connecting unit 41n according to operation from the user and outputs the received control request to the n-th communication connecting unit 41n. The control request to the n-th communication connecting unit 41n is, for example, a request for transmitting an image picked up by the image pickup apparatus 10 to the information processing apparatus 5. Note that the control request includes an IP address set for the n-th communication connecting unit 41n. The information processing apparatus 5 receives, according to the control request, information output from the image processing apparatus 40. The information output from the image processing apparatus 40 is, for example, an image picked up by the image pickup apparatus 10. The information processing apparatus 5 may output the object code to the control apparatus 30 via the image processing apparatuses 40-1 to 40-3.

According to this embodiment, as in FIG. 4, the communication connecting units 41 of the respective image processing apparatuses 40 can be used as a network switch. Since the information processing apparatus 5 can be directly connected to the image processing apparatus 40, it is possible to increase a degree of freedom of the arrangement of the robot system 1B in a site where the robot system 1B is used.

Figure 10:
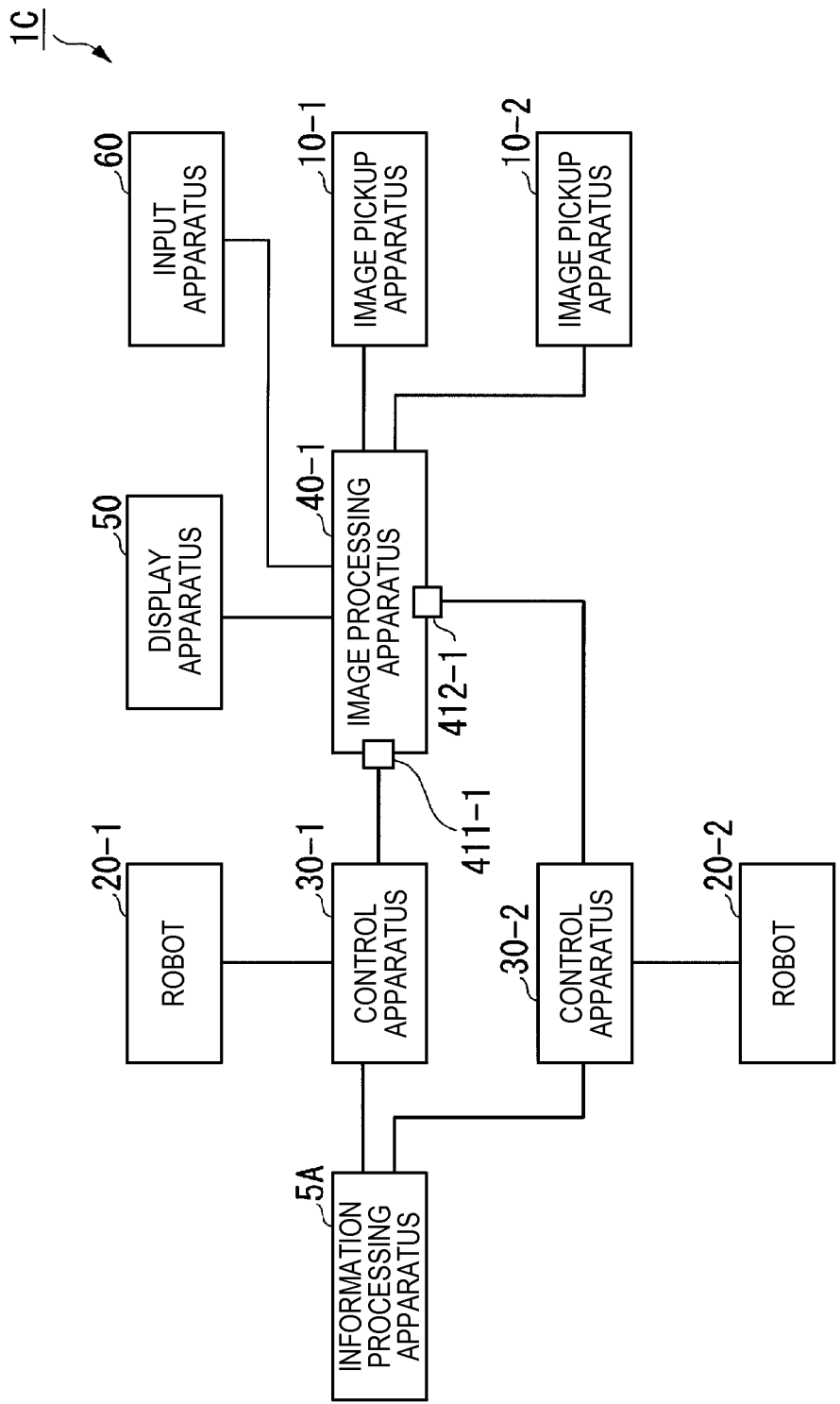
FIG. 10 is a diagram for explaining an example of the configuration of a robot system in which a plurality of control apparatuses share one image processing apparatus according to the first embodiment.

FIG. 10 is a diagram for explaining an example of the configuration of a robot system 1C in which a plurality of control apparatuses (30-1 and 30-2) share one image processing apparatus 40. As shown in FIG. 10, the robot system 1C includes an information processing apparatus 5A, the image pickup apparatus 10-1, the image pickup apparatus 10-2, a robot 20-1, a robot 20-2, a control apparatus 30-1, a control apparatus 30-2, the image processing apparatus 40-1, the display unit 50, and the input unit 60.

As shown in FIG. 10, the information processing apparatus 5A includes two connecting units. One connecting unit of the information processing apparatus 5A is connected to the control apparatus 30-1 and the other connecting unit is connected to the control apparatus 30-2. The robot 20-1 is connected to the control apparatus 30-1. The control apparatus 30-1 is connected to the first communication connecting unit 411-1 of the image processing apparatus 40-1 via a LAN cable. The robot 20-2 is connected to the control apparatus 30-2. The control apparatus 30-2 is connected to the second communication connecting unit 412-1 of the image processing apparatus 40-1 via a LAN cable. The image pickup apparatus 10-1, the image pickup apparatus 10-2, the display unit 50, and the input unit 60 are connected to the image processing apparatus 40-1.

In the example shown in FIG. 10, the two control apparatuses 30-1 and 30-2 share the one image processing apparatus 40-1.

Note that, in the robot system 1C shown in FIG. 10, the image processing apparatus 40-1 may output an image processing result and image information to the control apparatus 30-1 and the control apparatus 30-2 in a time division manner. In this case, the control apparatus 30-1 and the control apparatus 30-2 may select information necessary for the apparatuses in the received image processing result and the received image information on the basis of an object code.

In the example shown in FIG. 10, the first communication connecting unit 411-1 and the second communication connecting unit 412-1 of the image processing apparatus 40-1 may be set in the bridge mode. Different IP addresses may be respectively set in the first communication connecting unit 411-1 and the second communication connecting unit 412-1.

According to this embodiment, in FIG. 10, as in FIG. 4, the communication connecting unit 41 of the image processing apparatus 40-n can be used as a network switch. The plurality of control apparatuses 30 can share the one image processing apparatus 40.

As shown in FIGS. 4, 9, and 10, an external apparatus connected to the n-th communication connecting unit 41n may be any one of another image processing apparatus 40, the control apparatus 30, and the information processing apparatus 5 (Or 5A).

The image processing apparatus 40 (or 40-1, 40-2, or 40-3) and the robot system 1 (or 1B or 1C) in this embodiment explained above include the plurality of n-th communication connecting unit 41n. Therefore, it is possible to perform connection to a plurality of external apparatuses without using a network switch. The same IP address can be set in the plurality of n-th communication connecting unit 41n. As a result, according to this embodiment, an object code can be used without being rewritten irrespective of whether the information processing apparatus 5 (or 5A), the control apparatus 30, or the other image processing apparatus 40 is connected to the first communication connecting unit 411 or the second communication connecting unit 412 by the LAN cable because the first communication connecting unit 411 and the second communication connecting unit 412 have the same IP address.

In the image processing apparatus 40 (or 40-1, 40-2, or 40-3) and the robot system 1 (or 1B or 1C) in this embodiment explained above, the same IP address is set. Therefore, the user can connect the information processing apparatus 5 (or 5A), the control apparatus 30, or the other image processing apparatus 40 to LAN ports of the first communication connecting unit 411 and the second communication connecting unit 412. The apparatuses connected in this way can access the LAN ports using the same IP address. Consequently, the user does not need to be aware of IP addresses of the LAN ports of the first communication connecting unit 411 and the second communication connecting unit 412 and the LAN ports that should be connected. As a result, the user can easily perform connection of the image processing apparatus 40 and the information processing apparatus 5 (or 5A), the control apparatus 30, and the other image processing apparatus 40. Further, if the user performs operation to set the same address in the IP address described in the control program, the user does not need to regenerate the control program created by the information processing apparatus 5 (or 5A).

According to this embodiment, the image processing apparatus 40 operates as a network switch as well. Therefore, as in the examples shown in FIGS. 4, 9, and 10, it is possible to support various connection forms without using a network switch. As a result, according to this embodiment, it is possible to flexibly perform design of a layout of a production line.

With this configuration, the user can perform setting from the information processing apparatus 5 or the image processing apparatus 40 without rewriting a control program. Therefore, it is possible to improve convenience for the user.

Note that, in this embodiment, the example is explained in which the information processing apparatus 5 (or 5A) and the control apparatus 30 are connected by the LAN cable. However, not only this, but the information processing apparatus 5 (or 5A) and the control apparatus 30 may be wire-connected by a USB cable. The information processing apparatus 5 (or 5A) and the control apparatus 30 may be connected by radio communication performed according to a communication standard such as the Wi-Fi (registered trademark). In this case, the information processing apparatus 5 (or 5A) may include, in a request transmitted via a USB terminal, information same as information transmitted from the LAN port and transmit the request. The control apparatus 30 receiving this information may convert the received information into data of the LAN standard and transmit the data to the image processing apparatus 40 through the LAN cable.

Second Embodiment

In the first embodiment, the example is explained in which the image processing apparatus 40 includes the two communication connecting units, i.e., the first communication connecting unit 411 and the second communication connecting unit 412. However, an information processing apparatus may include two or more communication connecting units. In this embodiment, an example is explained in which an image processing apparatus includes three communication connecting units, i.e., a first communication connecting unit to a third communication connecting unit. In the following explanation, components same as the components in the first embodiment are denoted by the same reference numerals and signs and explanation of the components is omitted or simplified.

Figure 11:
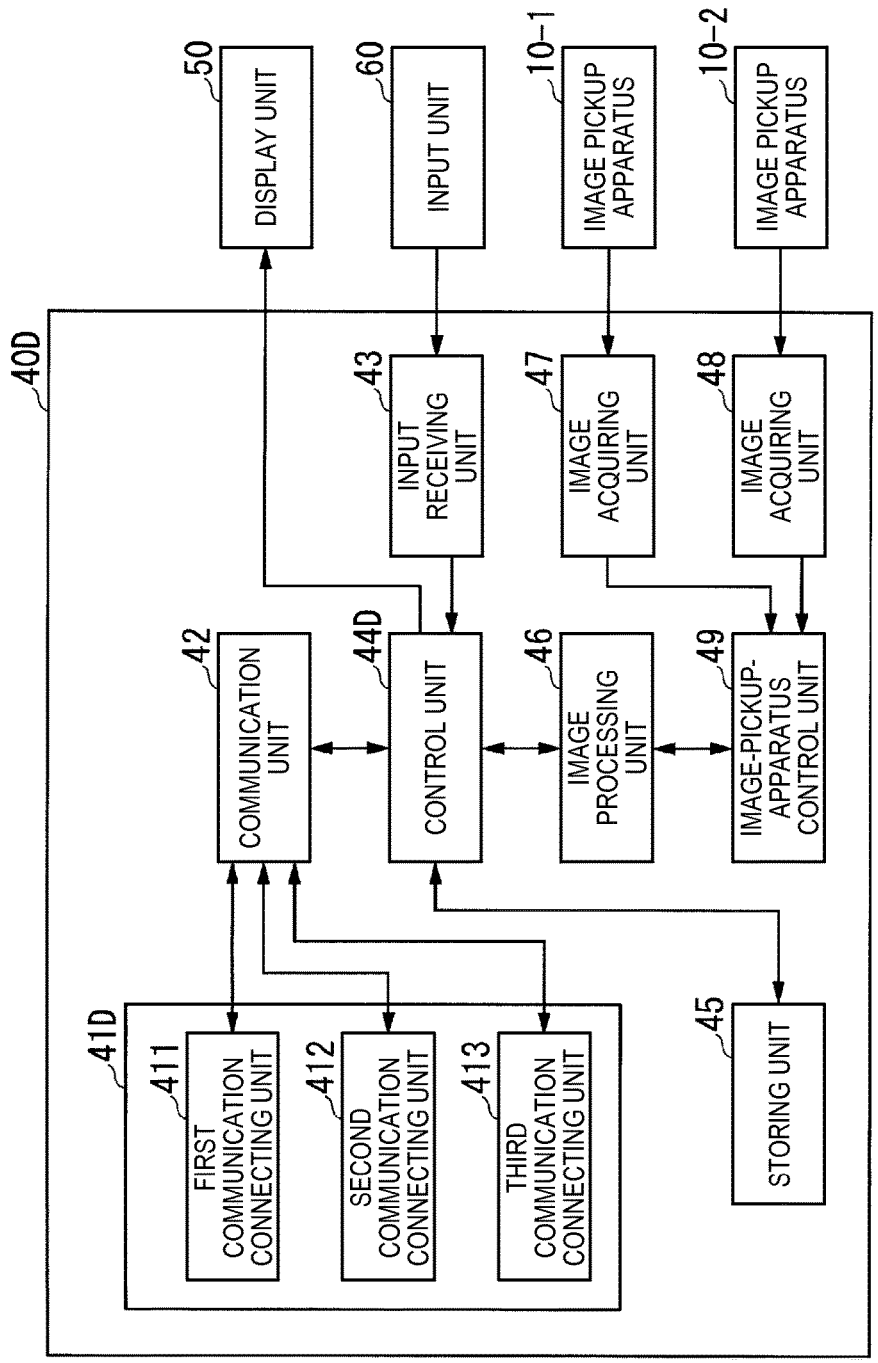
FIG. 11 is a schematic block diagram showing the configuration of an image processing apparatus according to a second embodiment.

FIG. 11 is a schematic block diagram showing the configuration of an image processing apparatus 40D according to this embodiment. As shown in FIG. 11, the image processing apparatus 40D includes a communication connecting unit 41D (a second connecting unit), the communication unit 42, the input receiving unit 43, a control unit 44D, the storing unit 45, the image processing unit 46, the image acquiring unit 47 (a first connecting unit), the image acquiring unit 48 (a first connecting unit), and the image-pickup-apparatus control unit 49. The communication connecting unit 41D includes the first communication connecting unit 411, the second communication connecting unit 412, and a third communication connecting unit 413. The display unit 50 and the input unit 60 are connected to the image processing apparatus 40D. Note that functional units same as the functional units of the image processing apparatus 40 explained in the first embodiment are denoted by the same reference numerals and signs and explanation of the functional units is omitted.

A LAN cable is connected to the third communication connecting unit 413. The third communication connecting unit 413 includes a LAN connector. In the first to third communication connecting units 411 to 413, when the communication connecting unit 41D is used in a bridge mode, a common virtual LAN port name is initially set and a common virtual LAN port address is set by a user as shown in FIG. 12.

FIG. 12 is a diagram for explaining an example of LAN port names, a virtual LAN port name, an IP address of a virtual LAN port, and identification information of a bridge target LAN port of the first to third communication connecting units 411 to 413 according to this embodiment. Note that, in the example shown in FIG. 12, the user sets the bridge mode ON for the third communication connecting units, i.e., the first to third communication connecting units 411 to 413.

When the bridge mode is ON, the first to third communication connecting units 411 to 413 are recognized as having the same LAN port name and the same IP address from the information processing apparatus 5 (FIG. 1) and the control apparatus 30 connected to the image processing apparatus 40D via the network. As shown in FIG. 12, in the first to third communication connecting units 411 to 413, a common virtual LAN port name, for example, vbr0 is initially set. A common IP address of a virtual LAN port, for example, aaa. bbb. ccc. ddd is set by the user. In the example shown in FIG. 12, for example, eth0 is initially set as individual identification information in the first communication connecting unit 411, eth1 is initially set as individual identification information in the second communication connecting unit 412, and eth2 is initially set as individual identification information in the third communication connecting unit 413. The information shown in FIG. 12 is stored in the communication unit 42 or the storing unit 45.

The control unit 44D performs, in addition to the operation of the control unit 44 (FIG. 2), setting concerning a network for the third communication connecting unit 413 according to a result of operation by the user. The setting concerning a network for the third communication connecting unit 413 may be performed either from the information processing apparatus 5 (FIG. 1) or the image processing apparatus 40D.

Note that the image processing apparatus 40D in this embodiment may be applied to the robot systems 1A, 1B, and 1C shown in FIGS. 4, 9, and 10.

A setting example of the bridge mode is explained.

Figure 13:
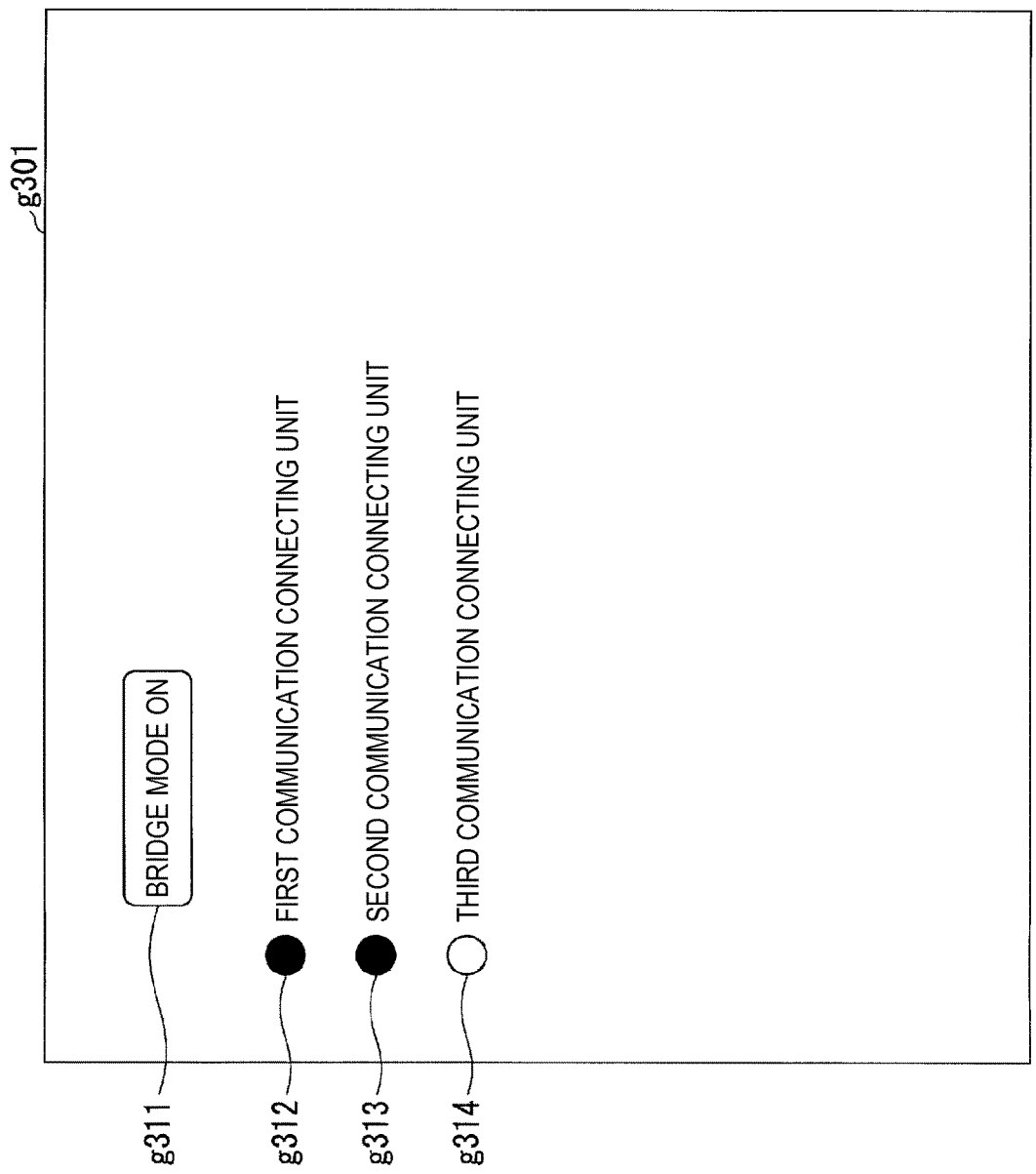
FIG. 13 is a diagram for explaining an example of a setting screen in a bridge mode according to the second embodiment.

FIG. 13 is a diagram for explaining an example of a setting screen g301 for the bridge mode according to this embodiment. As shown in FIG. 13, the setting screen g301 includes an image g311 of a button for switching the bridge mode to an ON state and an OFF state and an image g312 of a button for using the first communication connecting unit 411 in the bridge mode. Note that, when the OFF state of the bridge mode is selected by the user, the image g311 may be switched to an image of "bridge mode OFF". Alternatively, the image g311 may indicate the ON state when being displayed brightly and indicate the OFF state when being displayed darkly. The setting screen g301 includes an image g313 of a button for using the second communication connecting unit 412 in the bridge mode and an image g313 of a button for using the third communication connecting unit 413 in the bridge mode.

The example shown in FIG. 13 is an example of an image after setting for using the first communication connecting unit 411 and the second communication connecting unit 412 in the bridge mode is performed by the user.

Note that the setting screen g301 for the bridge mode shown in FIG. 13 is displayed on the display of the information processing apparatus 5 (FIGS. 1, 4, 9, and 10) or the display unit 50 connected to the image processing apparatus 40D.

Processing of network-related setting performed by the image processing apparatus 40D is explained.

Figure 14:
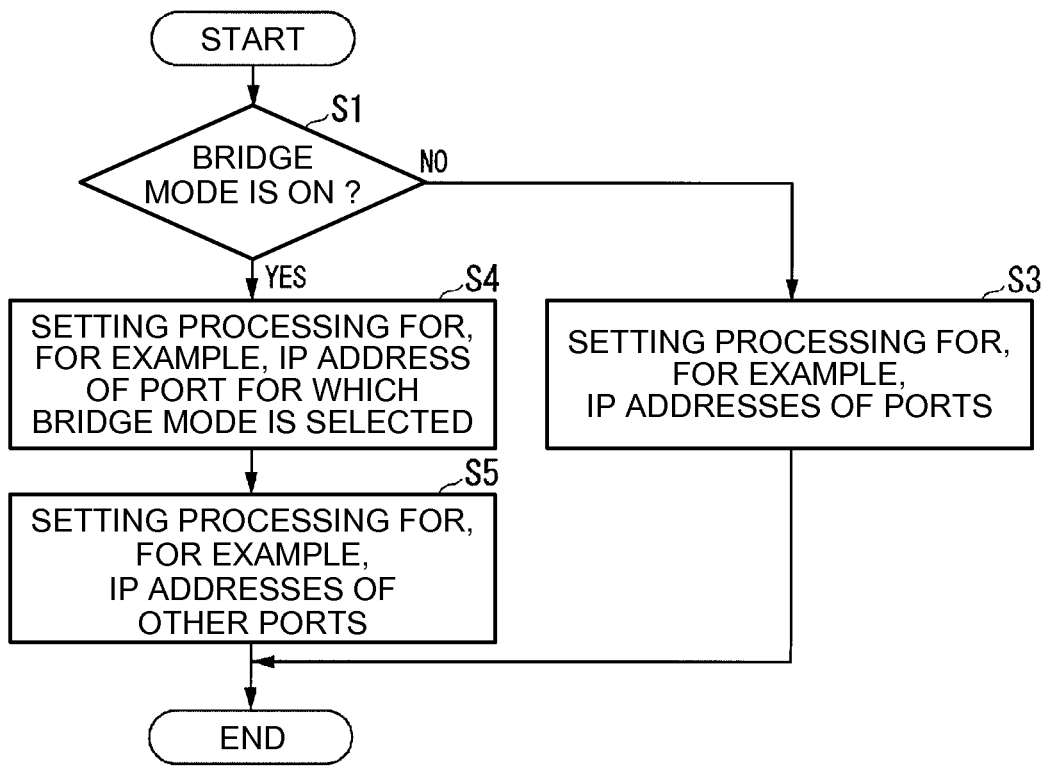
FIG. 14 is a flowchart for explaining a processing procedure of setting of a network relation performed by the image processing apparatus according to the second embodiment.

FIG. 14 is a flowchart of a processing procedure of the network-related setting performed by the image processing apparatus 40D according to this embodiment. Note that processing same as the processing performed by the image processing apparatus 40 in the first embodiment is denoted by the same reference signs.

(Step S1) The control unit 44D discriminates whether the bridge mode ON is set. When the bridge mode is ON (YES in step S1), the control unit 44D proceeds to step S4. When the bridge mode is not ON (NO in step S1), the control unit 44D proceeds to step S3.

(Step S3) The control unit 44D performs processing as in step S3 explained with reference to FIG. 7.

(Step S4) The user inputs a common IP address, a common IP mask, and a common gateway address to a plurality of p-th communication connecting units 41$p$ (p is at least two of integers 1 to 3) used in the bridge mode among the first to third communication connecting units 411 to 413. The control unit 44D receives information concerning a network input by the user and performs setting concerning a network for the first to third communication connecting units 411 to 413. The control unit 44D causes the storing unit 45 to store the set information concerning a network. The control unit 44D proceeds to step S5.

(Step S5) The control unit 44D sets an IP address, an IP mask, and a gateway address set by the user in the q-th communication connecting units 41$q$ (q is integers 1 to 3 other than p) not used in the bridge mode. The control unit 44D causes the storing unit 45 to store information concerning the set network and ends the processing. Note that, when the bridge mode is set in all of the first to third communication connecting units 411 to 413, the control unit 44D does not perform the processing in step S5.

The processing of the network-related setting performed by the image processing apparatus 40D ends.

Note that, in this embodiment, the example is explained in which the communication connecting unit 41D includes the three communication connecting units, i.e., the first to third communication connecting units 411 to 413. However, the number of communication connecting units included in the communication connecting unit 41D may be four or more. When there are a plurality of q-th communication connecting units 41$q$ not set to the bridge mode ON, in FIG. 14, the control unit 44D repeats the processing in step S5 for each of the plurality of q-th communication connecting units 41$q$.

The image processing apparatus 40D and the robot system 1D (e.g., a robot system in which the image processing apparatus 40 is replaced with the image processing apparatus 40D in FIG. 4) in this embodiment explained above include the plurality of p-th communication connecting units 41$p$. Therefore, the communication connecting unit 41D can be used as a network switch. As a result, with the image processing apparatus 40D in this embodiment, it is possible to perform connection to a plurality of external apparatuses without using a network switch. As in the first embodiment, the user does not need to be aware of IP addresses of the LAN ports of the plurality of p-th communication connecting units 41p in which the same IP address is set and the LAN ports that should be connected. As a result, the user can easily perform connection of the image processing apparatus 40D and the information processing apparatus 5, the control apparatus 30, and the other image processing apparatus 40.

Further, according to this embodiment, the same IP address can be set in the plurality of p-th communication connecting units 41p. An IP address different from the IP address of the p-th communication connecting units 41p can be set in the other q-th communication connecting units 41q. As a result, according to this embodiment, since a degree of freedom of the control program and connection of the apparatuses increases, it is possible to improve convenience.

Third Embodiment

An embodiment of the invention is explained below with reference to the drawings. Note that components same as the components in the first embodiment are denoted by the same reference numerals and signs and explanation of the components is omitted or simplified.

The information processing apparatus 5 shown in FIG. 1 receives operation from the user via the GUI displayed on the display unit and outputs the object code of information processing apparatus 5 to the control apparatus 30 on the basis of the received operation. For example, a plurality of processing procedures are described in the object code. In a processing procedure in which an apparatus executing the object code performs communication with an external apparatus, for each kind of processing, information indicating a transmission source of a request for the processing (the apparatus executing the object code) and information indicating a transmission destination of information (the external apparatus) are described in association with each other. The information indicating the transmission destination is an IP address set in the control apparatus 30 or an external-communication connecting unit 61 (FIG. 15) of an image processing apparatus 40A.

The information processing apparatus 5 is communicably connected to the control apparatus 30 by a cable. Wired communication via the cable is performed according to a standard such as the Ethernet (registered trademark).

The image pickup apparatus 10 is communicably connected to the image processing apparatus 40A by a cable. Wired communication via the cable is performed, for example, according to a standard such as GigE (Giga Ethernet (registered trademark)) in which electric power can be supplied to the image pickup apparatus 10 through a LAN cable. Note that the communication of the image pickup apparatus 10 and the image processing apparatus 40A may be performed according to a standard such as the Ethernet (registered trademark). In this case, electric power may be separately supplied to the image pickup apparatus 10.

The control apparatus 30 outputs, to the information processing apparatus 5, the information indicating the setting concerning respective networks of the external-communication connecting unit 61 (FIG. 15) and the image pickup apparatus 10 output from the image processing apparatus 40A at the start of the image processing apparatus 40A. The control apparatus 30 shares the information with the information processing apparatus 5.

Figure 15:
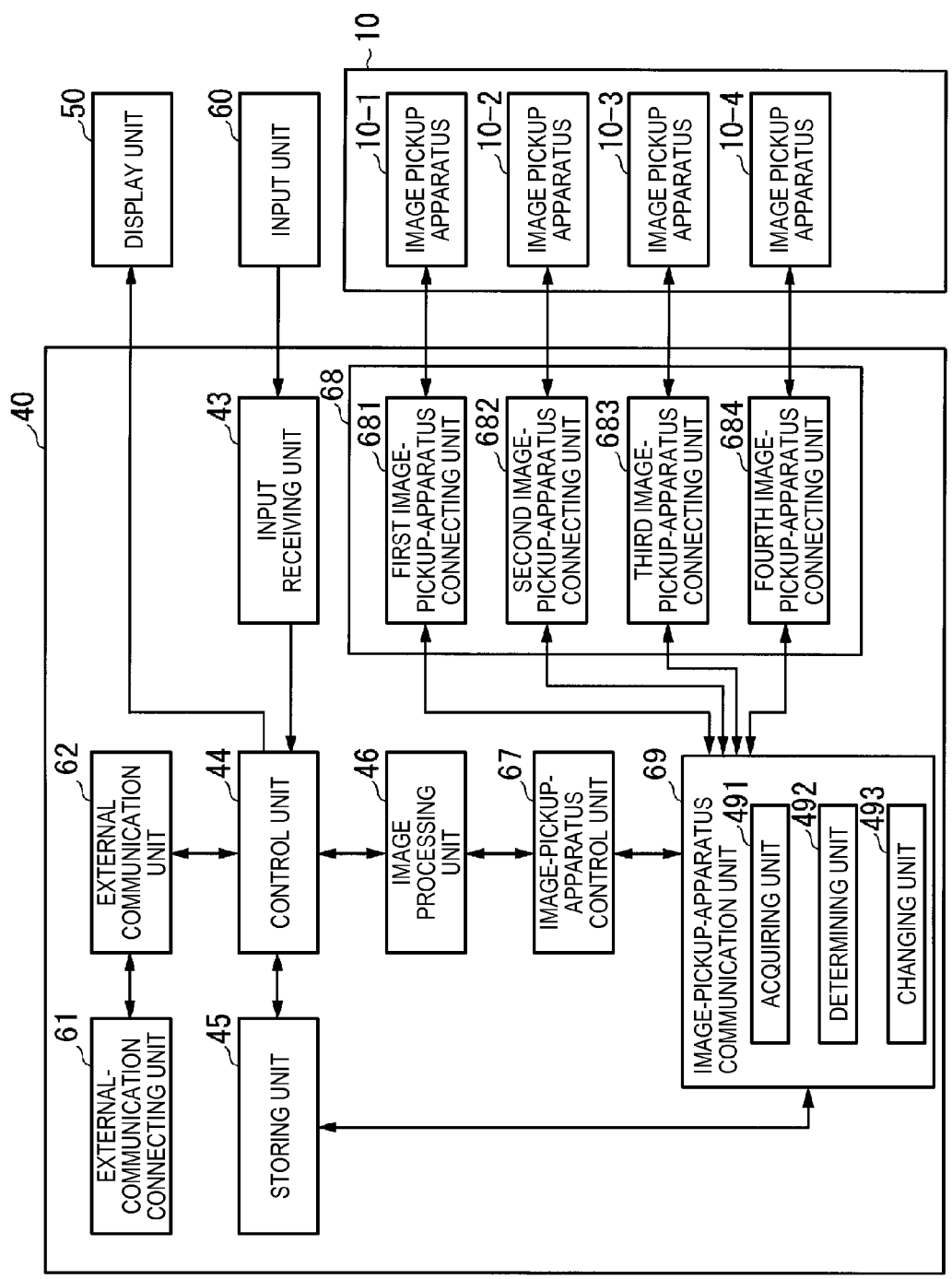
FIG. 15 is a schematic block diagram showing the configuration of an image processing apparatus according to a third embodiment.

When the image processing apparatus 40A is started, the image processing apparatus 40A recognizes the image pickup apparatus 10 connected to an image-pickup-apparatus connecting unit 68 (FIG. 15). Note that, in the external-communication connecting unit 61 (FIG. 15), as explained below, an IP address (third setting information) is initially set. In the image-pickup-apparatus connecting unit 68, as explained below, an IP address (first setting information) is initially set. When the image processing apparatus 40A can recognize the image pickup apparatus 10, the image processing apparatus 40A acquires an IP address (second setting information) set in the image pickup apparatus 10. The image processing apparatus 40A compares the acquired second setting information and the first setting information and determines whether it is necessary to change the second setting information. When determining that it is necessary to change the second setting information, the image processing apparatus 40A changes the second setting information on the basis of changing rules explained below. Note that the initial settings may be optionally set by the user.

The image processing apparatus 40A outputs the information indicating the setting of concerning a network for the external-communication connecting unit 61 (FIG. 15), the first setting information, and the second setting information to the control apparatus 30.

The schematic configuration of the image processing apparatus 40A is explained.

FIG. 15 is a schematic block diagram showing the configuration of the image processing apparatus 40A according to this embodiment. As shown in FIG. 15, the image processing apparatus 40A includes an external-communication connecting unit 61, an external communication unit 62, the input receiving unit 43, the control unit 44, the storing unit 45, the image processing unit 46, an image-pickup-apparatus control unit 67, an image-pickup-apparatus connecting unit 68 (a connecting unit), and an image-pickup-apparatus communication unit 69. The image-pickup-apparatus connecting unit 68 includes a first image-pickup-apparatus connecting unit 681 to a fourth image-pickup-apparatus connecting unit 684. Note that, in this embodiment, n-th image-pickup-apparatus connecting units 68n (n is integers 1 to 4) are referred to as image pickup apparatus ports as well. The image-pickup-apparatus communication unit 69 includes an acquiring unit 491, a determining unit 492, and a changing unit 493. The display unit 50 and the input unit 60 are connected to the image processing apparatus 40A.

A LAN cable is connected to the external-communication connecting unit 61. The external-communication connecting unit 61 includes a LAN connector. In the external-communication connecting unit 61, an IP address is initially set.

The external-communication connecting unit 61 outputs a request received from the control apparatus 30 via the LAN cable to the external communication unit 62. The external-communication connecting unit 61 transmits, according to the control by the external communication unit 62, an image processing result and image information output by the external communication unit 62 to the control apparatus 30 via the LAN cable. Note that the request received by the external-communication connecting unit 61 and the image processing result and the image information transmitted by the external-communication connecting unit 61 include information indicating a transmission destination and information indicating a transmission source.

When the image processing apparatus 40A is started, the external communication unit 62 acquires and shares an IP address of an external apparatus connected via the LAN cable and the external-communication connecting unit 61. The external apparatus is any one of the information processing apparatus 5, the robot 20, the control apparatus 30, and other image processing apparatuses 40A.

The external communication unit 62 receives the request output by the external-communication connecting unit 61. The external communication unit 62 extracts the information indicating the transmission destination included in the received request. The external communication unit 62 discriminates whether the information indicating the transmission destination of the extracted request and information indicating IP addresses respectively set in the external-communication connecting unit 61 and the image-pickup-apparatus connecting unit 68 coincide with each other. When the information indicating the transmission destination of the extracted request and the IP address set in the external-communication connecting unit 61 or the image-pickup-apparatus connecting unit 68 coincide with each other, the external communication unit 62 outputs the received request and the information indicating the transmission destination to the control unit 44.

The external communication unit 62 outputs, to the transmission destination included in the image processing result and the image information output by the control unit 44, the image processing result and the image information via the LAN cable.

The request output by the external communication unit 62, operation information output by the input receiving unit 43, and the image processing result output by the image processing unit 46 are input to the control unit 44. When the request output by the external communication unit 62 is a request for image processing and an image pickup apparatus, the control unit 44 outputs the input request to the image processing unit 46.

The image processing result output by the image processing unit 46 and image information of a picked-up image are input to the control unit 44. The image processing result includes information indicating the position and the posture of the work target M. The control unit 44 adds the information indicating the transmission source of the request included in the request to the image processing result output by the image processing unit 46 and outputs the image processing result to the external communication unit 62. The control unit 44 adds the information indicating the transmission source of the request included in the request to the image information output by the image processing unit 46 and outputs to the external communication unit 62.

Figures 16, 17:
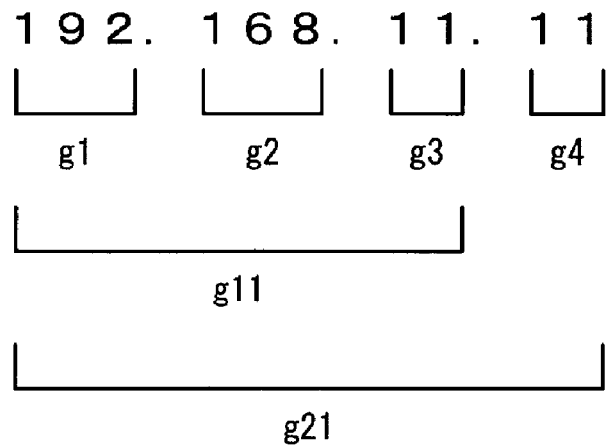
FIG. 16 is a diagram for explaining a network segment according to the third embodiment.
FIG. 17 is a diagram for explaining an example of a relation between IP addresses and network segments allocated in advance to a first image-pickup-apparatus connecting unit to a fourth image-pickup-apparatus connecting unit stored in a storing unit according to the third embodiment.

In the storing unit 45, a control program for the control unit 44 to control the units of the image processing apparatus 40A is stored. In the storing unit 45, an IP address, for example, "192. 168. 0. 3" allocated in advance to the external-communication connecting unit 61 is stored. In the storing unit 45, IP addresses allocated in advance to the first to fourth image-pickup-apparatus connecting units 681 to 684 shown in FIG. 17 are stored. In the storing unit 45, IP addresses allocated in advance to the image pickup apparatuses 10-1 to 10-4 connected to the first to fourth image-pickup-apparatus connecting units 681 to 684 shown in FIG. 18 are stored.

A network segment is explained with reference to FIG. 16.

FIG. 16 is a diagram for explaining a network segment according to this embodiment. In FIG. 16, "192. 168. 11. 11" indicated by reference sign g21 is an example of the IP address. "192" indicated by reference sign g1 is referred to as first segment, "168" indicated by reference sign g2 is referred to as second segment, "11" indicated by reference sign g3 is referred to as third segment, and "11" indicated by reference sign g4 is referred to as fourth segment (host section or host address). The first segment to the third segment "192. 168. 11" indicated by reference sign g11 is referred to as network segment (network section or network address).

FIG. 17 is a diagram for explaining an example of a relation between IP addresses and network segments allocated in advance to the first to fourth image-pickup-apparatus connecting units 681 to 684 stored in the storing unit 45 according to this embodiment. In the example shown in FIG. 17, the IP address allocated to the first image-pickup-apparatus connecting unit 681 is "192. 168. 11. 1" and the network segment is "192. 168. 11". The IP address allocated to the second image-pickup-apparatus connecting unit 682 is "192. 168. 12. 1" and the network segment is "192. 168. 12". The IP address allocated to the third image-pickup-apparatus connecting unit 683 is "192. 168. 13. 1" and the network segment is "192. 168. 13". The IP address allocated to the fourth image-pickup-apparatus connecting unit 684 is "192. 168. 14. 1" and the network segment is "192. 168. 14". In the example shown in FIG. 17, the network segments in the IP addresses allocated in advance to the first to fourth image-pickup-apparatus connecting units 681 to 684 are set to be different from a network segment allocated in advance to the external-communication connecting unit 61. The network segments of the first to fourth image-pickup-apparatus connecting units 681 to 684 are also set to be different from one another.

FIG. 18 is a diagram for explaining an example of IP addresses allocated in advance to the image pickup apparatuses 10-1 to 10-4 connected to the first to fourth image-pickup-apparatus connecting units 681 to 684 and stored in the storing unit 45 according to this embodiment. In the example shown in FIG. 18, the IP address allocated to the image pickup apparatus 10-1 connected to the first image-pickup-apparatus connecting unit 681 is "192. 168. 11. 11". The IP address allocated to the image pickup apparatus 10-2 connected to the second image-pickup-apparatus connecting unit 682 is "192. 168. 12. 11". The IP address allocated to the image pickup apparatus 10-3 connected to the third image-pickup-apparatus connecting unit 683 is "192. 168. 13. 11". The IP address allocated to the image pickup apparatus 10-4 connected to the fourth image-pickup-apparatus connecting unit 684 is "192. 168. 14. 11". As shown in FIG. 18, network segments of the IP addresses allocated in advance to the image pickup apparatuses 10-1 to 10-4 connected to the first to fourth image-pickup-apparatus connecting units 681 to 684 coincide with the network segments of the first image-pickup-apparatus connecting unit 681 to the fourth image-pickup-apparatus connecting unit 684. Only values of the fourth segments of the network segments are set to be different.

Referring back to FIG. 15, the explanation of the image processing apparatus 40A is continued.

The image processing unit 46 applies, according to the request input from the control unit 44, image processing to the image information output by the image-pickup-apparatus control unit 67 using a well-known method and calculates a position and a posture of the work target M. The image processing unit 46 outputs information indicating the calculated position and the calculated posture of the work target M to the control unit 44. When a request to the image-pickup-apparatus control unit 67 is included in the information output by the control unit 44, the image processing unit 46 outputs the request to the image-pickup-apparatus control unit 67. The image processing unit 46 outputs the image information output by the image-pickup-apparatus control unit 67 to the control unit 44.

The image-pickup-apparatus control unit 67 selects, according to the request input from the image processing unit 46, image information input from the image-pickup-apparatus communication unit 69 and outputs the selected image information to the image processing unit 46. Note that the image-pickup-apparatus control unit 67 may control, according to the request input from the image processing unit 46, via the image-pickup-apparatus communication unit 69 and the image-pickup-apparatus connecting unit 68, sensitivity of image pickup of the image pickup apparatuses 10-1 to 10-4, selection of a region for the image pickup, an angle of view of the image pickup, and the like.

The first to fourth image-pickup-apparatus connecting units 681 to 684 respectively supply electric power to the image pickup apparatuses 10-1 to 10-4. The first to fourth image-pickup-apparatus connecting units 681 to 684 include, for example, connectors of the PoE (Power Over Ethernet (registered trademark)) standard. The IP addresses shown in FIG. 17 are respectively set in advance in the first to fourth image-pickup-apparatus connecting units 681 to 684.

The image pickup apparatus 10-1 is connected to the first image-pickup-apparatus connecting unit 681. The first image-pickup-apparatus connecting unit 681 acquires image information output by the image pickup apparatus 10-1 and outputs the acquired image information to the image-pickup-apparatus communication unit 69.

The image pickup apparatus 10-2 is connected to the second image-pickup-apparatus connecting unit 682. The second image-pickup-apparatus connecting unit 682 acquires image information output by the image pickup apparatus 10-2 and outputs the acquired image information to the image-pickup-apparatus communication unit 69.

The image pickup apparatus 10-3 is connected to the third image-pickup-apparatus connecting unit 683. The third image-pickup-apparatus connecting unit 683 acquires image information output by the image pickup apparatus 10-3 and outputs the acquired image information to the image-pickup-apparatus communication unit 69.

The image pickup apparatus 10-4 is connected to the fourth image-pickup-apparatus connecting unit 684. The fourth image-pickup-apparatus connecting unit 684 acquires image information output by the image pickup apparatus 10-4 and outputs the acquired image information to the image-pickup-apparatus communication unit 69. Note that the image information includes image pickup apparatus identification information indicating the image pickup apparatuses 10-$n$ (n is integers 1 to 4).

Note that the image pickup apparatus identification information includes information indicating the IP addresses respectively set in advance in the image pickup apparatuses 10-1 to 10-4 as shown in FIG. 18. However, IP addresses are not set in some of the image pickup apparatuses 10-1 to 10-4 in an initial state. When IP addresses are not set and when IP addresses are different from the IP addresses set in advance, the image-pickup-apparatus communication unit 69 changes or sets the IP addresses.

When a power supply of the image processing apparatus 40A is turned on, the acquiring unit 491 detects the image pickup apparatuses 10-1 to 10-4 respectively connected to the first to fourth image-pickup-apparatus connecting units 681 to 684. Thereafter, the acquiring unit 491 acquires the IP addresses (first setting information) of the respective first to fourth image-pickup-apparatus connecting units 681 to 684 and the IP addresses (second setting information) of the respective detected image pickup apparatuses 10-1 to 10-4. The acquiring unit 491 outputs the acquired IP addresses of the respective first to fourth image-pickup-apparatus connecting units 681 to 684 and the acquired IP addresses of the respective image pickup apparatuses 10-1 to 10-4 to the determining unit 492.

The determining unit 492 compares the IP addresses of the respective first to fourth image-pickup-apparatus connecting units 681 to 684 output by the acquiring unit 491 and the IP addresses of the respective image pickup apparatuses 10-1 to 10-4 output by the acquiring unit 491 and determines whether it is necessary to change the IP addresses of the respective image pickup apparatuses 10-1 to 10-4. When determining that it is necessary to change the IP addresses, the determining unit 492 outputs the acquired IP addresses of the respective first to fourth image-pickup-apparatus connecting units 681 to 684 and the acquired IP addresses of the respective image pickup apparatuses 10-1 to 10-4 to the changing unit 493.

The IP addresses of the respective first to fourth image-pickup-apparatus connecting units 681 to 684 and the IP addresses of the respective image pickup apparatuses 10-1 to 10-4 are input to the changing unit 493 from the determining unit 492. The changing unit 493 changes the IP address of the image pickup apparatus 10 that needs to be changed and causes the storing unit 45 to store the changed IP address. The changing unit 493 transmits information indicating the changed IP address to the image pickup apparatus 10 via the image-pickup-apparatus connecting unit 68 and the LAN cable. Consequently, the changing unit 493 sets or changes the IP address of the image pickup apparatus 10.

Processing performed by the image-pickup-apparatus communication unit 69 is explained.

Note that, in the following explanation, when one of the first to fourth image-pickup-apparatus connecting units 681 to 684 is not specified, the first to fourth image-pickup-apparatus connecting units 681 to 684 are referred to as n-th image-pickup-apparatus connecting units 68$n$ (n is integers 1 to 4). When one of the image pickup apparatuses 10-1 to 10-4 is not specified, the image pickup apparatuses 10-1 to 10-4 are referred to as image pickup apparatuses 10-$n$ (n is integers 1 to 4).

Figure 19:
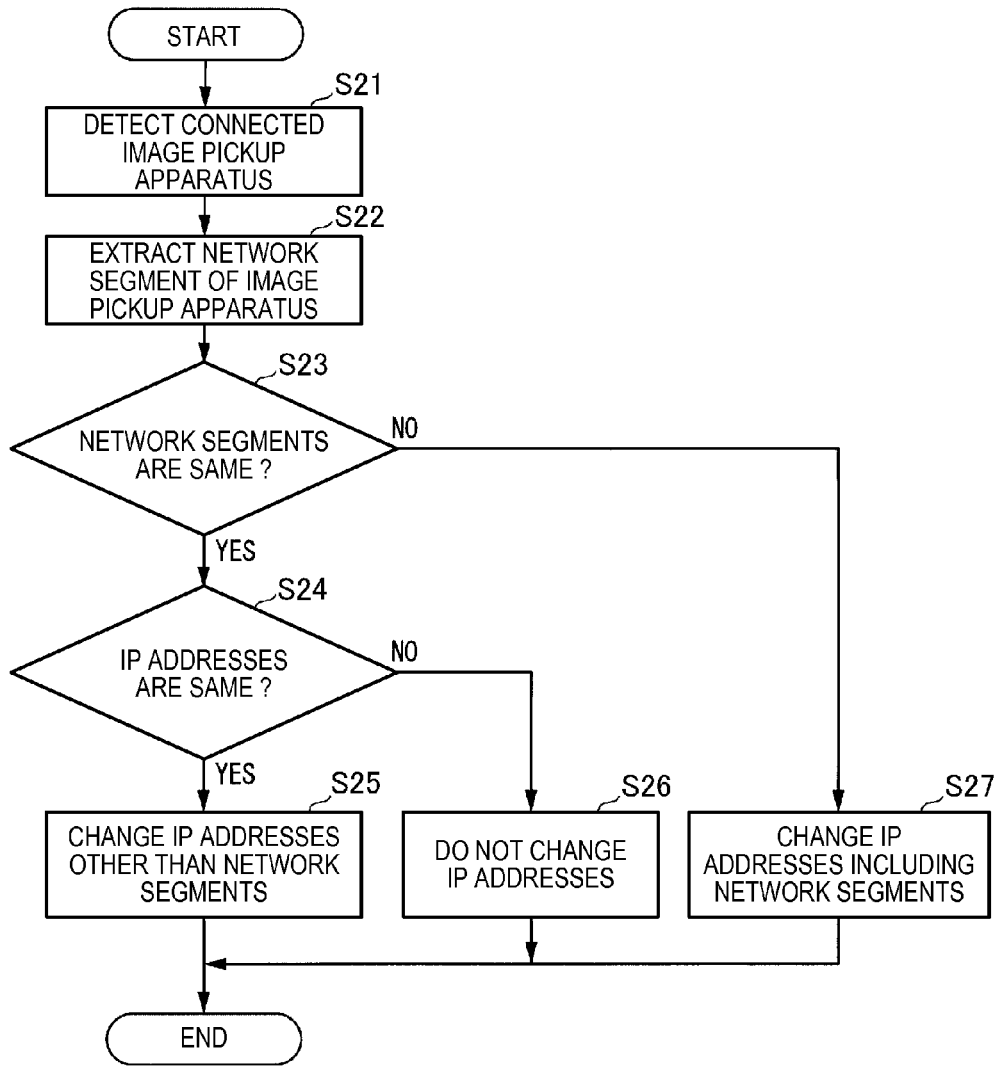
FIG. 19 is a flowchart for explaining a processing procedure performed by an image-pickup-apparatus communication unit according to the third embodiment.

FIG. 19 is a flowchart of a processing procedure performed by the image-pickup-apparatus communication unit 69 according to this embodiment.

(Step S21) When the power supply of the image processing apparatus 40A is turned on, the acquiring unit 491 detects the image pickup apparatuses 10-$n$ respectively connected to the n-th image-pickup-apparatus connecting units 68$n$.

(Step S22) The acquiring unit 491 acquires IP addresses of the respective n-th image-pickup-apparatus connecting units 68$n$ and IP addresses of the detected image pickup apparatuses 10-$n$. Subsequently, the acquiring unit 491 extracts network segments respectively from the IP addresses of the respective n-th image-pickup-apparatus connecting units 68$n$. Subsequently, the acquiring unit 491 extracts network segments respectively from the IP addresses of the respective detected image pickup apparatuses 10-$n$.

(Step S23) The determining unit 492 compares the network segments of the respective n-th image-pickup-apparatus connecting units 68$n$ output by the acquiring unit 491 and the network segments of the respective image pickup apparatuses 10-$n$ and determines whether the network segments are the same. When determining that the network segments are the same (YES in step S23), the determining unit 492 proceeds to step S24. When determining that the network segments are different (NO in step S23), the determining unit 492 proceeds to step S27.

(Step S24) The determining unit 492 compares the IP addresses of the respective n-th image-pickup-apparatus connecting units 68n and the IP addresses of the respective image pickup apparatuses 10-n and determines whether the IP addresses are the same. When determining that the IP addresses are the same (YES in step S24), the determining unit 492 proceeds to step S25. When determining that the IP addresses are different (NO in step S24), the determining unit 492 proceeds to step S26.

(Step S25) The changing unit 493 changes the IP addresses of the image pickup apparatuses 10-n, the IP addresses of which are same as the IP addresses of the n-th image-pickup-apparatus connecting units 68n, to IP addresses (for example, set in advance). In this case, the changing unit 493 does not change the network segments and changes only the fourth segments to change the IP addresses. The changing unit 493 ends the processing after the change.

(Step S26) The changing unit 493 ends the processing without changing the IP addresses of the image pickup apparatuses 10-n.

(Step S27) The changing unit 493 changes the IP addresses of the image pickup apparatuses 10-n, the network segments of which are different from the network segments of the n-th image-pickup-apparatus connecting units 68n, to network segments and IP addresses (for example, set in advance). The changing unit 493 ends the processing after the change.

The processing performed by the image-pickup-apparatus communication unit 69 ends.

Example of Change 1 of an Address

An example of processing performed when the network segments of the n-th image-pickup-apparatus connecting unit 68n and the image pickup apparatus 10-n are different is explained. In this example, setting concerning a network for the external-communication connecting unit 61 of the image processing apparatus 40A is performed in advance. The setting concerning a network is setting of an IP address, an IP address sub-network mask, an address of a gateway, and the like. In this example, an IP address "192. 168. 0. 3" different from the network segments of the n-th image-pickup-apparatus connecting unit 68n and the image pickup apparatus 10-n is set in advance in the external-communication connecting unit 61.

FIG. 20 is a diagram for explaining an example of network segments and IP addresses in which the network segments are different in the n-th image-pickup-apparatus connecting unit 68n and the image pickup apparatus 10-n according to the this embodiment.

A diagram of a region indicated by reference sign g101 in FIG. 20 is a diagram for explaining acquired network segments and IP addresses of the n-th image-pickup-apparatus connecting unit 68n and the image pickup apparatus 10-n. A diagram of a region indicated by reference sign g111 of FIG. 20 is a diagram for explaining a change of the network segment and the IP address of the image pickup apparatus 10-n.

In an example indicated by reference sign g101 in FIG. 20, the network segment of the n-th image-pickup-apparatus connecting unit 68n is "192. 168. 11" and the IP address of the n-th image-pickup-apparatus connecting unit 68n is "192. 168. 11. 1". The network segment of the image pickup apparatus 10-n connected to the n-th image-pickup-appara-tus connecting unit 68n is "192. 168. 50" and the IP address of the image pickup apparatus 10-n is "192. 168. 50. 1".

In the example indicated by reference sign g101 in FIG. 20, the network segments of the n-th image-pickup-apparatus connecting unit 68n and the image pickup apparatus 10-n are different. Therefore, the network segment and the IP address of the image pickup apparatus 10-n are changed by the changing unit 493 to values set in advance as shown in regions indicated by reference signs gill and g112 in FIG. 20. Specifically, the network segment "192. 168. 50" of the image pickup apparatus 10-n is changed to the network segment "192. 168. 11" of the n-th image-pickup-apparatus connecting unit 68n by the changing unit 493. Thereafter, the fourth segment of the IP address of the image pickup apparatus 10-n is changed to "192. 168. 11. 11", which is a value decided in advance, by the changing unit 493.

Example of Change 2 of an Address

An example of processing performed when the network segments and IP addresses of the n-th image-pickup-apparatus connecting unit 68n and the image pickup apparatus 10-n are the same is explained. In this example as well, the IP address "192. 168. 0. 3" is set in advance in the external-communication connecting unit 61.

FIG. 21 is a diagram for explaining an example of network segments and IP addresses in which the network segments and the IP addresses are the same in the n-th image-pickup-apparatus connecting unit 68n and the image pickup apparatus 10-n according to the this embodiment.

A diagram of a region indicated by reference sign g121 in FIG. 21 is a diagram for explaining acquired network segments and IP addresses of the n-th image-pickup-apparatus connecting unit 68n and the image pickup apparatus 10-n. A diagram of a region indicated by reference sign g131 of FIG. 21 is a diagram for explaining a change of the IP address of the image pickup apparatus 10-n.

In an example indicated by reference sign g121 in FIG. 21, the network segment of the n-th image-pickup-apparatus connecting unit 68n is "192. 168. 11" and the IP address of the n-th image-pickup-apparatus connecting unit 68n is "192. 168. 11. 1". The network segment of the image pickup apparatus 10-n connected to the n-th image-pickup-appara-tus connecting unit 68n is "192. 168. 11" and the IP address of the image pickup apparatus 10-n is "192. 168. 11. 1".

In the example indicated by reference sign g121 in FIG. 21, the network segments of the n-th image-pickup-appara-tus connecting unit 68n and the image pickup apparatus 10-n are the same. Therefore, the network segment and the IP address of the image pickup apparatus 10-n are changed by the changing unit 493 to values set in advance from a region indicated by reference sign g122 to a region indicated by reference sign g132 in FIG. 21. Specifically, the fourth segment of the IP address of the image pickup apparatus 10-n is changed to "192. 168. 11. 11", which is a value decided in advance, by the changing unit 493.

Note that "11" of the fourth segment of the IP address of the image pickup apparatus 10-n explained with reference to FIGS. 20 and 21 is an example. A value decided in advance of the fourth segment only has to be different from a value of the fourth segment of the IP address of the n-th image-pickup-apparatus connecting unit 68n. For example, the value of the fourth segment of the IP address of the image pickup apparatus 10-n may be allocated by the changing unit 493 at random or in order. For example, when it is determined that the value of the fourth segment of the IP address of the image pickup apparatus 10-n after the change is the same as the value of the fourth segment of the IP address of the n-th image-pickup-apparatus connecting unit 68n, the value may be further changed to be a value different from the value of the fourth segment of the IP address of the n-th image-pickup-apparatus connecting unit 68n.

The image processing apparatus 40A and the robot system 1 in this embodiment explained above determine, using network setting information of the image pickup apparatus 10-n and network setting information of the n-th image-pickup-apparatus connecting unit 68n to which the image pickup apparatus 10-n are connected, whether it is necessary to change the network setting information of the image pickup apparatus 10-n. When it is necessary to change the network setting information of the image pickup apparatus 10-n, the image processing apparatus 40A and the robot system 1 in this embodiment change the network setting information of the image pickup apparatus 10-n. Therefore, it is possible to automatically perform setting concerning a network for the image pickup apparatus 10-n.

Consequently, the user can use the robot system 1 without being aware of the setting of the image pickup apparatus 10-n connected to the image processing apparatus 40A and the n-th image-pickup-apparatus connecting unit 68n to which the image pickup apparatus 10-n is connected. When a plurality of image pickup apparatuses 10-n are used, the image processing apparatus 40A automatically performs setting for each of the image pickup apparatuses 10-n. Therefore, it is possible to reduce labor of the user for setting concerning a network.

Further, according to this embodiment, for example, image pickup apparatuses connected to other robot systems and other image processing apparatuses and used are connected to the image processing apparatus 40A in this embodiment. Then, the image processing apparatus 40A automatically performs the setting for each of the image pickup apparatuses 10-n. As a result, according to this embodiment, it is possible to automatically perform the setting for each of the image pickup apparatuses 10-n irrespective of the IP addresses set in the image pickup apparatuses 10-n connected to the image processing apparatus 40A. In this way, simply by connecting the image pickup apparatuses 10-n to the image processing apparatus 40A, the user can use the image pickup apparatuses 10-n in the image processing apparatus 40A without performing setting concerning a network.

Fourth Embodiment

In the third embodiment, the example is explained in which the setting concerning a network for the external-communication connecting unit 61 of the image processing apparatus 40A is performed in advance.

In this embodiment, an IP address of the external-communication connecting unit 61 is changed by, for example, a user. Note that the configuration of the image processing apparatus 40A is the same as the configuration shown in FIG. 15 in the third embodiment.

Figure 22:
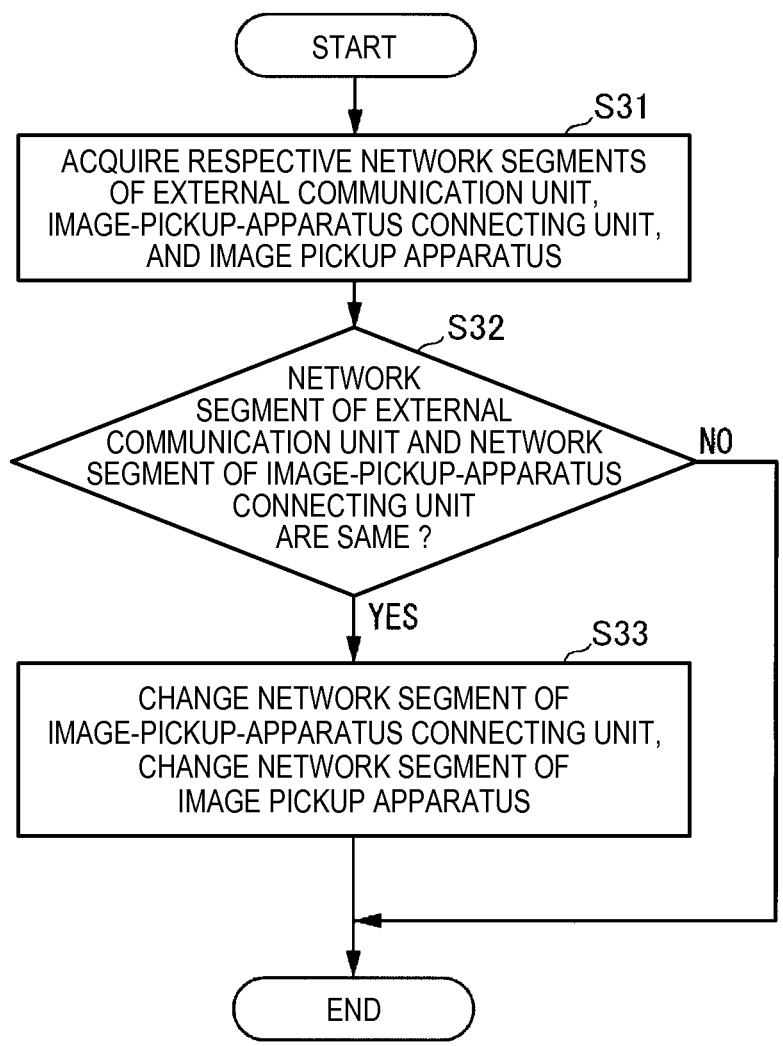
FIG. 22 is a flowchart of a processing procedure performed by an image-pickup-apparatus communication unit according to a fourth embodiment.

FIG. 22 is a flowchart of a processing procedure performed by the image-pickup-apparatus communication unit 69 according to this embodiment. Note that, in the following explanation, it is assumed that network segments respectively set in the n-th image-pickup-apparatus connecting units 68n and the image pickup apparatuses 10-n are the same and IP addresses respectively set in the n-th image-pickup-apparatus connecting units 68n and the image pickup apparatuses 10-n are different.

(Step S31) When the power supply of the image processing apparatus 40A is turned on, the acquiring unit 491 acquires network segments respectively set in the external-communication connecting unit 61, the n-th image-pickup-apparatus connecting units 68n, and the image pickup apparatuses 10-n.

(Step S32) The determining unit 492 determines whether the network segment of the external-communication connecting unit 61 is the same as the network segment of the n-th image-pickup-apparatus connecting units 68n. When determining that the network segment of the external-communication connecting unit 61 and the network segment of the n-th image-pickup-apparatus connecting units 68n are the same (YES in step S32), the determining unit 492 proceeds to step S33. When determining that the network segment of the external-communication connecting unit 61 and the network segment of the n-th image-pickup-apparatus connecting units 68n are different (NO in step S32), the determining unit 492 ends the processing without changing the IP respective addresses of the n-th image-pickup-apparatus connecting unit 68n and the image pickup apparatus 10-n.

(Step S33) The changing unit 493 applies, to the n-th image-pickup-apparatus connecting units 68n, processing for changing the network segment of the n-th image-pickup-apparatus connecting units 68n to a network segment different from the network segment of the external-communication connecting unit 61. The changing unit 493 sets (changes), as a new network segment of the n-th image-pickup-apparatus connecting units 68n, for example, a value obtained by adding 10 to a value of a third segment of the network segment of the external-communication connecting unit 61. Subsequently, the changing unit 493 changes the network segment of the image pickup apparatuses 10-n to a network segment same as the network segment set anew in the n-th image-pickup-apparatus connecting units 68n.

A specific example of processing performed by the image-pickup-apparatus communication unit 69 when the IP address of the external-communication connecting unit 61 is changed by the user is explained.

FIG. 23 is a diagram for explaining an example of network segments and IP addresses in which the network segments are the same in the external-communication connecting unit 61, the n-th image-pickup-apparatus connecting unit 68n, and the image pickup apparatus 10-n according to this embodiment.

A diagram of a region indicated by reference sign g141 in FIG. 23 is a diagram for explaining acquired network segments and IP addresses of the external-communication connecting unit 61, the n-th image-pickup-apparatus connecting unit 68n, and the image pickup apparatus 10-n. A diagram of a region indicated by reference sign g151 of FIG. 23 is a diagram for explaining a change of the network segments of the n-th image-pickup-apparatus connecting unit 68n and the image pickup apparatus 10-n.

In an example indicated by reference sign g141 in FIG. 23, the network segment of the external-communication connecting unit 61 is "192. 168. 11" and the IP address of the external-communication connecting unit 61 is "192. 168. 11. 3". The network segment of the n-th image-pickup-apparatus connecting unit 68n is "192. 168. 11" and the IP address of the n-th image-pickup-apparatus connecting unit 68n is "192. 168. 11. 1". The network segment of the image pickup apparatus 10-n connected to the n-th image-pickup-apparatus connecting unit 68n is "192. 168. 11" and the IP address of the image pickup apparatus 10-n is "192. 168. 11. 11".

In the example indicated by reference sign g141 in FIG. 23, the network segment of the external-communication connecting unit 61 is the same as the network segments of the n-th image-pickup-apparatus connecting unit 68n and the image pickup apparatus 10-n. Therefore, the network segment of the n-th image-pickup-apparatus connecting unit 68n is changed to a value "192. 168. 21", which is obtained by adding 10 to a value of the network segment of the external-communication connecting unit 61, by the changing unit 493 from a region indicated by reference sign g142 to a region indicated by reference sign g152 in FIG. 23. In this case, the fourth segment "1" is not changed from the region indicated by reference sign g142 to the region indicated by reference sign g152 in FIG. 23.

Further, the network segment of the image pickup apparatus 10-n is changed to a value same as a network segment set anew in the n-th image-pickup-apparatus connecting unit 68n by the changing unit 493 from a region indicated by reference sign g143 to a region indicated by reference sign g153 in FIG. 23. In this case, the fourth segment "11" is not changed from the region indicated by reference sign g143 to the region indicated by reference sign g153 in FIG. 23.

As explained above, according to this embodiment, the setting of the network segments of the n-th image-pickup-apparatus connecting unit 68n and the image pickup apparatus 10-n is dynamically changed according to the setting concerning a network for the external-communication connecting unit 61. Consequently, even when the setting concerning a network for the external-communication connecting unit 61 is changed by the user, the user does not have to change the IP addresses of the n-th image-pickup-apparatus connecting unit 68n and the image pickup apparatus 10-n. As a result, according to this embodiment, in the image processing apparatus 40A, it is possible to automatically set the IP address of the n-th image-pickup-apparatus connecting unit 68n to which the image pickup apparatus 10 is connected and the IP address of the image pickup apparatus 10.

Even when the IP address of the external-communication connecting unit 61 of the image processing apparatus 40A is changed, the image processing apparatus 40A and the robot system 1 according to the embodiment explained above determine, using network setting information of the external-communication connecting unit 61 and the network setting information of the image pickup apparatuses 10-n, whether it is necessary to change the network setting information of the image pickup apparatuses 10-n. When it is necessary to change the network setting information of the image pickup apparatuses 10-n, the image processing apparatus 40A and the robot system 1 in this embodiment change the network setting information of the image pickup apparatuses 10-n. Therefore, it is possible to automatically perform setting concerning a network for the image pickup apparatuses 10-n.

Note that, in this embodiment, the example is explained in which the image processing apparatus 40A includes the four n-th image-pickup-apparatus connecting units 68n. However, the number of n-th image-pickup-apparatus connecting units 68n only has to be one or more.

In this embodiment, the example is explained in which the image processing apparatus 40A includes the one external-communication connecting unit 61. However, the number of external-communication connecting units 61 may be two or more.

Fifth Embodiment

An embodiment of the invention is explained below with reference to the drawings. Note that components same as the components in the first embodiment are denoted by the same reference numerals and signs and explanation of the components is omitted or simplified.

The information processing apparatus 5 shown in FIG. 1 is communicably connected to the control apparatus 30 by a cable. Wired communication via a cable is performed, for example, according to a standard such as the Ethernet (registered trademark) or the USB. Note that the information processing apparatus 5 and the control apparatus 30 may be connected by radio communication performed according to a communication standard such as the Wi-Fi (registered trademark).

In the following explanation, a reset function and a data saving function of an image processing apparatus 40B in the robot system 1 configured as explained above are explained. The reset function of the image processing apparatus 40B indicates, for example, a function of restoring the image processing apparatus 40B to a predetermined state and indicates, for example, a function of restoring the image processing apparatus 40B to, for example, a state at the time of factory shipment. The data saving function of the image processing apparatus 40B indicates a function of causing a storing unit separate from the image processing apparatus 40B (detachably attachable to the image processing apparatus 40B) to store (save) at least a part of data concerning the image processing apparatus 40B stored in a storing unit that stores the data concerning the image processing apparatus 40B.

The hardware configuration of the image processing apparatus 40B is explained with reference to FIG. 24.

Figure 24:
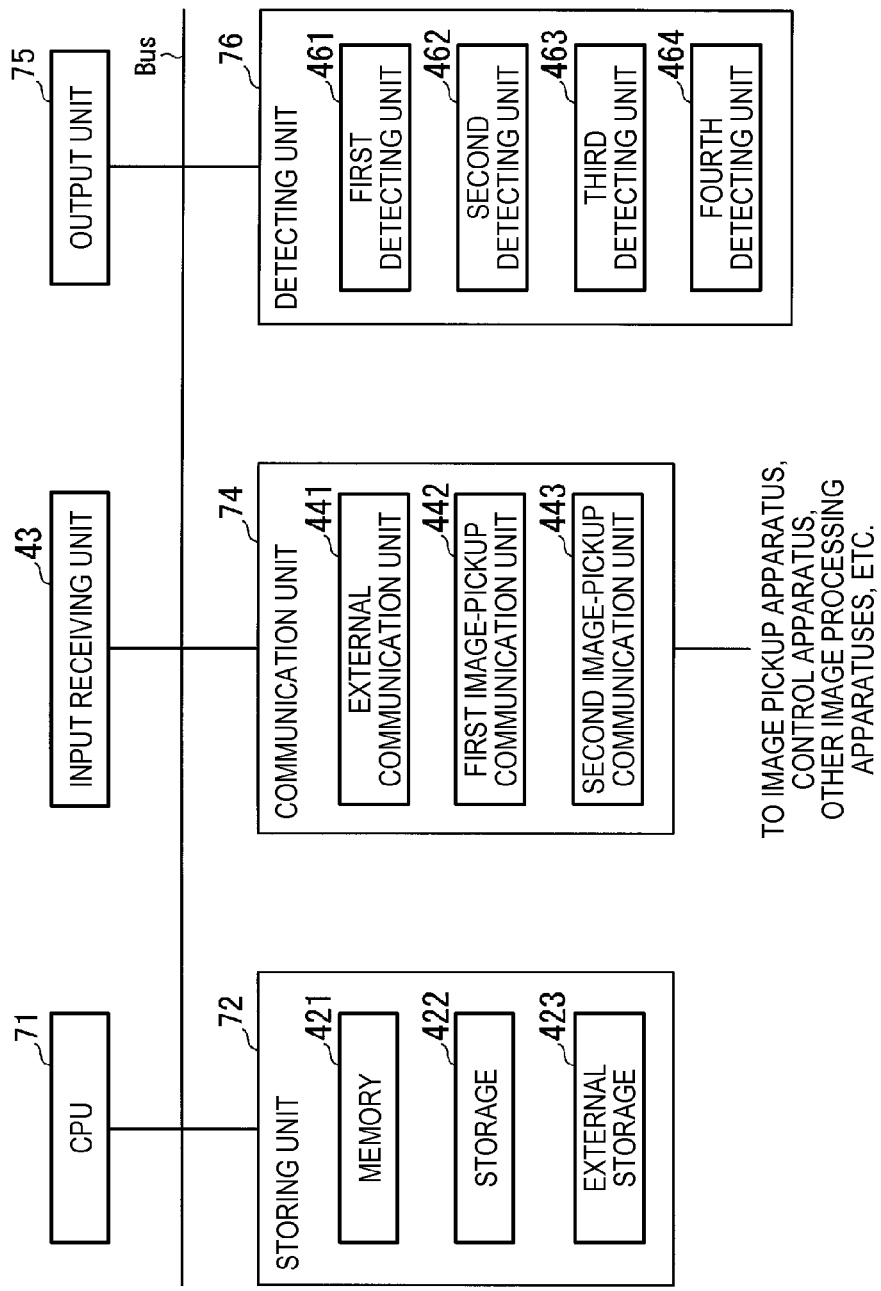
FIG. 24 is a diagram showing an example of the hardware configuration of an image processing apparatus according to a fifth embodiment.

FIG. 24 is a diagram showing an example of the hardware configuration of the image processing apparatus 40B according to this embodiment. The image processing apparatus 40B includes, for example, a CPU (Central Processing Unit) 71, a storing unit 72, the input receiving unit 43, a communication unit 74, an output unit 75, and a detecting unit 76. The image processing apparatus 40B performs communication with the control apparatus 30, other image processing apparatuses 40B, other apparatuses, and the like via the communication unit 74. These components are communicably connected to one another via a bus Bus. The CPU 71 executes various kinds of computer programs stored in the storing unit 72.

The storing unit 72 includes a memory 421 and a storage 422.

The memory 421 includes, for example, a DRAM (Dynamic Random Access Memory) or an SRAM (Static Random Access Memory). The memory 421 is a storage device directly accessible by mainly a processor such as the CPU 71 among functional units of the image processing apparatus 40B.

The storage 422 includes, for example, a HDD (Hard Disk Drive), an SSD (Solid State Drive), an EEPROM (Electrically Erasable Programmable Read-Only Memory), a ROM (Read-Only Memory), or a RAM (Random Access Memory). The storage 422 stores various kinds of information, images, computer programs, and the like to be processed by the image processing apparatus 40B.

An external storage 423 is an external storage device connected by, for example, a digital input/output port such as a USB.

Note that, like the external storage 423, the memory 421 and the storage 422 may be respectively external storage devices connected by, for example, a digital input/output port such as a USB instead of storage devices incorporated in the image processing apparatus 40B.

The input receiving unit 43 is, for example, one or more buttons capable of inputting a plurality of requests to the image processing apparatus 40B, for example, by being depressed or pressed for a long time. However, instead, the input receiving unit 43 may be a switch capable of selecting three or more states or may be a keyboard, a mouse, a touch pad, or other input devices. In that case, the input receiving unit 43 may be configured integrally with a display unit as a touch panel. In this example, the input receiving unit 43 is explained as one button.

The communication unit 74 includes an external communication unit 441, a first image-pickup communication unit 442, and a second image-pickup communication unit 443.

The external communication unit 441 includes, for example, digital input/output ports such as a plurality of Ethernet (registered trademark) ports or a plurality of USBs. In the explanation of this example, it is assumed that the external communication unit 441 includes two Ethernet (registered trademark) ports.

The first image-pickup communication unit 442 includes digital input/output ports such as a plurality of Ethernet (registered trademark) ports or a plurality of USBs. The ports are dedicated ports for performing communication with the image pickup apparatus 10. Note that the first image-pickup communication unit 442 may be a dedicated port for performing communication with other apparatuses such as a sound acquiring apparatus for acquiring sound.

The second image-pickup communication unit 443 includes digital input/output ports such as a plurality of Ethernet (registered trademark) ports or a plurality of USBs. The ports are dedicated ports for performing communication with the image pickup apparatus 10. Note that the second image-pickup communication unit 443 may be a dedicated port for performing communication with other apparatuses such as a sound acquiring apparatus for acquiring sound.

The first image-pickup communication unit 442 and the second image-pickup communication unit 443 are different in communication standards of the ports thereof. In this example, it is assumed that the first image-pickup communication unit 442 includes four Ethernet (registered trademark) ports and the second image-pickup communication unit 443 includes four USB ports.

The output unit 75 includes a plurality of LEDs and notifies various kinds of information with lighting states (e.g., extinguishing, lighting, and blinking) of the LEDs. In the explanation of this example, it is assumed that the output unit 75 includes one green LED and one red LED. However, colors of the LEDs may be respectively other colors or may be the same color. Note that, instead of including the LEDs, the output unit 75 may include, for example, a liquid crystal display panel or an organic EL (Electro Luminescence) display panel or may include a speaker that outputs sound. In the following explanation, for convenience of explanation, the green LED included in the output unit 75 is referred to as state LED and the red LED included in the output unit 75 is referred to as warning LED.

The detecting unit 76 is a plurality of sensors for detecting physical quantities serving as indexes indicating states of a respective plurality of pieces of hardware included in the image processing apparatus 40B. In this example, the plurality of pieces of hardware included in the image processing apparatus 40B indicate a not-shown cooling fan for the CPU 71, a not-shown system fan that cools the inside of a housing of the image processing apparatus 40B, the CPU 71, and a not-shown battery for BIOS (Basic Input Output System) backup incorporated in the image processing apparatus 40B. However, the plurality of pieces of hardware may be combinations of a part of these pieces of hardware, may be combinations of these pieces of hardware and other pieces of hardware, or may be one or more pieces of other hardware.

In this example, the physical quantities serving as the indexes indicating the states of the hardware are the number of revolutions of the cooling fan for the CPU 71, the number of revolutions of the system fan that cools the inside of the housing of the image processing apparatus 40B, the temperature of the CPU 71, and a voltage value of the battery for BIOS backup incorporated in the image processing apparatus 40B. However, instead, the physical quantities may be combinations of these physical quantities, may be combinations of these physical quantities and other physical quantities, or may be one or more other physical quantities.

In this embodiment, the detecting unit 76 includes, for example, four sensors, i.e., a first detecting unit 461, a second detecting unit 462, a third detecting unit 463, and a fourth detecting unit 464.

The first detecting unit 461 is, for example, a number-of-revolutions sensor that detects the number of revolutions of the cooling fan for the CPU 71.

The second detecting unit 462 is, for example, a number-of-revolutions sensor that detects the number of revolutions of the system fan that cools the inside of the housing of the image processing apparatus 40B.

The third detecting unit 463 is, for example, a temperature sensor that detects the temperature of the CPU 71.

The fourth detecting unit 464 is, for example, a voltage sensor that detects the voltage value of the battery for BIOS backup incorporated in the image processing apparatus 40B.

The functional configuration of the image processing apparatus 40B is explained with reference to FIG. 25.

Figure 25:
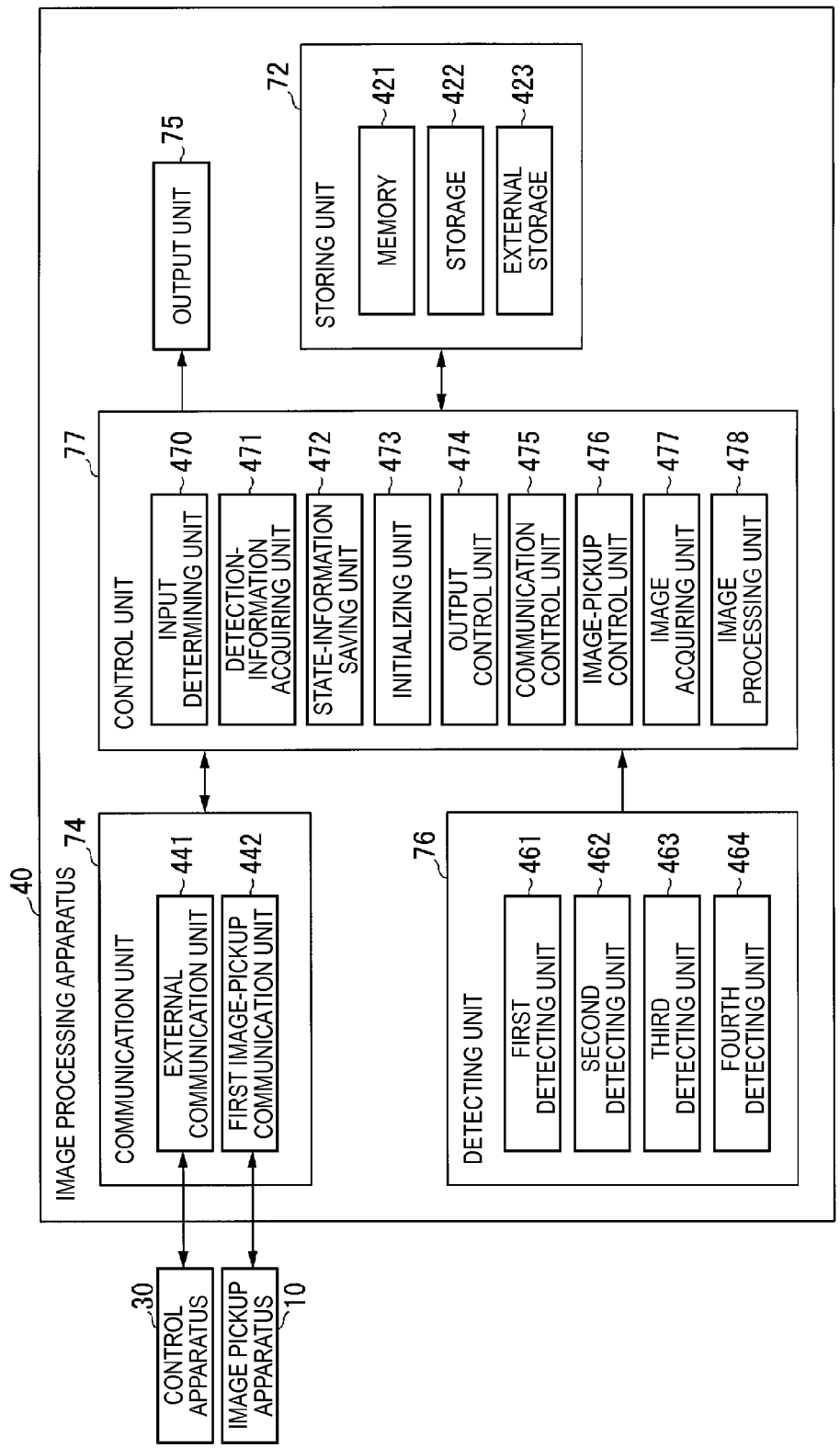
FIG. 25 is a diagram showing an example of the functional configuration of the image processing apparatus.

FIG. 25 is a diagram showing an example of the functional configuration of the image processing apparatus 40B. The image processing apparatus 40B includes the storing unit 72, the communication unit 74, the output unit 75, the detecting unit 76, and a control unit 77. Note that, in the explanation of this example, it is assumed that the image pickup apparatus 10 is connected to the first image-pickup communication unit 442 and an image pickup apparatus is not connected to the second image-pickup communication unit 443.

The control unit 77 controls the entire image processing apparatus 40B. The control unit 77 includes an input determining unit 470, a detection-information acquiring unit 471, a state-information saving unit 472, an initializing unit 473, an output control unit 474, a communication control unit 475, an image-pickup control unit 476, an image acquiring unit 477, and an image processing unit 478.

A part or all of the functional units included in the control unit 77 are realized by, for example, the CPU 71 executing a computer program stored in the storage 422 of the storing unit 72. Apart of the functional units may be hardware functional units such as an LSI (Large Scale Integration) and an ASIC (Application Specific Integrated Circuit). Note that the control unit 77 is a part of a processing unit. In the explanation of this example, it is assumed that the image pickup apparatus 10 is connected to the first image-pickup communication unit 442 and an image pickup apparatus is not connected to the second image-pickup communication unit 443.

The input determining unit 470 determines what kind of operation from the user is received by the input receiving unit 43. In this example, the input determining unit 470 determines whether, as time of the operation from the user received by the input determining unit 470, time from depression to release of a button is less than a predetermined time T1 or the predetermined time T1 or more.

The detection-information acquiring unit 471 cyclically (e.g., every time one minute elapses) acquires physical quantities respectively detected by the first to fourth detecting units 461 to 464 included in the detecting unit 76. In addition, the detection-information acquiring unit 471 may be configured to cyclically (e.g., every time one minute elapses) acquire information indicating free capacities of storage regions from the respective memories 421 and the storage 422 included in the storing unit 72.

In the following explanation, for convenience of explanation, a plurality of physical quantities acquired from the detecting unit 76 are collectively referred to as detection information. Note that the detection-information acquiring unit 471 may be configured to continue to always acquire the detection information or may be configured to acquire the detection information at predetermined time instead of being configured to cyclically acquire the detection information. The detection-information acquiring unit 471 causes the storage 422 of the storing unit 72 to store, as history information of hardware monitoring, the detection information acquired from the detecting unit 76.

When the input determining unit 470 determines that the time from depression to release of the button of the input receiving unit 43 is less than the predetermined time T1, the state-information saving unit 472 determines whether the external storage 423 is connected to the image processing apparatus 40B. When determining that the external storage 423 is connected to the image processing apparatus 40B, the state-information saving unit 472 causes the external storage 423 to store (save) a part or all of data concerning the image processing apparatus 40B. On the other hand, when determining that the external storage 423 is not connected to the image processing apparatus 40B, the state-information saving unit 472 stays on standby without performing anything.

When the input determining unit 470 determines that the time from depression to release of the button of the input receiving unit 43 is the predetermined time T1 or more, the initializing unit 473 deletes at least a part of the data concerning the image processing apparatus 40B stored in the storage 422.

When the saving of the data concerning the image processing apparatus 40B in the external storage 423 is executed by the state-information saving unit 472, the output control unit 474 changes an output state (in this example, a lighting state) of the output unit 75 according to success or failure of the saving.

The communication control unit 475 outputs information indicating a position and a posture of the work target M calculated by the image processing unit 478 to the control apparatus 30.

The image-pickup control unit 476 controls the image pickup apparatus 10 to pick up an image of a range including the work target M via the first image-pickup communication unit 442. When some image pickup apparatus Z is connected to the second image-pickup communication unit 443, the image-pickup control unit 476 controls, via the second image-pickup communication unit 443, the image pickup apparatus Z to pick up an image of a range in which the image pickup apparatus Z can pick up an image.

The image acquiring unit 477 acquires a picked-up image from the image pickup apparatus 10 via the first image-pickup communication unit 442. When the image pickup apparatus Z is connected to the second image-pickup communication unit 443, the image acquiring unit 477 acquires a picked-up image from the image pickup apparatus Z via the second image-pickup communication unit 443.

The image processing unit 478 performs, on the basis of the picked-up image acquired by the image acquiring unit 477, image processing for calculating a position and a posture of the work target M.

Initialization processing and data saving processing for the image processing apparatus 40B performed by the control unit 77 are explained below with reference to FIG. 26.

Figures 26, 27:
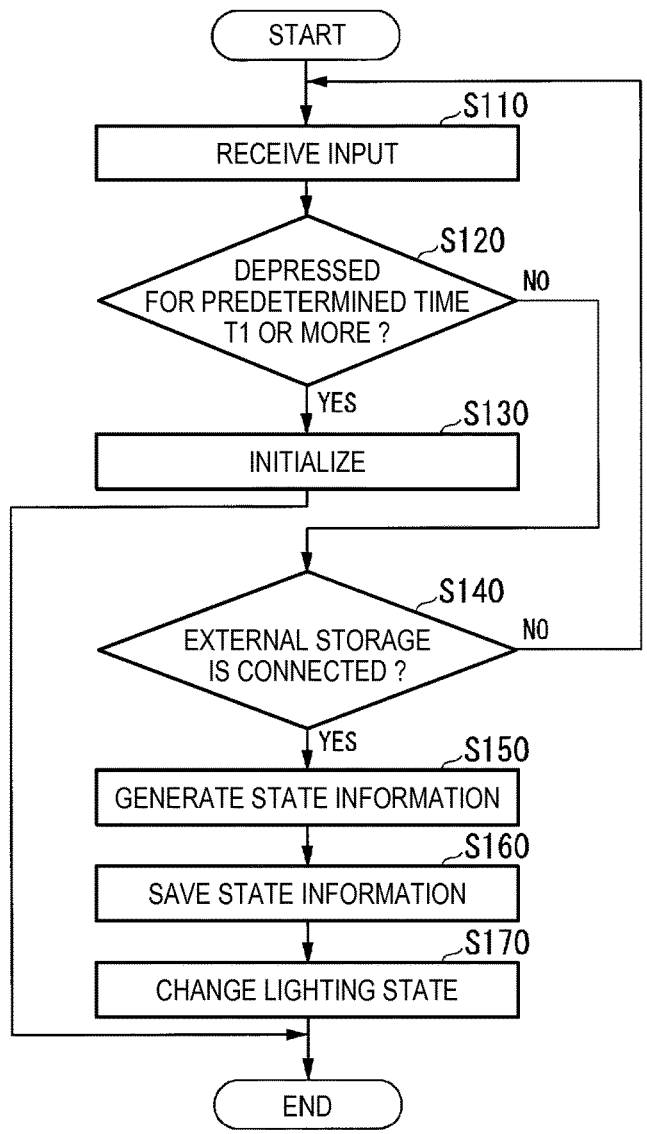
FIG. 26 is a flowchart for explaining an example of a flow of initialization processing and data saving processing of the image processing apparatus performed by a control unit.
FIG. 27 is a table showing an example of rules for a change of a lighting state of an output unit by an output control unit.

FIG. 26 is a flowchart for explaining an example of a flow of the initialization processing and the data saving processing for the image processing apparatus 40B performed by the control unit 77. First, the control unit 77 receives operation from the user with the input receiving unit 43 (step S110).

The operation from the operator received from the input receiving unit 43 by the control unit 77 indicates that the user depresses and then releases the button included in the input receiving unit 43. Note that, in this embodiment, the input receiving unit 43 is configured to receive the operation from the user at a point in time when the user releases the button included in the input receiving unit 43. However, instead, the input receiving unit 43 may be configured to receive the operation from the user when an elapsed time in which the user continues to depress the button included in the input receiving unit 43 is a predetermined time T2 or more.

Subsequently, the input determining unit 470 determines whether time from depression to release of the button is the predetermined time T1 or more in the operation (i.e., depression of the button) from the user received by the input receiving unit 43 in step S110 (step S120). The predetermined time T1 is, for example, ten seconds but may be other times. When it is determined that the time from depression to release of the button is the predetermined time T1 or more (i.e., the button is pressed for a long time) (Yes in step S120), the initializing unit 473 deletes (i.e., initializes) at least a part of the data concerning the image processing apparatus 40B stored in the storage 422 (step S130), adds the initialization of the image processing apparatus 40B to information indicating a history related to the image processing apparatus 40B explained below, and ends the processing. Note that, when it is determined that the time from depression to release of the button is the predetermined time T1 or more (i.e., the button is pressed for a long time), for example, a reset signal is input.

Processing by the initializing unit 473 for deleting at least a part of the data concerning the image processing apparatus 40B stored in the storage 422 is explained. In this example, the data concerning the image processing apparatus 40B includes the history information of the hardware monitoring, setting information on the image processing apparatus 40B side corresponding to display content of a GUI displayed on the information processing apparatus 5 (e.g., a type of information displayed on the GUI), information related to image processing performed by the image processing apparatus 40B, and a system (OS) log.

The history information of the hardware monitoring includes, for example, information indicating histories of the temperature of the CPU 71, the number of revolutions of the cooling fan for the CPU 71, the number of revolutions of the system fan that cools the inside of the housing of the image processing apparatus 40B, a voltage value of the battery for BIOS backup incorporated in the image processing apparatus 40B, and the like. The information related to the image processing performed by the image processing apparatus 40B includes setting information of the image pickup apparatus 10, an image processing project, image data used for executed image processing (e.g., a picked-up image picked up by the image pickup apparatus 10 and an image acquired from the information processing apparatus 5), and information indicating a history related to the image processing apparatus 40B.

The setting information of the image pickup apparatus 10 includes, for example, shutter speed and exposure and the number of times of image pickup per unit time. The image processing project indicates, for example, a group of setting information, a computer program, a library, and the like for executing image processing. The information indicating the history related to the image processing apparatus 40B includes information indicating executed processing, information indicating the order of the executed processing, information indicating an image pickup apparatus used for the executed processing, information indicating successor failure of the executed processing, and information indicating that the image processing apparatus 40B is initialized.

In the initialization processing, for example, the initializing unit 473 leaves only the information indicating the history related to the image processing apparatus 40B among the information included in the data concerning the image processing apparatus 40B and deletes the other information from the storage 422. By deleting the information other than the information indicating the history related to the image processing apparatus 40B from the storage 422 in this way, it is possible to easily restore the image processing apparatus 40B to a state at the time of factory shipment (i.e., initialize the image processing apparatus 40B). It is possible to provide the user with the information indicating the history related to the image processing apparatus 40B necessary in searching for a cause of a trouble.

Note that the initializing unit 473 may be configured to leave, in addition to the information indicating the history related to the image processing apparatus 40B, a part of the other information included in the data concerning the image processing apparatus 40B in the storage 422. In that case, the control unit 77 may be configured to receive operation from the user with the input receiving unit 43 and select information to be left in the storage 422 from the data concerning the image processing apparatus 40B on the basis of the received operation or may be configured to leave, in the storage 422, a combination of predetermined information among the information included in the data concerning the image processing apparatus 40B. Consequently, instead of being restored to the state at the time of factory shipment, the image processing apparatus 40B can be restored to another predetermined state (e.g., a state immediately after the user performs the setting for performing the image processing).

In this example, when the button included in the input receiving unit 43 continues to be depressed for the predetermined time T1 (e.g., ten seconds) or more by the user, the output control unit 474 controls the state LED included in the output unit 75 to blink five times (at this point, extinguishes the error LED). The predetermined time T1 is an example of the predetermined time in the aspect of the invention. When the user releases the button while the state LED blinks five times in this way, the initializing unit 473 executes initialization of the image processing apparatus 40B explained in step S130. Consequently, the control unit 77 can suppress the user from initializing the image processing apparatus 40B by mistake.

Referring back to FIG. 26, when it is determined in step S120 that the time from depression to release of the button is less than the predetermined time T1 (i.e., the button is not pressed for a long time) (No in step S120), the state-information saving unit 472 determines whether the external storage 423 is connected to the image processing apparatus 40B (step S140). Note that, when it is determined that the time from depression to release of the button is the predetermined time T1 or less (i.e., the button is not pressed for a long time), for example, a data saving signal is input. When it is determined that the external storage 423 is not connected to the image processing apparatus 40B (No in step S140), the control unit 77 returns to step S110 and stays on standby.

On the other hand, when it is determined that the external storage 423 is connected to the image processing apparatus 40B (Yes in step S140), the state-information saving unit 472 generates state information on the basis of the data concerning the image processing apparatus 40B (step S150). The state information is information obtained by collectively compressing the data concerning the image processing apparatus 40B and is, for example, a file compressed on the basis of a ZIP file format or the like. Note that, in this example, date and time is given to a file name of the state information. However, instead, other file names may be used.

Subsequently, the state-information saving unit 472 saves the state information generated in step S150 in the external storage 423 (step S160). In the following explanation, for convenience of explanation, it is assumed that the saving of the state information in the external storage 423 by the state-information saving unit 472 in step S160 is successful. Subsequently, the output control unit 474 performs control to change the lighting state of the output unit 75 according to success or failure of the saving of the state information in the external storage 423 by the state-information saving unit 472 in step S160 (step S170).

Processing for changing the lighting state of the output unit 75 by the output control unit 474 in step S170 is explained with reference to FIG. 27.

FIG. 27 is a table showing an example of rules for changing the lighting state of the output unit 75 by the output control unit 474. The output control unit 474 changes, on the basis of a correspondence relation shown in FIG. 27, the lighting state of the output unit 75 according to the success or failure of the saving of the state information in the external storage 423 by the state-information saving unit 472 in step S160.

More specifically, in this embodiment, when the saving of the state information in the external storage 423 by the state-information saving unit 472 in step S160 is successful, the output control unit 474 extinguishes the warning LED of the output unit 75 and blinks the state LED of the output unit 75 at high speed (at an interval of 300 ms). On the other hand, when the saving of the state information in the external storage 423 by the state-information saving unit 472 in step S160 is unsuccessful, the output control unit 474 blinks the warning LED of the output unit 75 at high speed (at an interval of 300 ms) and extinguishes the state LED of the output unit 75. Consequently, the image processing apparatus 40B can easily notify the user of the success or failure of the saving of the state information. Note that the change of the lighting state of the output unit 75 by the output control unit 474 may be a change to another lighting state instead of the change based on the rules shown in FIG. 27.

In step S120 shown in FIG. 26, the input determining unit 470 may determine, when the user depresses the button, another state of the operation by the user, for example, determine timing when the button is depressed and timing when the button is released. In such a configuration, when the timing when the button is released is determined, the input determining unit 470 also determines whether the predetermined time T1 or more has elapsed after the button is depressed.

When the input determining unit 470 is configured as explained above, for example, when the input determining unit 470 determines that the button is released and the predetermined time T1 or more has elapsed after the button is depressed, the initializing unit 473 performs the processing in step S130. For example, when the input determining unit 470 determines that the button is depressed, the state-information saving unit 472 performs the processing in steps S140 to S170.

As explained above, when the reset signal is input (in this example, when the time from depression to release of the button is the predetermined time T1 or more), the robot system 1 in this embodiment deletes at least apart of the data related to the image processing apparatus 40B stored in the storage 422 of the storing unit 72. Consequently, the image processing apparatus 40B can be easily restored to a predetermined state.

When the reset signal is input (in this example, when the time from depression to release of the button is the predetermined time T1 or more), the image processing apparatus 40B deletes at least a part of the history information of the hardware monitoring of the image processing apparatus 40B stored in the storage 422 of the storing unit 72, the setting information on the image processing apparatus 40B side corresponding to the display content of the GUI displayed on the information processing apparatus 5, the information related to the image processing performed by the image processing apparatus 40B, and a system log. Consequently, the image processing apparatus 40B can be restored to a predetermined state based on a part or all of the history information of the hardware monitoring of the image processing apparatus 40B, the setting information on the image processing apparatus 40B side corresponding to the display content of the GUI displayed on the information processing apparatus 5, the information related to the image processing performed by the image processing apparatus 40B, and the system log.

When the data saving signal is input (in this example, when the time from depression to release of the button is less than the predetermined time T1), the image processing apparatus 40B stores, in the external storage device (in this example, the external storage 423), at least a part of the data concerning the image processing apparatus 40B stored in the storage 422 of the storing unit 72. Consequently, the image processing apparatus 40B can cause the user to check a state of the image processing apparatus 40B on the basis of the data concerning the image processing apparatus 40B stored in the external storage device.

When a predetermined button among the one or more buttons included in the input receiving unit 43 is released before the predetermined time T1 elapses from the depression of the bottom, the image processing apparatus 40B inputs the data saving signal to the processing unit. When the predetermined button is released after the predetermined time T1 or more elapses from the depression of the button, the image processing apparatus 40B inputs the reset signal to the control unit 77. Consequently, the image processing apparatus 40B can select, according to the time from depression to release of the predetermined button, processing performed by the control unit 77.

When the predetermined button continues to be depressed for the predetermined time T1 or more, the image processing apparatus 40B changes the output state (in this example, the lighting state) of the output unit 75 for a predetermined time. Consequently, the image processing apparatus 40B can notify the user whether the predetermined button continues to be depressed for the predetermined time T1 or more.

The image processing apparatus 40B changes the output state (in this example, the lighting state) of the output unit 75 according to deletion of at least a part of the data concerning the image processing apparatus 40B by the initializing unit 473 or success or failure of storage in the external storage device (in this example, the external storage 423) of at least a part of the data concerning the image processing apparatus 40B by the state-information saving unit 472. Consequently, the image processing apparatus 40B can notify the user of the deletion of at least a part of the data concerning the image processing apparatus 40B by the initializing unit 473 or the success or failure of storage in the external storage device of at least a part of the data concerning the image processing apparatus 40B by the state-information saving unit 472.

When the external storage device (in this example, the external storage 423) is not connected to the image processing apparatus 40B, even when the data saving signal is input, the image processing apparatus 40B does not perform the storage in the external storage device of at least a part of the data concerning the image processing apparatus 40B. Consequently, the image processing apparatus 40B can suppress continuation of the processing of the state-information saving unit 472 due to wrong operation in a state in which preparation for causing the external storage device to store at least a part of the data concerning the image processing apparatus 40B is not completed.

Sixth Embodiment

An embodiment of the invention is explained below with reference to the drawings. In the following explanation, a network means a LAN. Network segments, which are ranges obtained by logically dividing the LAN, are referred to as sub-networks. A network address for identifying an apparatus that transmits and receives data on the network is simply referred to as address. An IP address is an example of the network address. Note that components same as the components in the first embodiment are denoted by the same reference numerals and signs and explanation of the components is omitted or simplified.

Figure 28:
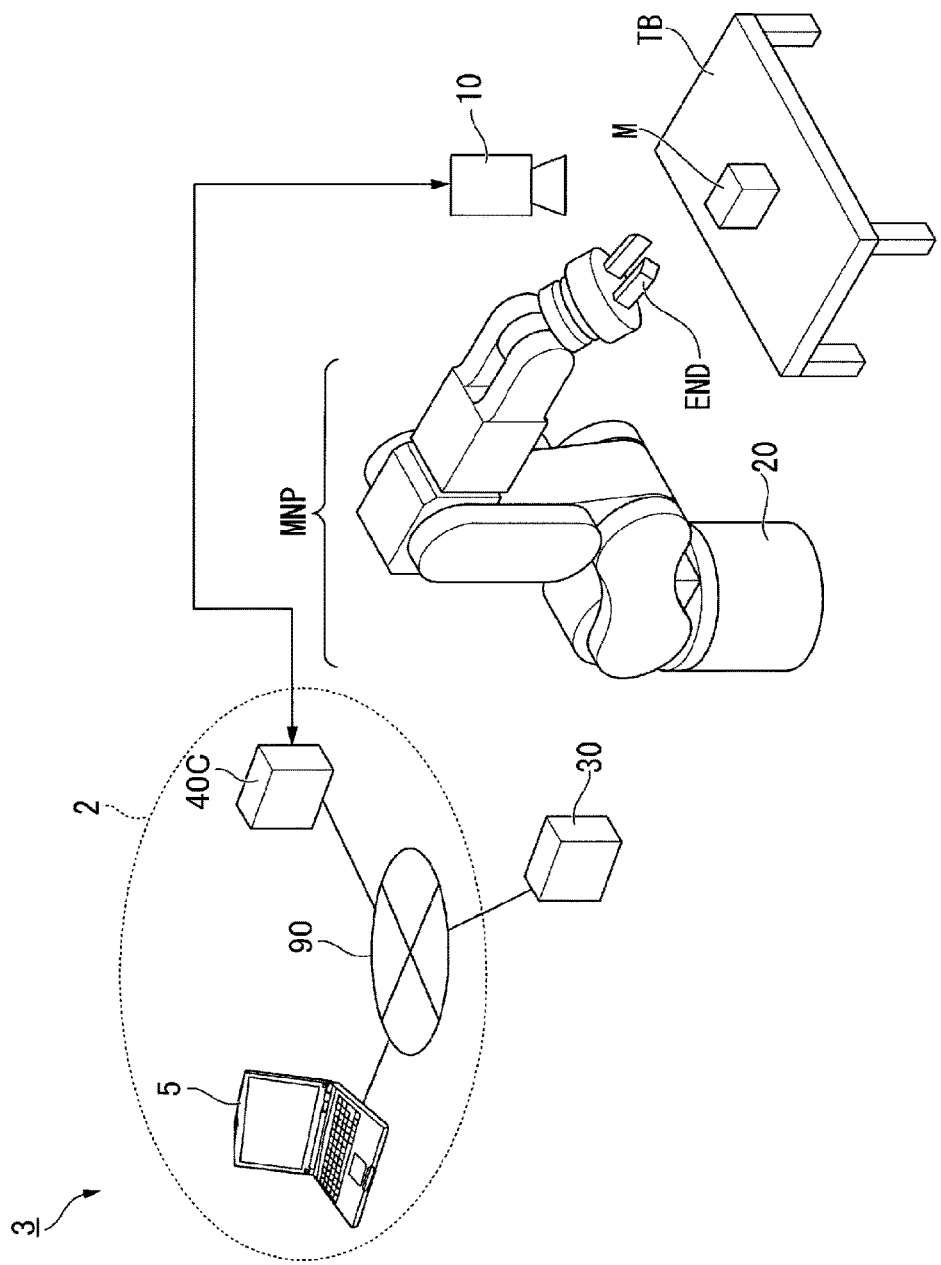
FIG. 28 is a configuration diagram showing a robot system according to a sixth embodiment.

FIG. 28 is a configuration diagram showing a robot system 3 according to this embodiment. The robot system 3 includes an image processing system 2, the image pickup apparatus 10, the robot 20, and the control apparatus 30.

The image processing system 2 includes an image processing apparatus 40C and the information processing apparatus 5.

The control apparatus 30, the image processing apparatus 40C, and the information processing apparatus 5 are communicably connected via a network 90. The network 90 may be a wired network or may be a wireless network. Wired communication via the network 90 is performed, for example, according to a system conforming to a standard such as the Ethernet (registered trademark) or the USB. Radio communication via the network 90 is performed according to a system conforming to a standard such as the Wi-Fi (registered trademark).

The robot system 3 receives operation from a user with the information processing apparatus 5 and causes the robot 20 to perform predetermined work on the basis of the received operation. The predetermined work indicates, for example, as shown in FIG. 28, work for rearranging, in a predetermined position, the work target M arranged on the upper surface of the workbench TB. However, the predetermined work may be other work. The workbench TB is, for example, a stand such as a table. Instead of the workbench TB, an object on which the work target M can be arranged, for example, a floor surface or a wall surface may be used.

The work target M is an object that can be gripped by the robot 20 and is, for example, a component of an industrial product such as a screw or a bolt. The work target M is not limited to the component and may be other objects. In FIG. 28, the work target M is shown as a rectangular parallelepiped object. The robot system 3 causes the robot 20 to perform the predetermined work on the basis of a position and a posture of the work target M calculated by the image processing apparatus 40C.

The number of the image pickup apparatuses 10 is not limited to one and may be two or more. In the following explanation, one image pickup apparatus or a group of two or more image pickup apparatuses is generally referred to as image pickup apparatus 10. An individual image pickup apparatus is referred to as camera.

The robot 20 may be communicably connected to the control apparatus 30 via a cable. The network 90 may be a wired network or may be a wireless network. Wired communication via the network 90 is performed, for example, according to a system conforming to a standard such as the Ethernet (registered trademark) or the USB. Radio communication via the network 90 is performed according to a system conforming to a standard such as the Wi-Fi (registered trademark). Note that the robot 20 and the control apparatus 30 may be connected by a cable separate from the network 90 or by other networks. The robot 20 is connected to the control apparatus 30 set on the outside of the robot 20 as shown in FIG. 28. However, instead of this configuration, the control apparatus 30 may be incorporated in the robot 20.

The control apparatus 30 acquires an object code from the information processing apparatus 5, executes the acquired object code, and controls the robot 20 to perform the predetermined work. More specifically, in this example, the control apparatus 30 executes the object code and requests the image processing apparatus 40C to perform, on the basis of a picked-up image signal acquired from the image pickup apparatus 10, image processing for calculating a position and a posture of the work target M.

After the image processing by the image processing apparatus 40C ends, the control apparatus 30 acquires information indicating the position and the posture of the work target M from the image processing apparatus 40C. The control apparatus 30 generates a control signal for controlling the operation of the robot 20 on the basis of the acquired position and the acquired posture of the work target M and outputs the generated control signal to the robot 20. The robot 20 is controlled to perform the predetermined work.

Note that the control apparatus 30 and the robot 20 may be connected by a cable separate from the network 90 or by other networks. The robot 20 is connected to the control apparatus 30 set on the outside of the robot 20 as shown in FIG. 28. However, instead of this configuration, the control apparatus 30 may be incorporated in the robot 20.

The image processing apparatus 40C acquires a picked-up image signal from the image pickup apparatus 10 according to a request from the control apparatus 30. After acquiring the picked-up image signal from the image pickup apparatus 10, the image processing apparatus 40C applies predetermined image processing to the acquired picked-up image signal and calculates a position and a posture of the work target M. The image processing apparatus 40C outputs information indicating the calculated position and the calculated posture of the work target M to the control apparatus 30.

Note that the image processing apparatus 40C may cyclically acquire the picked-up image signal from the image pickup apparatus 10 instead of performing the processing explained above according to the request from the control apparatus 30. In this case, the image processing apparatus 40C applies, every time a picked-up image is acquired, the image processing to the acquired picked-up image and calculates a position and a posture of the work target M. The image processing apparatus 40C outputs the calculated position and the calculated posture of the work target M to the control apparatus 30 according to a request from the control apparatus 30.

Configuration of the Image Processing Apparatus

The configuration of the image processing apparatus 40C according to this embodiment is explained.

Figure 29:
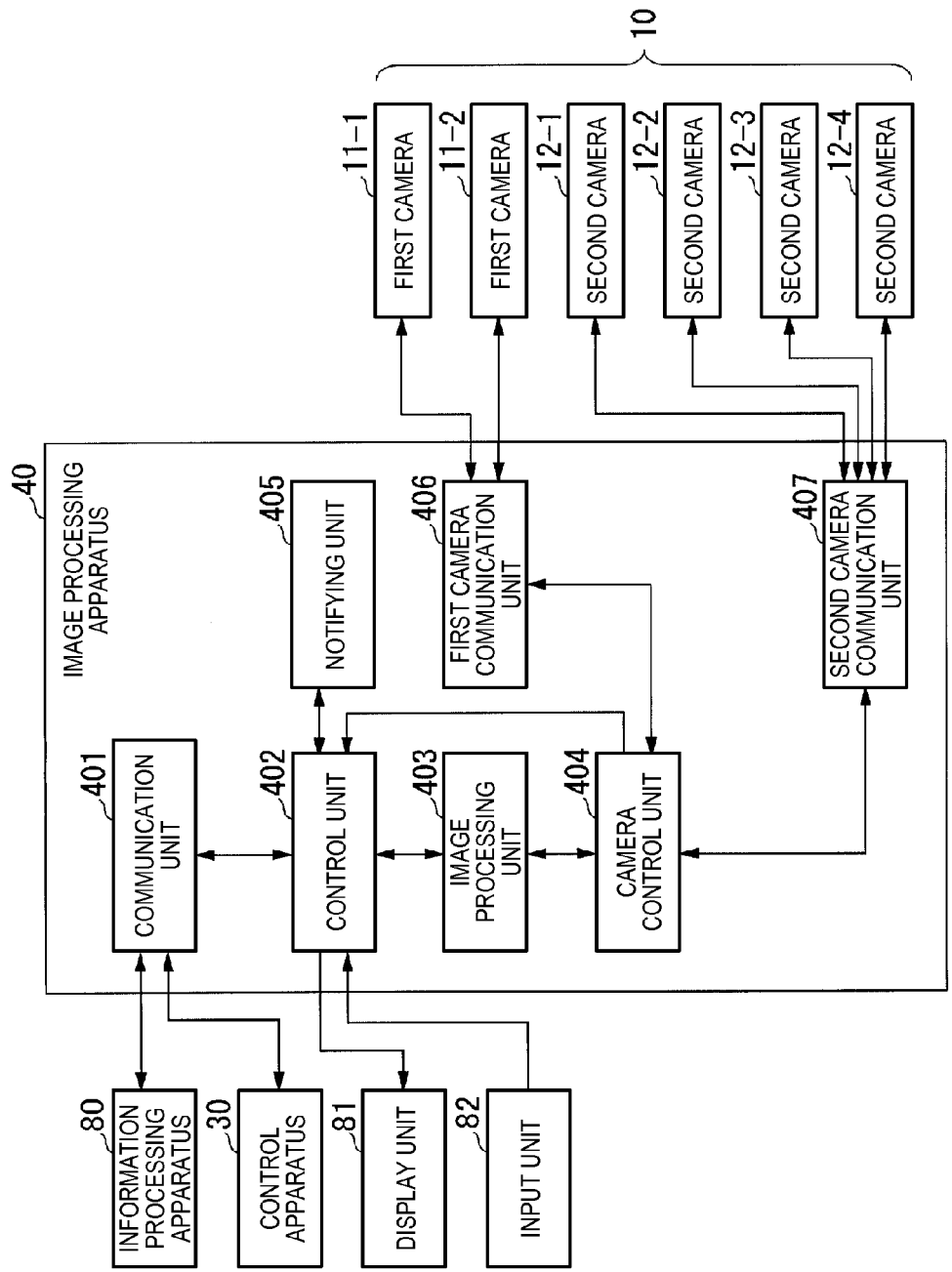
FIG. 29 is a block diagram showing the configuration of an image processing apparatus according to the sixth embodiment.

FIG. 29 is a block diagram showing the configuration of the image processing apparatus 40C according to this embodiment.

The image processing apparatus 40C includes a communication unit 401, a control unit 402, an image processing unit 403, a camera control unit 404, a notifying unit 405, a first camera communication unit 406, and a second camera communication unit 407.

The communication unit 401 controls communication of the control apparatus 30 and the information processing apparatus 5. The communication unit 401 outputs various reception signals received from the control apparatus 30 and the information processing apparatus 5 to the control unit 402. The communication unit 401 transmits various kinds of transmission signals input from the control unit 402 to the control apparatus 30 and the information processing apparatus 5. The communication unit 401 retains network setting information of the image processing apparatus 40C. The network setting information includes, for example, an IP address, an IP mask, and a gateway address of the image processing apparatus 40C. Note that an address of the image processing apparatus 40C on the network 90 and a sub-network to which the image processing apparatus 40C belongs only have to be specified from the network setting information. The entire IP address indicates an address. A part of the IP address indicates a sub-network. The IP mask indicates a range indicating the sub-network in the IP address. The IP mask is also called sub-network mask.

When receiving a search packet from the information processing apparatus 5, the control unit 402 reads the network setting information from the communication unit 401 and reads camera information from the camera control unit 404. The control unit 402 generates a search response packet including the read network setting information and the read camera information. The control unit 402 decides an address of a return destination according to whether a sub-network to which the information processing apparatus 5, which is the transmission source of the search packet, belongs and the sub-network to which the image processing apparatus 40C belongs are the same. Specifically, when the sub-network to which the information processing apparatus 5 belongs and the sub-network to which the image processing apparatus 40C belongs are the same, the control unit 402 decides an address of the information processing apparatus 5 as the address of the return destination. When the sub-network to which the information processing apparatus 5 belongs and the sub-network to which the image processing apparatus 40C belongs are different, the control unit 402 designates a predetermined broadcast address as the address of the return destination. The predetermined broadcast address is, for example, a broadcast address specified by a UDP (User Datagram Protocol). The control unit 402 transmits the generated search response packet to the address of the return destination. Therefore, when the sub-network to which the information processing apparatus 5 belongs and the sub-network to which the image processing apparatus 40C belongs are the same, the search response packet is transmitted to only the information processing apparatus 5 (unicast). When the sub-network to which the information processing apparatus 5 belongs and the sub-network to which the image processing apparatus 40C belongs are different, the search response packet is simultaneously transmitted to all apparatuses connected to the network 90 (broadcast). In the following explanation, transmission of the same data to all apparatuses connected to a network is referred to as broadcast.

When receiving a change packet from the information processing apparatus 5, the control unit 402 determines, according to whether a MAC address included in the received change packet and a MAC address of the image processing apparatus 40C are the same, whether network setting is changed. MAC addresses are identification information for uniquely identifying respective apparatuses. As explained below, the received change packet includes a MAC address of the image processing apparatus 40C selected in the information processing apparatus 5. When the MAC address included in the received change packet and the MAC address of the image processing apparatus 40C are the same, the control unit 402 changes the network setting information set in the communication unit 401 to network setting information included in the received change packet. When the MAC address included in the received change packet and the MAC address of the image processing apparatus 40C are different, the control unit 402 neglects the received change packet and does not change the network setting information set in the communication unit 401.

When the network setting information is changed, the control unit 402 generates a change response packet including change processing result information indicating a processing result related to the change and the MAC address of the image processing apparatus 40C. The change processing result information is information indicating whether the processing is successful. The control unit 402 broadcasts the generated change response packet to the network 90. Note that, when succeeding in the change of the network setting information, the control unit 402 may designate only the information processing apparatus 5, which is the transmission source of the change packet, as a transmission destination and transmit the change response packet (unicast). In both the cases, the change response packet is transmitted to the information processing apparatus 5.

Note that the control unit 402 controls the operation of the entire image processing apparatus 40C. For example, when receiving an object code of an image processing program from the information processing apparatus 5, the control unit 402 outputs the received object code to the image processing unit 403. When receiving an image processing request signal from the information processing apparatus 5, the control unit 402 outputs the received image processing request signal to the image processing unit 403. The image processing request signal is a signal for instructing the control unit 402 to perform, on the basis of a picked-up image signal, image processing for calculating a position and a posture of the work target M. The control unit 402 transmits work target information input from the image processing unit 403 to the control apparatus 30. The work target information is information indicating the position and the posture of the work target M calculated on the basis of the picked-up image signal.

When receiving a monitor instruction signal from the information processing apparatus 5, the control unit 402 outputs the received monitor instruction signal to the image processing unit 403. The monitor instruction signal is a signal for instructing the control unit 402 to display a picked-up image on a display unit 81.

Note that various input signals input from the notifying unit 405 or an input unit 82 are input to the control unit 402. The input signals are sometimes used for control by the control unit 402. The control unit 402 detects an operation state such as an error in the control unit 402 or the other units, generates notification information indicating the detected operation state, and outputs the generated notification information to the notifying unit 405.

The image processing unit 403 installs the object code of the image processing program input from the control unit 402. When receiving the image processing request signal from the control unit 402, the image processing unit 403 starts the installed object code and acquires a processing target picked-up image signal from the camera control unit 404. As the processing target picked-up image signal, a picked-up image signal of a channel instructed by the image processing request signal is selected. Channels mean distinctions of respective cameras connected to the image processing apparatus 40C or ports for connecting the respective cameras. For example, first cameras 11-1 and 11-2 and second cameras 12-1 to 12-4 are respectively distinguished by the channels. The image processing unit 403 processes the selected picked-up image signal to calculate a position and a posture of the work target M and outputs work target information indicating the calculated position and the calculated posture to the control unit 402.

When the monitor instruction signal is input from the control unit 402, the image processing unit 403 acquires a processing target picked-up image signal from the camera control unit 404. As the processing target picked-up image signal, a picked-up image signal instructed by the monitor instruction signal is selected. Note that the image processing unit 403 may output not only the picked-up image signal but also a picked-up image signal currently being processed to the display unit 81.

The camera control unit 404 detects presence or absence of connection of operating cameras via the first camera communication unit 406 and the second camera communication unit 407 and acquires camera information respectively from the detected cameras. That is, the camera control unit 404 searches for cameras capable of communicating with the image processing apparatus 40C. The camera information is information including identification information and attributes of the cameras. The camera information includes, for example, a model name, a serial number, and resolution. The camera information may include channels to which the cameras are connected among channels of the first camera communication unit 406 and the second camera communication unit 407. The channels are information for identifying ports to which the cameras are physically connected. The camera control unit 404 activates communication with the cameras from which the camera information is acquired.

The camera control unit 404 retains the acquired camera information and erases camera information of disconnected cameras. The detection of the presence or absence of the connection of the cameras by the camera control unit 404 may be performed when an update request signal is received from the information processing apparatus 5 besides during the start. The update request signal is a signal for instructing update of camera information and network information retained by the information processing apparatus 5. The camera control unit 404 reads the network setting information from the communication unit 401 and generates an update response packet on the basis of the read network setting information and newly acquired or deleted camera information. The camera control unit 404 transmits the generated update response packet to the information processing apparatus 5. Consequently, camera information of the communicable camera is updated in the information processing apparatus 5.

Picked-up images are sequentially input to the camera control unit 404 from the respective connected cameras via the first camera communication unit 406 and the second camera communication unit 407.

The notifying unit 405 notifies an operation state indicated by the notification information input from the control unit 402. The notifying unit 405 acquires an input signal based on operation by the user and outputs the acquired input information to the control unit 402. The notifying unit 405 includes, for example, an LED lamp for notifying the operation state and a trigger button for acquiring the input signal.

The first camera communication unit 406 and the second camera communication unit 407 are respectively communicably connected to different types of cameras. In the example shown in FIG. 29, the first camera communication unit 406 is connected to the first cameras 11-1 and 11-2. The first cameras 11-1 and 11-2 are, for example, USB cameras. The second camera communication unit 407 is connected to the second cameras 12-1 to 12-4. The second cameras 12-1 to 12-4 are GigE cameras. In that case, the first camera communication unit 406 includes a USB interface. The second camera communication unit 407 includes, for example, a GigE interface.

The display unit 81 displays an image based on an image signal input from the control unit 402. The display unit 81 is, for example, a liquid crystal display or an organic EL display.

The input unit 82 acquires various input signals based on operation by the user and various input signals from an external apparatus. For example, the input unit 82 is a mouse, a keyboard, a USB memory, or the like.

Note that one or both of the display unit 81 and the input unit 82 may be integrated with the image processing apparatus 40C or may be separate from the image processing apparatus 40C.

The input unit 82 may be configured as a touch panel integrated with the display unit 81.

Configuration of the Information Processing Apparatus

The configuration of the information processing apparatus 5 according to this embodiment is explained.

Figure 30:
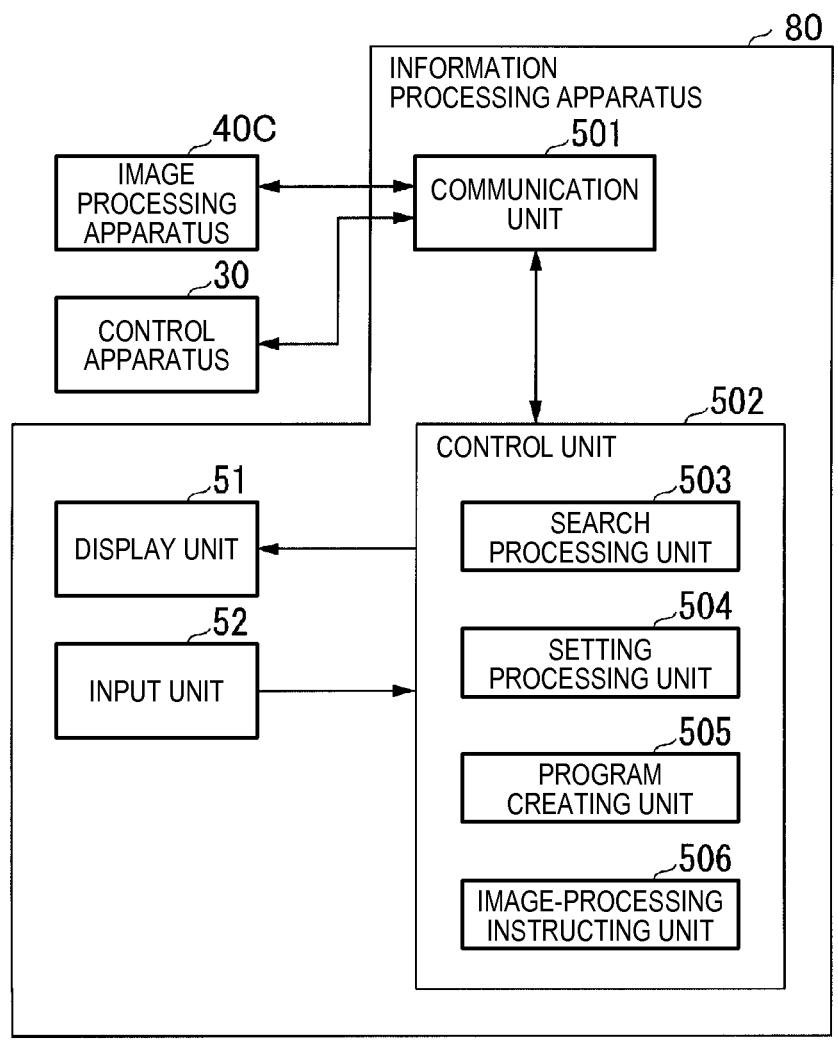
FIG. 30 is a block diagram showing the configuration of an information processing apparatus according to the sixth embodiment.

FIG. 30 is a block diagram showing the configuration of the information processing apparatus 5 according to this embodiment.

The information processing apparatus 5 includes a communication unit 501, a control unit 502, a display unit 51, and an input unit 52.

The communication unit 501 controls communication of the control apparatus 30 and the image processing apparatus 40C. The communication unit 501 outputs various reception signals received from the control unit 30 and the image processing apparatus 40C to the control unit 502. The communication unit 501 transmits various transmission signals input from the control unit 502 to the control apparatus 30 and the image processing apparatus 40C. The communication unit 501 retains network setting information of the information processing apparatus 5.

The control unit 502 includes a search processing unit 503, a setting processing unit 504, a program creating unit 505, and an image-processing instructing unit 506.

When a camera search instruction signal is input from the input unit 52, the search processing unit 503 generates a search packet. The search packet includes an information request command. The information request command is a command for instructing the search processing unit 503 to request information set in an apparatus as a transmission destination. The search processing unit 503 broadcasts the generated search packet to the network 90. When broadcasting the search packet, the search processing unit 503 designates, for example, a predetermined broadcast address as a transmission destination address.

The search processing unit 503 receives a search response packet to the transmitted search packet from the image processing apparatus 40C connected to the network. Note that the number of image processing apparatuses 40C, which are transmission sources of the search response packet, is not limited to one and may be two or more.

The setting processing unit 504 reads, from the received search response packet, network setting information of the image processing apparatus 40C at the transmission source and the camera information of the cameras connected to the image processing apparatus 40C. The setting processing unit 504 associates the read network setting information and the read camera information and generates search result screen data. The search result screen data is an image signal for displaying the camera information of each of the cameras and the network setting information of the image processing apparatus 40C connected to the camera in association with each other. The setting processing unit 504 outputs the generated search result screen data to the display unit 51. The display unit 51 displays a search result screen indicated by the search result screen data input from the setting processing unit 504. On the search result screen, the camera information and the network setting information are arranged in association with each other for each of the cameras. Display of the camera information and the network setting information related to a specific camera is designated by a camera selection signal input from the input unit 52. The camera selection signal is a signal for indicating any one of the cameras displayed on the search result screen. Consequently, the user can select a camera that the user intends to use.

When the camera selection signal is input from the input unit 52, the setting processing unit 504 reads network setting screen data created in advance and outputs the read network setting screen data to the display unit 51. The display unit 51 displays a network setting screen indicated by the network setting screen data input from the setting processing unit 504. The network setting screen is an image for urging the user to input network setting information to the image processing apparatus 40C to which the selected camera is connected. After the input of the network setting information is completed, the setting processing unit 504 generates a change packet including the input network setting information and a MAC address of the image processing apparatus 40C to which the selected camera is connected. The setting processing unit 504 broadcasts the generated change packet to the network 90. Therefore, the change packet is transmitted to the image processing apparatus 40C to which the selected camera is connected.

When receiving the change response packet from the image processing apparatus 40C, the setting processing unit 504 reads the MAC address and the change processing result information of the image processing apparatus 40C from the received change response packet. When the read change processing result information indicates success, the setting processing unit 504 retains the read MAC address and the selected camera information in association with each other.

Screen data for program creation is stored in advance in the program creating unit 505. The program creating unit 505 outputs the stored screen data for program creation to the display unit 51 during the start. The display unit 51 displays a screen for program creation based on the screen data for program creation input from the program creating unit 505.

The program creating unit 505 creates a control program or an image processing program on the basis of various input signals input from the input unit 52. When a control program compile instruction signal is input from the input unit 52, the program creating unit 505 compiles the created control program and converts the created control program into an object code for a format executable by the control apparatus 30. The program creating unit 505 transmits the converted object code to the control apparatus 30.

When an image processing program compile instruction signal is input from the input unit 52, the program creating unit 505 compiles the created image processing program and converts the created image processing program into an object code of a format executable by the image processing apparatus. The program creating unit 505 transmits the converted object code to the image processing apparatus 40C.

The image processing instructing unit 506 gives various instructions to the image processing apparatus 40C on the basis of various input signals input from the input unit 52. For example, the image-processing instructing unit 506 transmits an image processing request signal input from the input unit 52 to the image processing apparatus 40C. The image-processing instructing unit 506 transmits a monitor instruction signal input from the input unit 52 to the image processing apparatus 40C.

Note that the image-processing instructing unit 506 may receives a picked-up image signal from the image processing apparatus 40C and cause the display unit 51 of the information processing apparatus 5 to display a picked-up image based on the received picked-up image signal.

The display unit 51 displays an image based on an image signal input from the control unit 502. The display unit 51 is, for example, a liquid crystal display or an organic EL display.

The input unit 52 acquires an input signal based on operation by the user and an input signal from an external apparatus. The input unit 52 is, for example, a mouse or a keyboard.

Note that one or both of the display unit 51 and the input unit 52 may be integrated with the information processing apparatus 5 or may be separate from the information processing apparatus 5.

System Display Screen

FIG. 31 is a diagram showing an example of a system display screen (a system display screen sc1). The system display screen sc1 is a screen for displaying camera information of respective cameras currently capable of communicating with the information processing apparatus 5. The system display screen sc1 is a screen that the setting processing unit 504 causes the display unit 51 to display when a system setting inquiry signal is input to the setting processing unit 504 from the input unit 52.

The system display screen sc1 includes a display field sc11, a "close" button sc12, and an "add" button sc13. In the display field sc11, camera information for each of the cameras is displayed. The camera information includes a camera type, a model name, and resolution. The model means a model of the camera. For example, camera information of a camera "1" shown in a second row of the display field sc11 includes the camera type "type 2", the model name "model 2B", and the resolution "640×480". The model name indicates a model name of the camera. The resolution indicates resolution supported by the camera.

The "close" button sc12 is a button for erasing the system display screen sc1 by being depressed. "Depressing" means pointing, with operation on the input unit 52, a position included in a display region of the button. The pointed position is represented by an input signal generated by the input unit 52.

The "add" button sc13 is a button for adding, by being depressed, a camera separate from the camera displayed on the system display screen sc1. When the "add" button sc13 is depressed, an addition instruction signal is input to the setting processing unit 504 from the input unit 52. At this point, the setting processing unit 504 causes the display unit 51 to display an addition method inquiry screen.

Addition Method Inquiry Screen

The addition method inquiry screen is explained.

FIG. 32 is a diagram showing an example of the addition method inquiry screen (an addition method inquiry screen ar1).

The addition method inquiry screen ar1 is a screen for causing the user to select a method for adding a camera that the user intends to use in the robot system 3.

The addition method inquiry screen ar1 includes two radio buttons ar11 and ar12, an "OK" button ar13, and a "cancel" button ar14.

The two radio buttons ar11 and ar12 are buttons, one of which is depressed to select a method corresponding to the depressed button. The button depressed most recently is represented by black and the other button is represented by white. In the example shown in FIG. 32, as a method related to the depressed radio button ar11, "camera search" is selected. The camera search means searching for a camera communicable via the network 90 connected to the information processing apparatus 5. Note that "manually setting a camera" related to the radio button ar12 means the user setting camera information by operating the input unit 52.

The "OK" button ar13 is a button for instructing, by being depressed, addition of a camera by the selected method. When the "OK" button ar13 is depressed in the example shown in FIG. 32, a camera search instruction signal is input to the search processing unit 503 from the input unit 52. At this point, the search processing unit 503 generates a search packet and broadcasts the generated search packet to the network 90.

The "cancel" button ar14 is a button for instructing, by being depressed, cancellation of the addition of a camera. When the "cancel" button ar14 is depressed, the setting processing unit 504 erases the addition method inquiry screen ar1 that the setting processing unit 504 causes the display unit 51 to display.

Search Packet

A search packet is explained.

FIG. 33 is a diagram showing an example of the search packet (a search packet sp1). The search packet sp1 is data indicating a command, a transmission destination address, and a port number. A command "RequestInfo" is a command for inquiring an apparatus at a transmission destination about setting information. A transmission destination address "255. 255. 255. 255" is a broadcast address specified by UDP. Therefore, all apparatuses belonging to a network connected to the information processing apparatus 5, that is, one network are transmission destinations. The port number is a port number of the transmission destination apparatus. An application program for realizing a function according to this embodiment is designated by the port number. Note that a parameter shown in a third column from the left end of FIG. 33 means additional information stored in the search packet sp1. In the example shown in FIG. 33, the parameter is not included in the search packet sp1. The IP address of the information processing apparatus 5 at the transmission source is included in the search packet sp1.

Camera Information

An example of the camera information set in the camera control unit 404 of the image processing apparatus 40C is explained.

Figure 34:
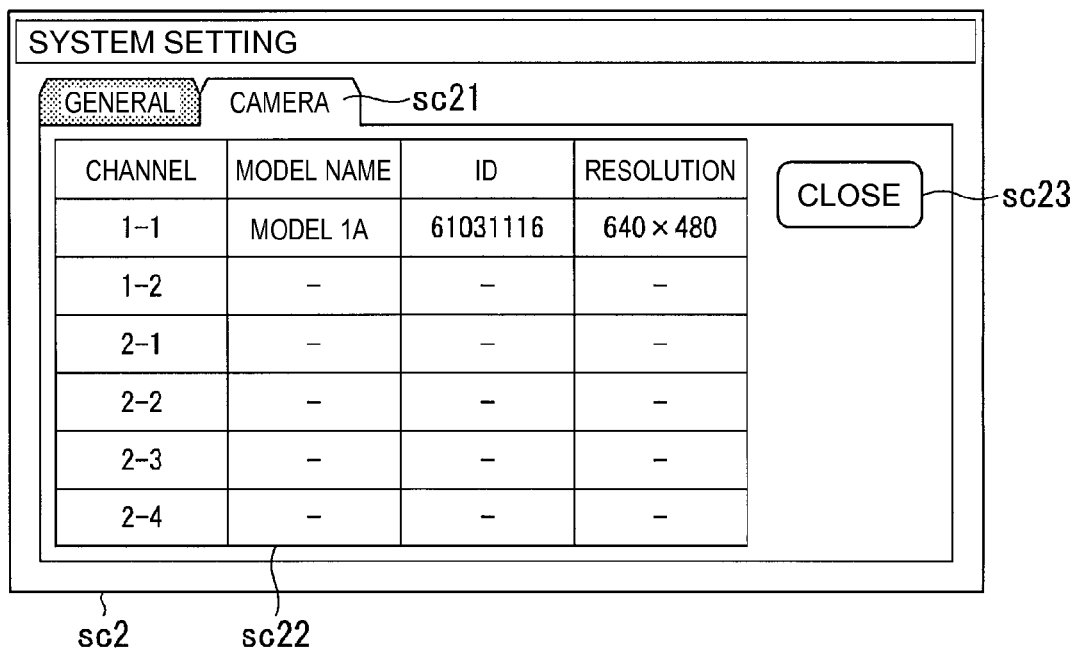
FIG. 34 is a diagram showing an example of a camera setting display screen.

FIG. 34 is a diagram showing an example of a camera setting display screen (a camera setting display screen sc2).

On the camera setting display screen sc2, the camera information set in the camera control unit 404 of the image processing apparatus 40C is displayed.

The camera setting display screen sc2 configures a part of the system setting screen and includes a tab sc21, a display field sc22, and a "close" button sc23. The control unit 402 of the image processing apparatus 40C causes the display unit 81 to display the camera setting display screen sc2 according to an input of a camera setting display request signal from the input unit 82.

When the tab sc21 is depressed, the display field sc22 and the "close" button sc23 are displayed. In the display field sc22, a model name, an ID (Identifier), and resolution are shown in association with one another for each of channels to which the camera is connected. The model name, the ID, and the resolution are respectively components of the camera information. IDs are serial numbers for identifying the respective cameras.

The "close" button sc23 is a button for instructing, by being depressed, the control unit 402 to erase the camera setting display screen sc2. When the "close" button sc23 is depressed, the control unit 402 erases the camera setting display screen sc2 that the control unit 402 causes the display unit 81 to display.

Network Information

An example of the network information set in the communication unit 401 of the image processing apparatus 40C is explained.

Figure 35:
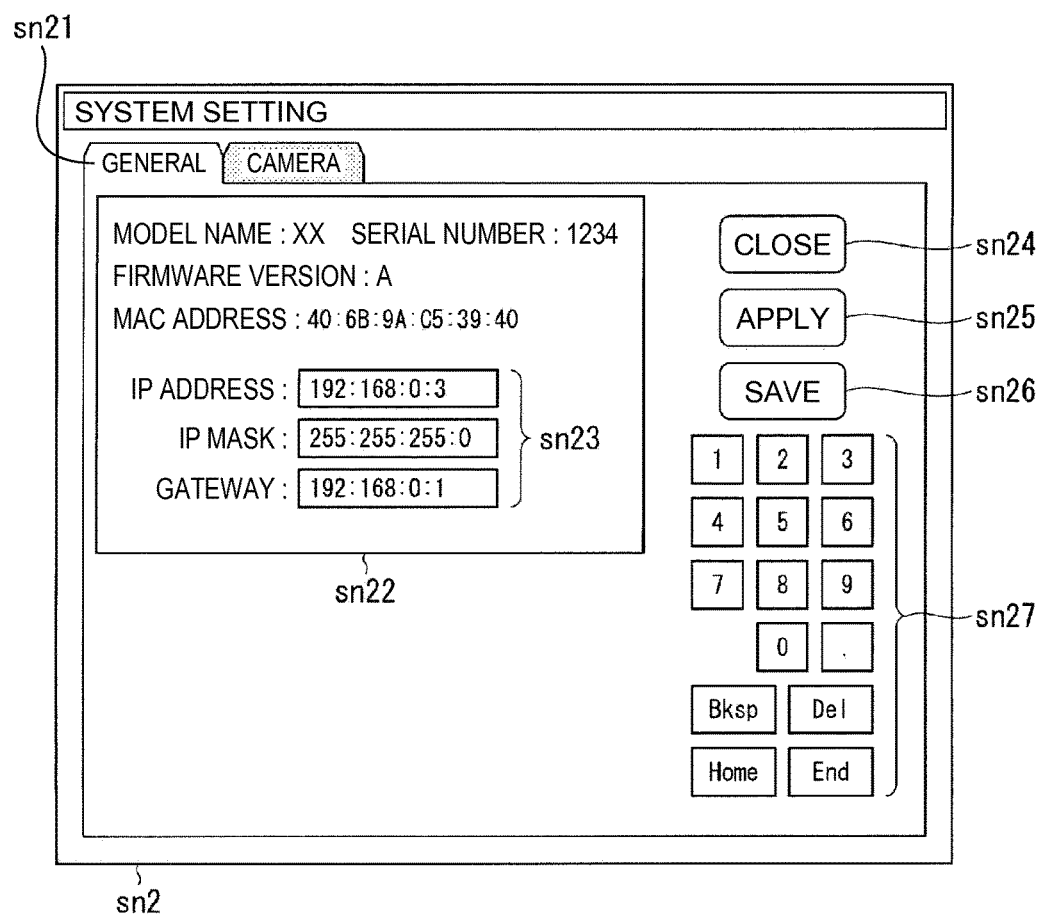
FIG. 35 is a diagram showing an example of a system integration setting display screen.

FIG. 35 is a diagram for explaining an example of a system general setting display screen (a system general setting display screen sn2).

On the system general setting display screen sn2, the network information set in the communication unit 401 is displayed.

The system general setting display screen sn2 configures a part of the system setting screen and includes a tab sn21, a display field sn22, an input field sn23, a "close" button sn24, an "apply" button sn25, a "save" button sn26, and an input key sn27. The control unit 402 of the image processing apparatus 40C causes the display unit 81 to display the system general setting display screen sn2 according to an input of a system general setting display request signal from the input unit 82.

When the tab sn21 is depressed, the display field sn22, the "close" button sn24, the "apply" button sn25, the "save" button sn26, and the input key sn27 are displayed. In the display field sn22, a model name, a serial number, a firmware version, and a MAC address of the image processing apparatus 40C and the input field sn23 are displayed. The firmware version is a version of firmware installed in the image processing apparatus 40C. The input field sn23 is a field for inputting the network setting information of the image processing apparatus 40C. As the network setting information, an IP address, an IP mask, and a gateway address can be input.

The "close" button sn24 is a button for instructing, when being depressed, the control unit 402 to erase the system general setting display screen sn2. When the "close" button sn24 is depressed, the control unit 402 erases the system general setting display screen sn2 that the control unit 402 causes the display unit 81 to display.

The "apply" button sn25 is a button for instructing, by being depressed, the control unit 402 to apply the input network setting information to the image processing apparatus 40C. When the "apply" button sn25 is depressed, the control unit 402 saves the network setting information input via the input key sn27 in the communication unit 401.

The "save" button sn26 is a button for instructing, by being depressed, the control unit 402 to save the input network setting information without applying the network setting information to the image processing apparatus 40C. When the "save" button sn26 is depressed, the control unit 402 saves the network setting information input via the input key sn27.

The input key sn27 is a key for inputting the network setting information to the input field sn23. The input key sn27 includes a ten key, a period key, a backspace key (Bksp), a deletion key, a home key (Home), and an end key (End). The ten key and the period key are respectively keys for inputting any one of numbers 0 to 9 and a period ".". The deletion key is a key for deleting an input character. The backspace key is a key for deleting a character on the left of an input character. The home key is a key for moving an input available position (a cursor) to the head of a row. The end key is a key for moving the input available position to the end of the row.

Note that the camera setting display screen sc2 and the system general setting display screen sn2 may be displayed on the display unit 51 by the setting processing unit 504 of the information processing apparatus 5. In that case, the setting processing unit 504 acquires the camera information and the network setting information from the image processing apparatus 40C. The setting processing unit 504 may set the network setting information in the image processing apparatus 40C on the basis of an input signal input from the input unit 52.

Note that the image processing apparatus 40C can change the network setting information on the basis of the change packet received from the information processing apparatus 5 as explained above besides the operation on the image processing apparatus 40C.

Search Response Packet

The search response packet generated by the control unit 402 is explained. The control unit 402 generates, according to the reception of the search packet from the information processing apparatus 5, the search response packet on the basis of the network setting information read from the communication unit 401 and the camera information read from the camera control unit 404.

FIG. 36 is a diagram showing an example of the search response packet (a search response packet sp2).

The search response packet sp2 includes apparatus information sp20 of the image processing apparatus 40C, network setting information s21 of the image processing apparatus 40C, and camera information sp22-1 to sp22-6 for each of the cameras. For example, the apparatus information sp20 includes an IP "XX", a serial number "00001111", and a MAC address "00:11:22:AA:BB:CC". The network setting information sp21 includes an IP address "192. 168. 0. 3", a network mask "255. 255.255. 0", and a gateway address "192. 168. 0. 1". The camera information sp22-1 includes a model name "AAA-BBB", an ID (serial number) "222333", and resolution "640×480" of the camera.

Determination of a Return Destination

Processing for deciding a return destination of the search response packet is explained.

The control unit 402 reads the IP address of the information processing apparatus 5 from the search packet sp1 received from the information processing apparatus 5 and specifies, from the read IP address, the sub-network to which the information processing apparatus 5 belongs. The control unit 402 reads the IP address of the image processing apparatus 40C from the network setting information set in the communication unit 401 and specifies, from the read IP address, the sub-network to which the image processing apparatus 40C belongs. The sub-network is represented by a portion indicated by a network mask from a bit string forming the IP address.

FIG. 37 is a diagram for explaining the return destination of the search response packet.

As shown in FIG. 37, when the sub-network to which the information processing apparatus 5 belongs and the sub-network to which the image processing apparatus 40C belongs are the same, the control unit 402 decides an address (192. 168. 0. 2) of the information processing apparatus 5 as an address of the return destination. Consequently, it is possible to prevent useless transmission to the other information processing apparatuses 5. When the sub-network to which the information processing apparatus 5 belongs and the sub-network to which the image processing apparatus 40C belongs are different, the control unit 402 decides a UDP broadcast address (255. 255. 255. 255) as the address of the return destination. The control unit 402 transmits the generated search response packet to the decided address of the return destination. Consequently, it is possible to transmit the search response packet to the information processing apparatus 5 having the different sub-network by broadcasting the search response packet to the network 90.

Search Result Screen

The search result screen is explained.

Figure 38:
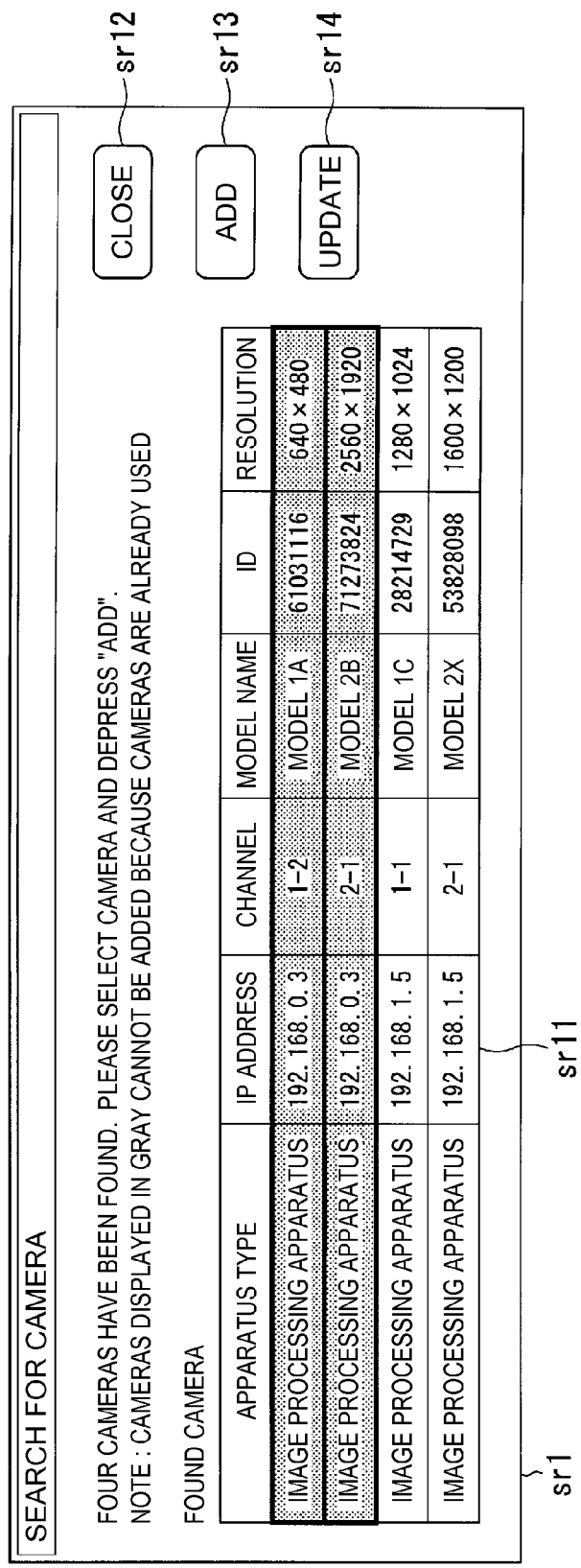
FIG. 38 is a diagram showing an example of a search result screen.

FIG. 38 is a diagram showing an example of the search result screen (a search result screen sr1). The search result screen sr1 is a screen that shows a list of camera information of cameras found via the network 90. The search result screen sr1 includes camera information included in the search response packet received from the image processing apparatus 40C by the setting processing unit 504.

The search result screen sr1 includes a display field sr11, a "close" button sr12, an "add" button sr13, and an "update" button sr14. In the display field sr11, an apparatus type, an IP address, a channel, and camera information are displayed in each row for each of the cameras. The apparatus type means, as a type of a directly found apparatus, distinction between the image processing apparatus 40C and a stand-alone camera. The IP address is an IP address of the directly found apparatus. The channel means a channel to which the camera is connected when the directly found apparatus is the image processing apparatus 40C. The displayed camera information includes a model name, an ID, and resolution. For example, in a second row of the display field sr11, the apparatus type "image processing apparatus", the IP address "192. 168. 0. 3", the channel "1-2", the model name "model 1A", the ID "61031116", and the resolution "640×480" are displayed.

Information displayed in the display field sr11 can be instructed for each row by a camera selection signal input from the input unit 52 according to the operation by the user. The setting processing unit 504 selects a camera related to the row indicated by the camera selection signal.

A row related to camera information already set as a communicable camera among the information displayed in the display field sr11 is displayed in a form different from a form of the other rows. The different form is gray display in the example shown in FIG. 38. The display in the different form indicates that the camera related to the row cannot be selected.

Communicable cameras connected to the image processing apparatus 40C are listed by the search result screen. Therefore, the user can immediately grasp presence or absence of a camera that the user intends to use. It is unnecessary to check in advance the IP address of the image processing apparatus 40C connected to the camera.

The "close" button sr12 is a button for erasing the search result screen sr1 by being depressed.

The "add" button sr13 is a button for adding, by being depressed, the selected camera as a camera used in the robot system 3. When the "add" button sr13 is depressed, the setting processing unit 504 causes the display unit 51 to display the network setting screen.

The "update" button sr14 is a button for updating the network setting information and the camera information by being depressed. When the "update" button sr14 is depressed, the setting processing unit 504 broadcasts the update packet including the update request signal to the network 90. Thereafter, the setting processing unit 504 reads the apparatus information, the network setting information, and the camera information from the received update response packet. The setting processing unit 504 updates the apparatus information, the network setting information, and the camera information saved in the setting processing unit 504 to the apparatus information, the network setting information, and the camera information read from the received update response packet. The setting processing unit 504 erases the apparatus type, the IP address, and the camera information displayed on the search result screen sr1 and displays the apparatus type, IP address, and the camera information included in the updated network setting information on the search result screen sr1.

Network Setting Screen

The network setting screen is explained.

Figures 39, 40:
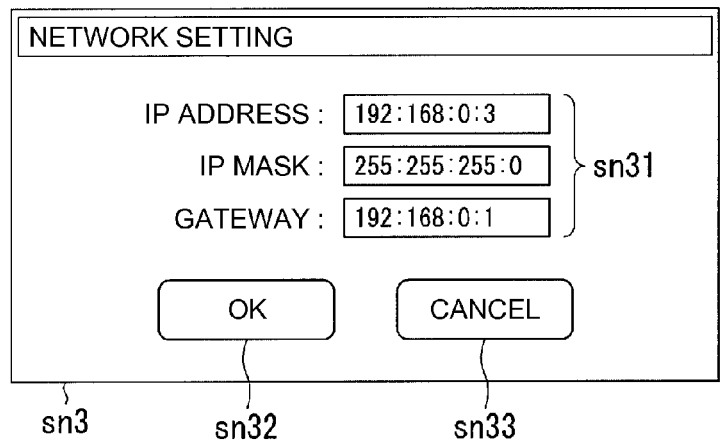
FIG. 39 is a diagram showing an example of a network setting screen.
FIG. 40 is a diagram showing an example of a change packet.

FIG. 39 is a diagram showing an example of the network setting screen (a network setting screen sn3).

The network setting screen sn3 is a screen for inputting the network setting information of the image processing apparatus 40C to which the selected camera is connected.

The network setting screen sn3 includes an input field sn31, an "OK" button sn32, and a "cancel" button sn33.

The input field sn31 is a field for inputting the network setting information of the image processing apparatus 40C. As the network setting information, an IP address, an IP mask, and a gateway address can be input. Note that, when the selected camera is a camera that is not connected to the image processing apparatus 40C and is connected to the network 90 alone, network setting information of the camera may be input to the input field sn31.

The "OK" button sn32 is a button for instructing, by being depressed, the setting processing unit 504 to apply the input network setting information. When the "OK" button sn32 is depressed, the setting processing unit 504 generates a change packet on the basis of the input network setting information and the MAC address of the image processing apparatus 40C connected to the selected camera. The setting processing unit 504 broadcasts the generated change packet to the network 90.

The "cancel" button sn33 is a button for instructing, by being depressed, the setting processing unit 504 to erase of the network setting screen sn3. When the "cancel" button sn33 is depressed, the setting processing unit 504 erases the network setting screen sn3 that the setting processing unit 504 causes the display unit 51 to display. At this point, the setting processing unit 504 erases the information input to the input field sn31.

With the network setting screen, it is possible to change the network setting information of the image processing apparatus 40C in selecting or adding a camera. Therefore, it is possible to reduce time required for a setting change.

Change Packet

The change packet is explained.

FIG. 40 is a diagram showing an example of the change packet (a change packet cp1).

The change packet cp1 is data indicating a command, a transmission destination address, and a port number. The command "SetIPAddress" is a command for setting network setting information in an apparatus at a transmission destination. The transmission destination address "255. 255. 255. 255" is a broadcast address specified by UDP. Parameters include the MAC address of the image processing apparatus 40C related to the selected camera and input network setting information, i.e., an IP address, a network mask, and a gateway address. The port number is a port number of the transmission destination apparatus. Note that the change packet cp1 includes the IP address of the information processing apparatus 5 at the transmission source.

Necessity Determination for a Network Setting Information Change

Necessity determination for a network setting information change by the control unit 402 of the image processing apparatus 40C is explained.

FIG. 41 is a diagram for explaining the necessity determination for the network setting information change.

The control unit 402 reads the MAC address from the change packet received from the information processing apparatus 5 and compares the read MAC address and the MAC address of the image processing apparatus 40C. When the read MAC address and the MAC address of the image processing apparatus 40C are the same, the control unit 402 determines that the network setting information is changed. When determining that the network setting information is changed, the control unit 402 reads the network setting information from the received change packet. The control unit 402 changes the network setting information set in the communication unit 401 to the read network setting information, that is, a new IP address, a new network mask, and a new gateway address. On the other hand, when the read MAC address and the MAC address of the image processing apparatus 40C are different, the control unit 402 neglects the received change packet.

Change Response Packet

The change response packet generated by the control unit 402 after performing the processing related to the change of the network setting information is explained.

FIG. 42 is a diagram showing an example of the change response packet (a change response packet cp2). The change response packet cp2 includes the MAC address of the image processing apparatus 40C and change processing result information (a change processing result of an IP address). The change processing result information is represented by 0 indicating success of processing or an error number indicating a failure cause. The failure cause is, for example, designation of a numerical value outside a predetermined range as an IP address in the network setting information intended to be changed.

Network Processing

Network processing according to this embodiment is explained.

Figure 43:
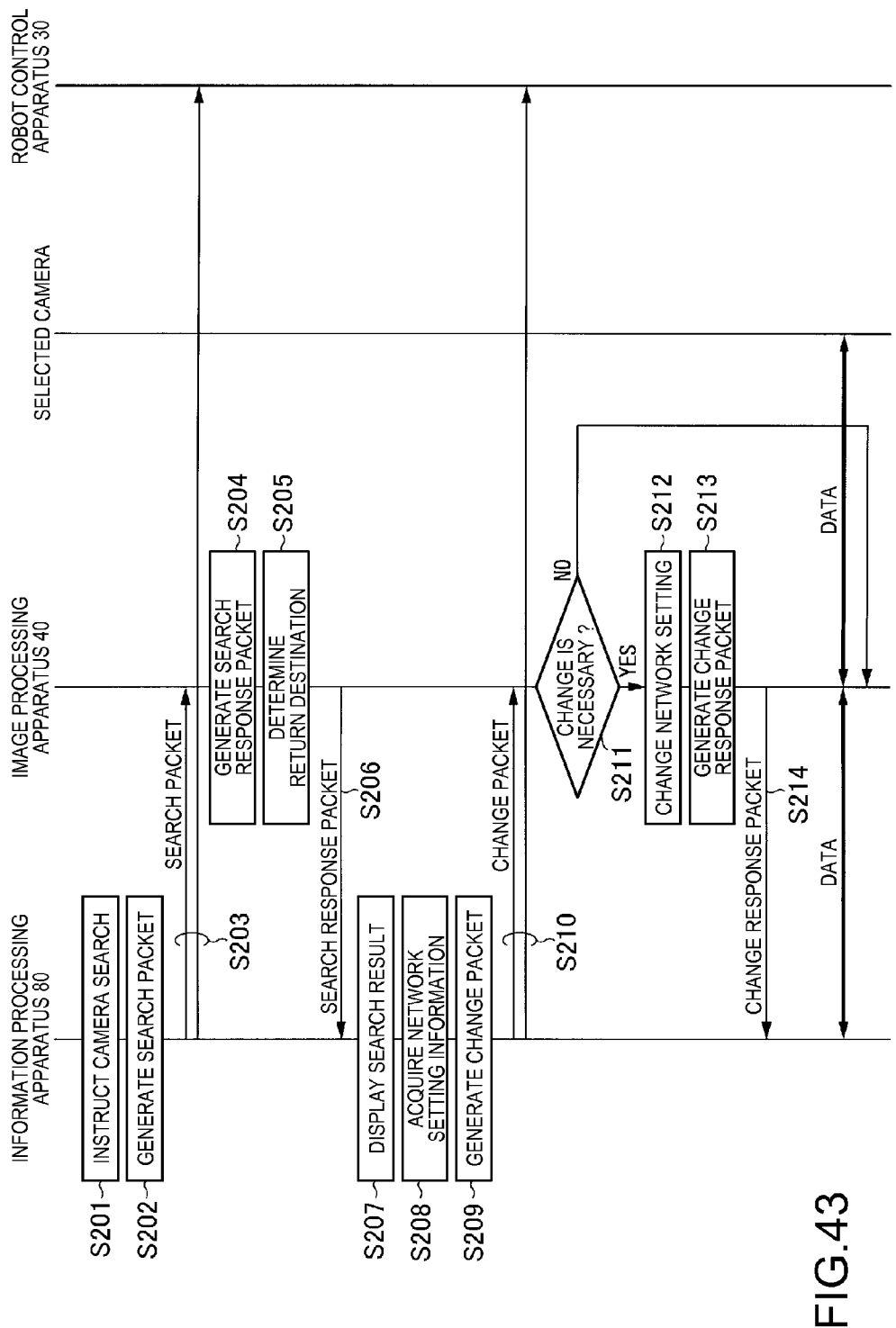
FIG. 43 is a sequence chart showing network processing according to a sixth embodiment.

FIG. 43 is a sequence chart showing the network processing according to this embodiment.

(Step S201) A camera search instruction signal is input to the search processing unit 503 of the information processing apparatus 5 from the input unit 52. Thereafter, the search processing unit 503 proceeds to step S202.

(Step S202) The search processing unit 503 generates a search packet. Thereafter, the search processing unit 503 proceeds to step S203.

(Step S203) The search processing unit 503 broadcasts the generated search packet to the network 90. After receiving the search packet from the information processing apparatus 5, the control unit 402 of the image processing apparatus 40C proceeds to step S204.

(Step S204) The control unit 402 reads network setting information from the communication unit 401 and reads camera information from the camera control unit 404. The control unit 402 generates a search response packet including the read network setting information and the read camera information. Thereafter, the control unit 402 proceeds to step S205.

(Step S205) The control unit 402 decides, according to whether the sub-network to which the information processing apparatus 5 belongs and the sub-network to which the image processing apparatus 40C belongs are the same, whether an address of the information processing apparatus 5 or a UDP broadcast address is set as an address of a return destination. Thereafter, the control unit 402 proceeds to step S206.

(Step S206) The control unit 402 transmits the generated search response packet to the return destination designated by the decided address. After receiving the search response packet from the image processing apparatus 40C, the setting processing unit 504 of the information processing apparatus 5 proceeds to step S207.

(Step S207) The setting processing unit 504 generates search result screen data on the basis of the network setting information and the camera information read from the received search response packet. The setting processing unit 504 outputs the generated search result screen data to the display unit 51 to thereby cause the display unit 51 to display a search result screen. Thereafter, the setting processing unit 504 proceeds to step S208.

(Step S208) When a camera selection signal is input from the input unit 52, the setting processing unit 504 outputs network setting screen data to the display unit 51 to thereby cause the display unit 51 to display a network setting screen. The setting processing unit 504 acquires network setting information from the input unit 52. Thereafter, the setting processing unit 504 proceeds to step S209.

(Step S209) The setting processing unit 504 generates a change packet including the acquired network setting information and the MAC address of the image processing apparatus 40C to which the selected camera is connected. Thereafter, the setting processing unit 504 proceeds to step S210.

(Step S210) The setting processing unit 504 broadcasts the generated change packet to the network 90. After receiving the search packet from the information processing apparatus 5, the control unit 402 of the image processing apparatus 40C proceeds to step S211.

(Step S211) The control unit 402 determines, according to whether the MAC address included in the change packet received from the information processing apparatus 5 and the MAC address of the image processing apparatus 40C are the same, whether network setting is changed. When the MAC address included in the change packet and the MAC address of the image processing apparatus 40C are the same (YES in step S211), the control unit 402 proceeds to step S212. When the MAC address included in the change packet and the MAC address of the image processing apparatus 40C are different (NO in step S211), the control unit 402 ends the processing shown in FIG. 43.

(Step S212) The control unit 402 changes the network setting information set in the communication unit 401 to the network setting information included in the received change packet. Thereafter, the control unit 402 proceeds to step S213.

(Step S213) The control unit 402 generates a change response packet including the change processing result information and the MAC address of the image processing apparatus 40C. Thereafter, the control unit 402 proceeds to step S214.

(Step S214) The control unit 402 transmits the generated change response packet to the information processing apparatus 5. The setting processing unit 504 of the information processing apparatus 5 reads the MAC address and the change processing result information from the change response packet received from the image processing apparatus 40C. When the read change processing result information indicates success, the setting processing unit 504 retains the read MAC address and the selected camera information in association with each other. Thereafter, the control unit 402 ends the processing shown in FIG. 43.

In step S208, it is also likely that, as the network setting information of the image processing apparatus 40C, any network setting information is acquired via the network setting screen described above according to operation by the user. However, when an unused IP address belonging to a sub-network same as the sub-network to which the information processing apparatus 5 belongs is designated as the network setting information of the image processing apparatus 40C, the information processing apparatus 5 is capable of transmitting and receiving various data to and from the selected camera via the image processing apparatus 40C. For example, the image processing apparatus 40C can transmit a picked-up image signal acquired from the selected camera to the information processing apparatus 5. The information processing apparatus 5 can receive the picked-up image signal from the image processing apparatus 40C.

In step S208, the setting processing unit 504 may search for an IP address to which an apparatus is not connected among IP addresses belonging to the sub-network same as the sub-network to which the information processing apparatus 5 belongs and automatically generate network setting information that designates a found IP address. The setting processing unit 504 broadcasts an address inquiry packet including a network setting information inquiry command and not designating a port number to the network 90 and receives an address inquiry response packet corresponding to the address inquiry packet. The setting processing unit 504 reads, as an IP address in use, the IP address included in the network setting information from the received address inquiry response packet. The setting processing unit 504 specifies a range of an IP address belonging to the sub-network to which the information processing apparatus 5 belongs from the IP address of the information processing apparatus 5 indicated by the network setting information of the information processing apparatus 5 and a range of a bit designated by a network mask. The setting processing unit 504 selects any one of unused IP addresses excluding the IP address in use from the specified range of the IP address. The setting processing unit 504 generates network setting information including the selected IP address and the network mask and the gateway address of the information processing apparatus 5. Consequently, the user can check the unused IP addresses and omit operation for setting. Therefore, it is possible to further facilitate operation related to the setting.

As explained above, the image processing system 2 according to this embodiment includes the image processing apparatus 40C that processes a picked-up image and the information processing apparatus 5 that displays a screen on which setting of the image processing apparatus 40C is performed. The image processing apparatus 40C searches for the image pickup apparatus 10 communicable with the image processing apparatus. The information processing apparatus 5 displays information concerning the communicable image pickup apparatus 10 found by the image processing apparatus 40C.

With this configuration, information concerning the communicable image pickup apparatus 10 found by the image processing apparatus 40C is displayed. Therefore, the user can select, from the displayed image pickup apparatuses 10, the image pickup apparatus 10 that the user desires to use. Therefore, it is unnecessary to check, in setting of the image pickup apparatus 10, information concerning the image pickup apparatus 10 that the user desires to use.

In the image processing system 2 according to this embodiment, the information processing apparatus 5 broadcasts a search packet including a command for inquiring about information set in an apparatus at a transmission destination to the network 90 connected to the information processing apparatus 5. When receiving the search packet from the information processing apparatus 5, the image processing apparatus 40C broadcasts a search response packet including the information concerning the found communicable image pickup apparatus 10 to the network 90.

With this configuration, even when the image processing apparatus 40C, to which the image pickup apparatus 10 is connected, belongs to a sub-network different from the sub-network to which the information processing apparatus 5 belongs, the information processing apparatus 5 can acquire information concerning the image pickup apparatus 10 connected to the image processing apparatus 40C. Therefore, the user can obtain a clue for using, without omission, the image pickup apparatus 10 found by the image processing apparatus 40C connected to the network 90.

In the image processing system 2 according to this embodiment, the image processing apparatus 40C includes the IP address of the image processing apparatus 40C in the search response packet. The information processing apparatus 5 displays the IP address in association with the information concerning the image pickup apparatus 10.

With this configuration, the IP address of the image processing apparatus 40C related to the image pickup apparatus 10 that the user desires to use is displayed. Therefore, the user can check the IP address in the setting for using the image pickup apparatus 10.

In the image processing system 2 according to this embodiment, the information processing apparatus 5 acquires a new IP address and broadcasts a change packet including the acquired IP address to the network 90 connected to the information processing apparatus 5. The image processing apparatus 40C changes the IP address set in the image processing apparatus 40C to the IP address included in the change packet received from the information processing apparatus 5.

With this configuration, even when the image processing apparatus 40C, to which the image pickup apparatus 10 is connected, belongs to a sub-network different from the sub-network to which the information processing apparatus 5 belongs, it is possible to change the IP address set in the image processing apparatus 40C to the IP address acquired by the information processing apparatus 5. For example, by causing the information processing apparatus 5 to acquire an unused IP address belonging to a sub-network same as the sub-network to which the information processing apparatus 5 belongs, it is possible to cause the image processing apparatus 40C to belong to a sub-network same as the sub-network to which the information processing apparatus 5 belongs.

In the image processing system 2 according to this embodiment, the information processing apparatus 5 decides, as the IP address of the image processing apparatus 40C, an unused IP address belonging to a sub-network same as the sub-network to which the information processing apparatus 5 belongs.

With this configuration, the user can cause, without checking an IP address in advance and inputting the IP address, the image processing apparatus 40C to belong to a sub-network same as the sub-network to which the information processing apparatus 5 belongs. Consequently, it is possible to perform communication of the information processing apparatus 5 and the image pickup apparatus 10 connected to the image processing apparatus 40C.

In the image processing system 2 according to this embodiment, when the image processing apparatus 40C belongs to a sub-network same as the sub-network to which the information processing apparatus 5 belongs, the image processing apparatus 40C includes, in the search response packet, the IP address of the information processing apparatus 5 as the IP address of the transmission destination.

With this configuration, by broadcasting the search response packet, it is possible to avoid useless communication in which the search response packet is transmitted to apparatuses other than a display apparatus as well.

The embodiments of the invention are explained above in detail with reference to the drawings. However, specific components are not limited to the embodiments and may be, for example, changed, substituted, and deleted without departing from the spirit of the invention.

For example, in the example explained in the embodiments, the robot 20 is the single-arm robot including one arm. However, not only this, but the robot 20 may be a double-arm robot including two arms or may be a horizontal articulated robot (so-called SCARA robot).

The image processing apparatus 40C may be separate from the control apparatus 30C as explained above or may be configured integrally with the control apparatus 30C.

The control apparatus 30 may be separate from the robot 20 as explained above or may be configured integrally with the robot 20.

Seventh Embodiment

An embodiment of the invention is explained below with reference to the drawings. Note that components same as the components in the first embodiment are denoted by the same reference numerals and signs and explanation of the components is omitted or simplified.

In the following explanation, an abnormal state notifying function for an image processing apparatus by the control apparatus 30 in the robot system 1 configured as shown in FIG. 1 is explained. The abnormal state notifying function is a function of detecting an event indicating a state in which a part or all of one or more functional units by hardware or apart of or the entire control processing by software included in an image processing apparatus 40E is highly likely to be out of order or a state in which a part or all of one or more functional units by hardware or apart of or the entire control processing by software is highly likely to fail in future, for example, the temperature of a CPU included in the image processing apparatus 40E excessively rises, and performing notification based on the detected event.

In the following explanation, for convenience of explanation, the event indicating a state in which a part or all of one or more functional units by hardware or a part of or the entire control processing by software included in the image processing apparatus 40E is highly likely to be out of order or a state in which apart or all of one or more functional units by hardware or a part of or the entire control processing by software is highly likely to fail in future is referred to as an event indicating abnormality of the image processing apparatus 40E and explained. The state in which a part or all of one or more functional units by hardware or a part of or the entire control processing by software is highly likely to fail in future indicates, in this example, a state in which a probability of failure within a predetermined time exceeds a predetermined value when the image processing apparatus 40E continues to be used with a state of use of the image processing apparatus 40E is maintained. However, the state may indicate other states.

The hardware configuration of the control apparatus 30 is explained with reference to FIG. 44.

Figure 44:
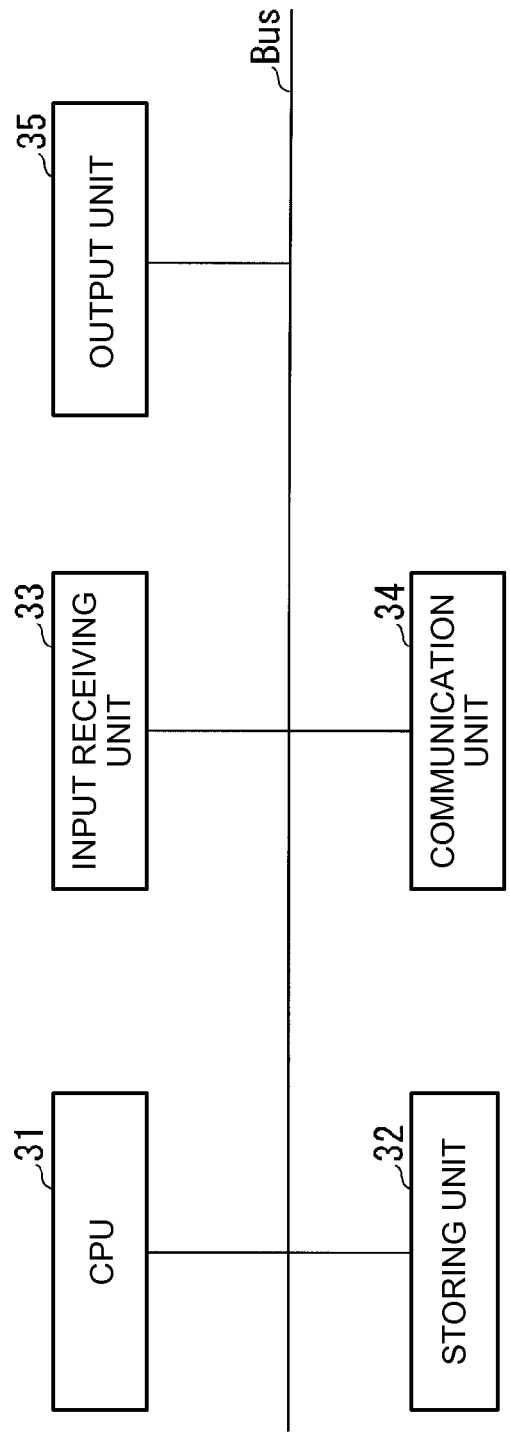
FIG. 44 is a diagram showing an example of the hardware configuration of a control apparatus according to a seventh embodiment.

FIG. 44 is a diagram showing an example of the hardware configuration of the control apparatus 30 according to this embodiment. The control apparatus 30 includes, for example, a CPU 31, a storing unit 32, an input receiving unit 33, a communication unit 34, and an output unit 35. The control apparatus 30 performs communication with the information processing apparatus 5, the image processing apparatus 40E, other apparatuses, and the like via the communication unit 34. These components are communicably connected to one another via the bus Bus. The CPU 31 executes various computer programs stored in the storing unit 32.

The storing unit 32 includes, for example, a HDD, an SSD, an EEPROM, a ROM, or a RAM and stores various kinds of information, images, computer programs, and the like to be processed by the control apparatus 30.

Note that the storing unit 32 may be an external storage device connected by, for example, a digital input/output port such as the USB instead of a storage device incorporated in the control apparatus 30.

The input receiving unit 33 may be, for example, a keyboard, a mouse, a touch pad, or other input devices. The input receiving unit 43 may be configured integrally with a display as a touch panel.

The communication unit 34 includes, for example, digital input/output ports such as a plurality of Ethernet (registered trademark) ports or a plurality of USBs.

The output unit 35 may include, for example, a liquid crystal display panel or an organic EL display panel or may include a speaker that outputs sound.

The hardware configuration of the image processing apparatus 40E is explained with reference to FIG. 45.

Figure 45:
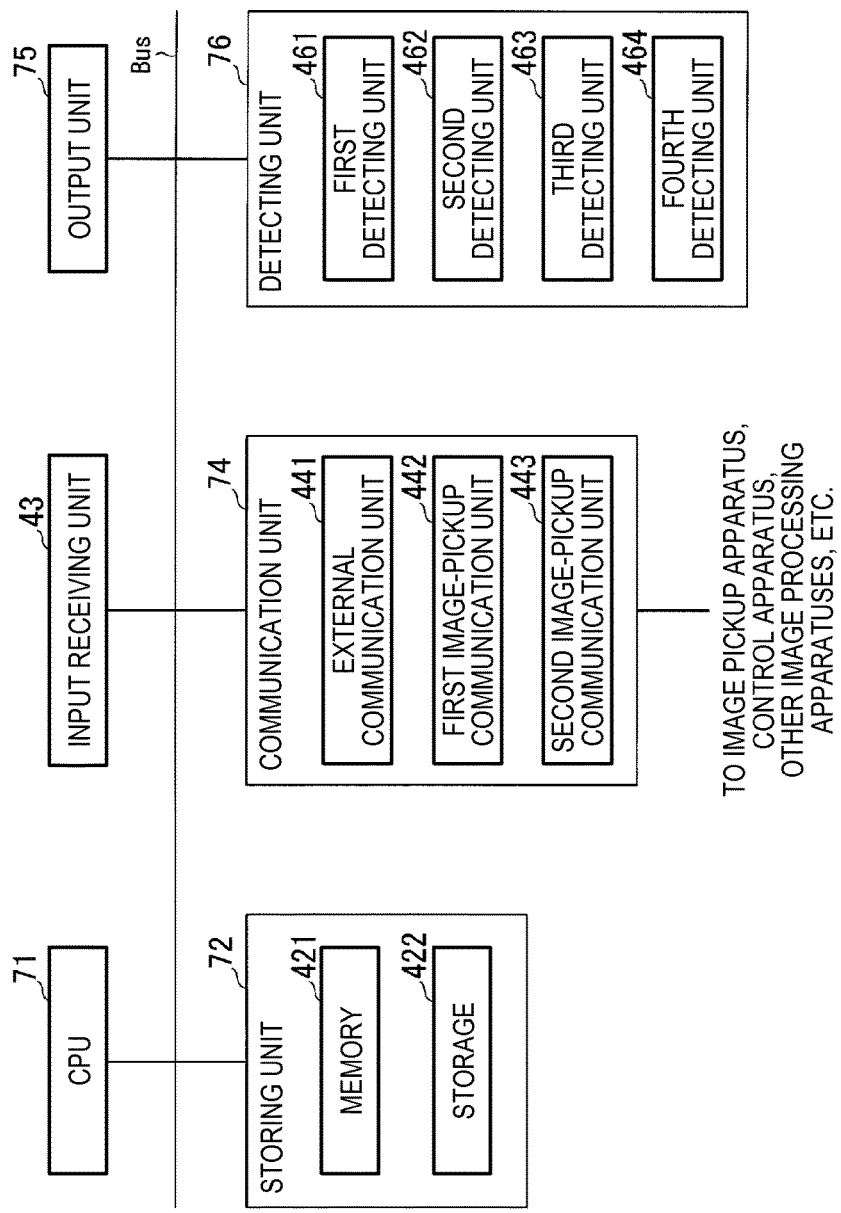
FIG. 45 is a diagram showing an example of the hardware configuration of an image processing apparatus.

FIG. 45 is a diagram showing an example of the hardware configuration of the image processing apparatus 40E. The image processing apparatus 40E includes, for example, the CPU 71, the storing unit 72, the input receiving unit 43, the communication unit 74, the output unit 75, and the detecting unit 76. The image processing apparatus 40E performs communication with the control apparatus 30, other image processing apparatuses 40E, other apparatuses, and the like via the communication unit 74. These components are communicably connected to one another via the bus Bus. The CPU 71 executes various kinds of computer programs stored in the storing unit 72.

The output unit 75 includes a plurality of LEDs and notifies various kinds of information with lighting states (e.g., extinguishing, lighting, and blinking) of the LEDs. In the explanation of this example, it is assumed that the output unit 75 includes one green LED and one red LED. However, colors of the LEDs may be respectively other colors or may be the same color. Note that, instead of including the LEDs, the output unit 75 may include, for example, a liquid crystal display panel or an organic EL display panel or may include a speaker that outputs sound.

The detecting unit 76 is a plurality of sensors for detecting physical quantities serving as indexes indicating that an event indicating abnormality of a respective plurality of pieces of hardware included in the image processing apparatus 40E has occurred. The event indicating the abnormality of hardware indicates an event in which the image processing apparatus 40E is replaced with hardware in the definition of the event indicating the abnormality of the image processing apparatus 40E.

In this example, the physical quantities serving as the indexes indicating that the event indicating the abnormality of the hardware included in the image processing apparatus 40E are the number of revolutions of the cooling fan for the CPU 71, the number of revolutions of the system fan that cools the inside of a housing of the image processing apparatus 40E, the temperature of the CPU 71, and a voltage value of the battery for BIOS backup incorporated in the image processing apparatus 40E. However, instead, the physical quantities may be combinations of these physical quantities, may be combinations of these physical quantities and other physical quantities, or may be one or more other physical quantities. Note that the physical quantities serving as the indexes indicating that the event indicating the abnormality of a plurality of the hardware included in the image processing apparatus 40E has occurred are an example of one or more physical quantities indicating a state of the hardware of the image processing apparatus 40E.

The functional configuration of the control apparatus 30 is explained with reference to FIG. 46.

Figure 46:
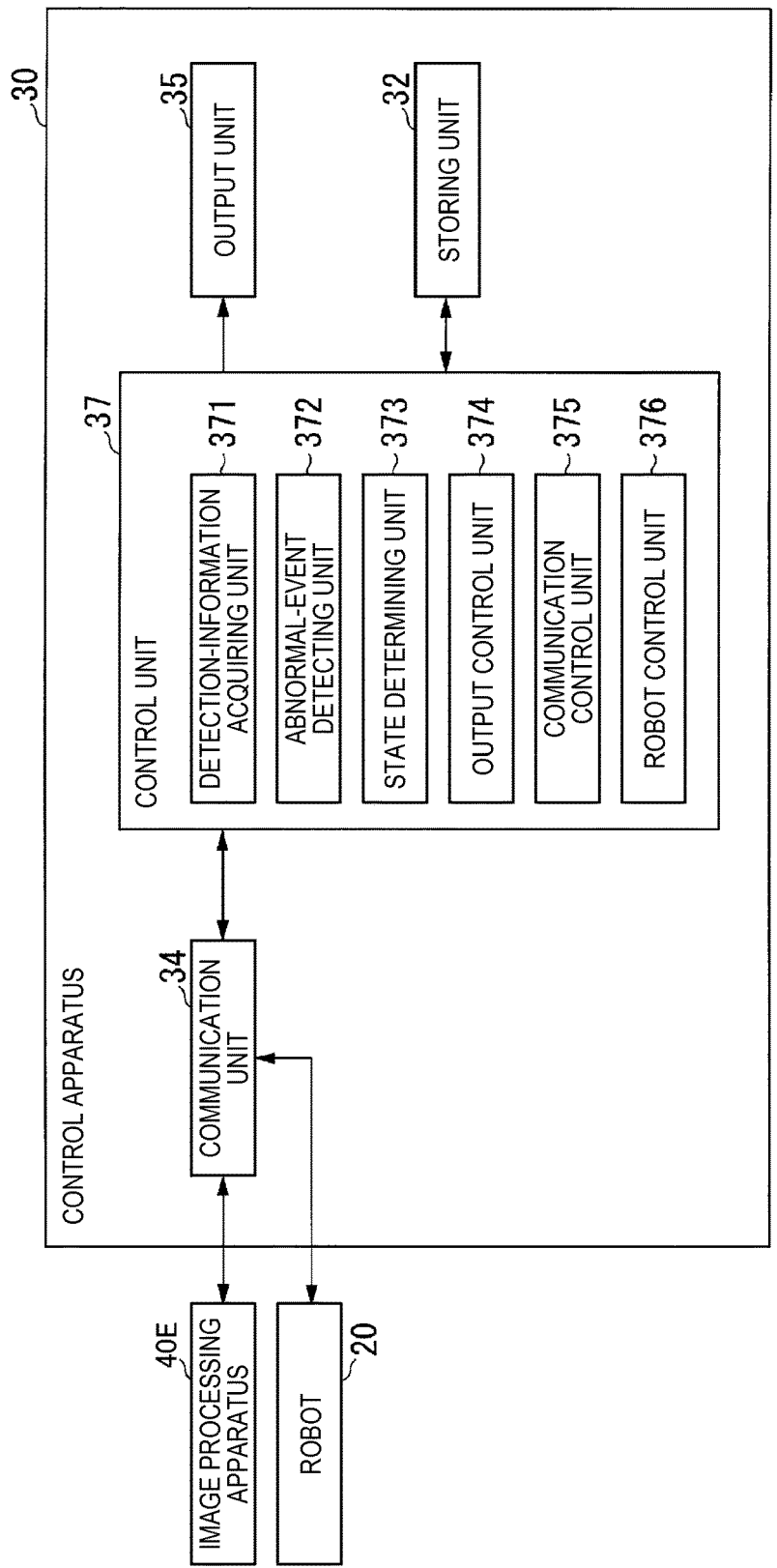
FIG. 46 is a diagram showing an example of the functional configuration of the control apparatus.

FIG. 46 is a diagram showing an example of the functional configuration of the control apparatus 30. The control apparatus 30 includes the storing unit 32, the communication unit 34, the output unit 35, and a control unit 37.

The control unit 37 includes a detection-information acquiring unit 371, an abnormal-event detecting unit 372, a state determining unit 373, an output control unit 374, a communication control unit 375, and a robot control unit 376. A part or all of the functional units included in the control unit 37 are realized by, for example, the CPU 31 executing a computer program stored in the storing unit 32. A part of the functional units may be hardware functional units such as an LSI and an ASIC.

The detection-information acquiring unit 371 cyclically (e.g., every time one minute elapses) acquires detection information from the image processing apparatus 40E via the communication unit 34. In this example, the detection information includes physical quantities respectively detected by the first to fourth detecting units 461 to 464 included in the detecting unit 76 of the image processing apparatus 40E, information indicating free capacities of respective storage regions of the memory 421 and the storage 422 included in the storing unit 72 of the image processing apparatus 40E, and information indicating an error code related to the processing of the image processing apparatus 40E. Note that the detection-information acquiring unit 371 may be configured to always continue to acquire the detection information from the image processing apparatus 40E or may be configured to acquire the detection information at predetermined time instead of being configured to cyclically acquire the detection information. Note that the detection-information acquiring unit 371 is an example of the receiving unit in the aspect of the invention. The detection information is an example of the state information in the aspect of the invention.

The abnormal-event detecting unit 372 detects an event indicating abnormality of the image processing apparatus 40E acquired from the image processing apparatus 40E by the detection-information acquiring unit 371. More specifically, the abnormal-event detecting unit 372 detects, on the basis of the detection information acquired by the detection-information acquiring unit 371, an event indicating abnormality of the hardware included in the image processing apparatus 40E. The abnormal-event detecting unit 372 detects, on the basis of the error code related to the processing of the image processing apparatus 40E, an event indicating abnormality related to the control of the image processing apparatus 40E (the control processing by the software explained above). Note that the abnormal-event detecting unit 372 is an example of the event detecting unit in the aspect of the invention.

When the event indicating the abnormality of the image processing apparatus 40E is detected by the abnormal-event detecting unit 372, the state determining unit 373 determines a state of the image processing apparatus 40E explained below on the basis of the detected event indicating the abnormality of the image processing apparatus 40E. Note that the state determining unit 373 is an example of the determining unit in the aspect of the invention.

The output control unit 374 causes the output unit 35 to display information indicating a determination result of the state of the image processing apparatus 40E by the state determining unit 373. Note that, for example, when the output unit 35 is a speaker, the output control unit 374 causes the output unit 35 to output sound representing the information indicating the determination result of the state of the image processing apparatus 40E by the state determining unit 373.

When the event indicating the abnormality of the image processing apparatus 40E is detected by the abnormal-event detecting unit 372 or when a request from the information processing apparatus 5 is acquired, the communication control unit 375 generates a transmission signal including information indicating the state of the image processing apparatus 40E determined by state determining unit 373 and outputs the generated transmission signal to the information processing apparatus 5 via the communication unit 34. In the following explanation, for convenience of explanation, the communication control unit 375 generating transmission signal including certain information P and outputting the generated transmission signal to an external apparatus (e.g., the information processing apparatus 5) via the communication unit 34 is simply referred to as the communication control unit 375 causing the communication unit 34 to output the information P to the external apparatus and explained.

The information indicating the state of the image processing apparatus 40E is, in this example, a numerical value for identifying the state of the image processing apparatus 40E. However, the information may be other information for identifying the state of the image processing apparatus 40E such as a character, a sign, or the like. In the following explanation, for convenience of explanation, the numerical value is referred to as state code and explained. The state code is an example of the information for identifying the state of the image processing apparatus in the aspect of the invention. The communication control unit 375 causes the communication unit 34 to output, to the image processing apparatus 40E, a request for changing an output state of the output unit 75 included in the image processing apparatus 40E to an output state corresponding to the determination result of the determination by the state determining unit 373. Note that the communication control unit 375 is an example of each of the generating unit and the communication control unit in the aspect of the invention.

The robot control unit 376 acquires an object code from the information processing apparatus 5 via the communication unit 34 and causes the robot 20 to perform the predetermined work on the basis of the acquired object code. When causing the robot 20 to perform the predetermined work, the robot control unit 376 requests, on the basis of the object code, the image processing apparatus 40E to acquire a picked-up image of a range including the work target M picked up by the image pickup apparatus 10 and perform, on the basis of the acquired picked-up image, image processing for calculating a position and a posture of the work target M.

The robot control unit 376 acquires information indicating the position and the posture of the work target M from the image processing apparatus 40E after the image processing by the image processing apparatus 40E ends. The robot control unit 376 generates a control signal based on the acquired position and the acquired posture of the work target M and outputs the generated control signal to the robot 20 to cause the robot 20 to perform the predetermined work.

The functional configuration of the image processing apparatus 40E is explained with reference to FIG. 47.

Figure 47:
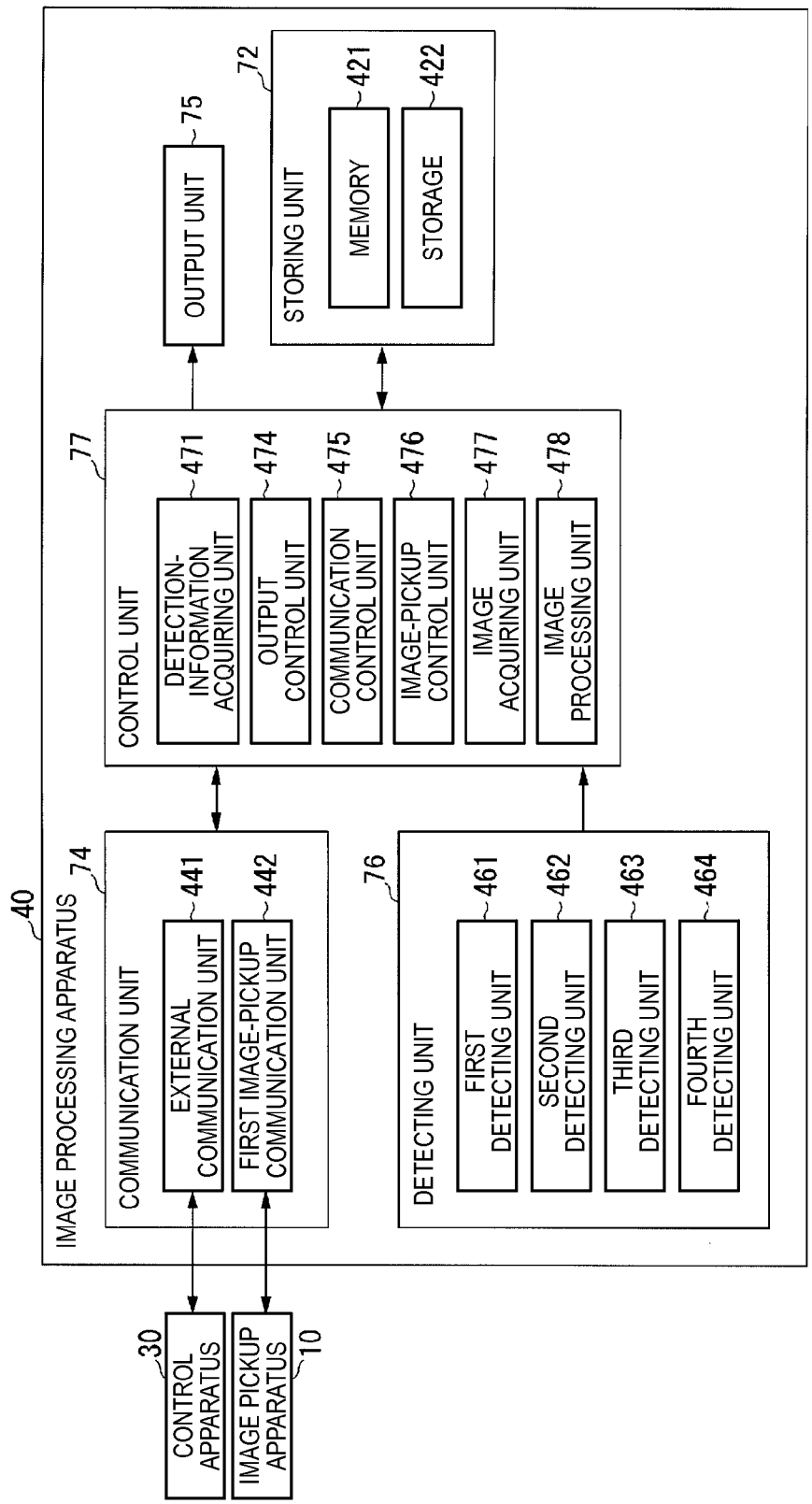
FIG. 47 is a diagram showing an example of the functional configuration of an image processing apparatus.

FIG. 47 is a diagram showing an example of the functional configuration of the image processing apparatus 40E. The image processing apparatus 40E includes the storing unit 72, the communication unit 74, the output unit 75, the detecting unit 76, and the control unit 77. Note that, in this example, in the following explanation, it is assumed that the image pickup apparatus 10 is connected to the first image-pickup communication unit 442 and an image pickup apparatus is not connected to the second image-pickup communication unit 443.

The control unit 77 controls the entire image processing apparatus 40E. The control unit 77 includes the detection-information acquiring unit 471, then output control unit 474, the communication control unit 475, the image-pickup control unit 476, the image acquiring unit 477, and the image processing unit 478. A part or all of the functional units included in the control unit 77 are realized by, for example, the CPU 71 executing the computer program stored in the storing unit 72. A part of the functional units may be hardware functional units such as an LSI and an ASIC.

The detection-information acquiring unit 471 cyclically (e.g., every time one minute elapses) acquires physical quantities detected by the respective first to fourth detecting units 461 to 464 included in the detecting unit 76. The detection-information acquiring unit 471 cyclically (e.g., every time one minute elapses) acquires information indicating free capacities of storage regions respectively from the memory 421 and the storage 422 included in the storing unit 72. In the following explanation, for convenience of explanation, a plurality of physical quantities acquired from the detecting unit 76 and information indicating two free capacities acquired from the storing unit 72 are collectively referred to as detection information and explained. Note that the detection-information acquiring unit 471 may be configured to always continue to acquire the detection information or may be configured to acquire the detection information at predetermined time instead of being configured to cyclically acquire the detection information.

The output control unit 474 changes an output state (in this example, a lighting state) of the output unit 75 according to a request acquired from the control apparatus 30 via the external communication unit 441.

The communication control unit 475 causes the external communication unit 441 to output information indicating the position and the posture of the work target M calculated by the image processing unit 478 to the control apparatus 30.

The image-pickup control unit 476 causes, via the first image-pickup communication unit 442, the image pickup apparatus 10 to pick up an image of a range including the work target M. When some image pickup apparatus Z is connected to the second image-pickup communication unit 443, the image-pickup control unit 476 causes, via the second image-pickup communication unit 443, the image pickup apparatus Z to pick up an image of a range in which the image pickup apparatus Z can pick up an image.

The image acquiring unit 477 acquires a picked-up image from the image pickup apparatus 10 via the first image-pickup communication unit 442. When the image pickup apparatus Z is connected to the second image-pickup communication unit 443, the image acquiring unit 477 acquires a picked-up image from the image pickup apparatus Z via the second image-pickup communication unit 443.

The image processing unit 478 performs, on the basis of the picked-up image acquired by the image acquiring unit 477, image processing for calculating a position and a posture of the work target M.

Processing performed by the control unit 37 of the control apparatus 30 is explained with reference to FIG. 48.

Figure 48:
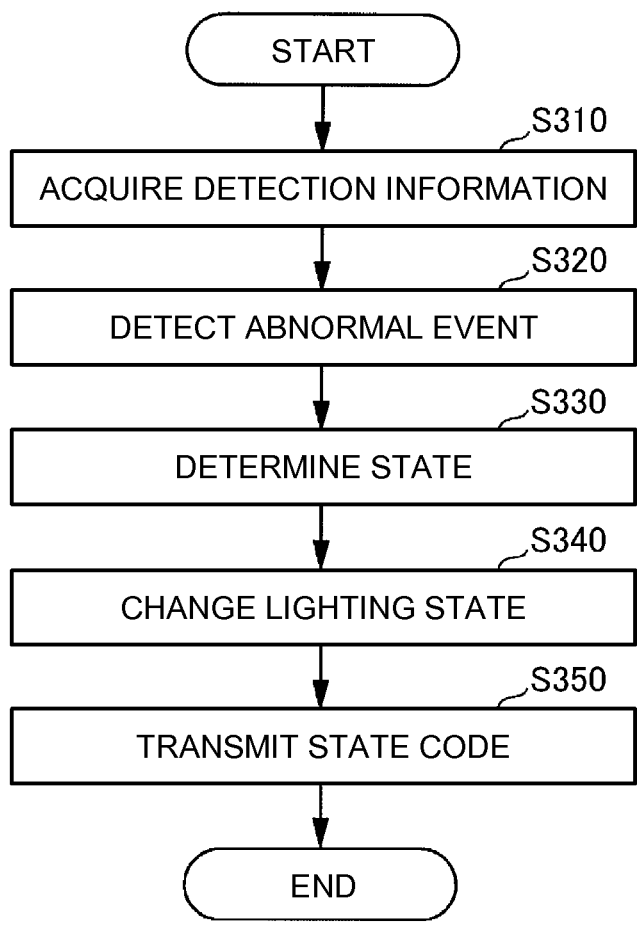
FIG. 48 is a flowchart showing an example of a flow of processing performed by a control unit of the control apparatus.

FIG. 48 is a flowchart for explaining an example of a flow of the processing performed by the control unit 37 of the control apparatus 30. In this embodiment, the control unit 37 intends to cyclically (e.g., every time one minute elapses) perform the flow of the processing shown in FIG. 48 while a power supply for the image processing apparatus 40E connected to the control apparatus 30 is turned on. However, for example, the control unit 37 may be configured to perform the flow of the processing at predetermined time or may be configured to always perform the flow of the processing. Note that the control apparatus 30 may be configured to perform the flow of the processing shown in FIG. 48 according to a request from the information processing apparatus 5.

First, the detection-information acquiring unit 371 outputs a request for detection information acquisition to the image processing apparatus 40E via the communication unit 34. The detection-information acquiring unit 371 acquires, via the communication unit 34, detection information from the image processing apparatus 40E as a response to the request (step S310). Subsequently, the abnormal-event detecting unit 372 detects, on the basis of the detection information acquired by the detection-information acquiring unit 471 in step S310, an event indicating abnormality of the image processing apparatus 40E.

In this example, the event indicating the abnormality of the image processing apparatus 40E is thirteen events A) to M) described below. Note that the event indicating the abnormality of the image processing apparatus 40E may be apart of the thirteen events A) to M), may include other events in addition to the events A) to M), or may be a part of events including the other events and the events A) to M). In the events A) to M), together with the events indicating abnormality of the image processing apparatus 40E, conditions under which the respective events are detected are explained.

A) The temperature of the CPU 71 included in the detection information is within a predetermined range X1 (e.g., 90° or more and less than 100° C.), B) the temperature of the CPU 71 included in the detection information is a predetermined threshold Y1 (e.g., 100° C.) or more, C) the number of revolutions of the cooling fan for the CPU 71 included in the detection information is within a predetermined range X2 (e.g., not 0 RPM (Revolution Per Minute) and less than 1000 RPM), D) the number of revolutions of the cooling fan for the CPU 71 included in the detection information is a predetermined threshold Y2 (e.g., 0 RPM) or less, E) the number of revolutions of the system fan that cools the inside of the housing of the image processing apparatus 40E included in the detection information is within a predetermined range X3 (e.g., not 0 RPM and less than 1000 RPM), F) the number of revolutions of the system fan that cools the inside of the housing of the image processing apparatus 40E included in the detection information is a predetermined threshold Y3 (e.g., 0 RPM) or less, G) the voltage value of the battery for BIOS backup incorporated in the image processing apparatus 40E included in the detection information is within a predetermined range X4 (e.g., 2 V or more and less than 2.5 V), H) the voltage value of the battery for BIOS backup incorporated in the image processing apparatus 40E included in the detection information is less than a predetermined threshold Y4 (e.g., 2 V), I) a code indicating a command error is included in an error code included in the detection information, J) a free space of the memory 421 included in the detection information is less than a predetermined threshold Y5 (e.g., less than 10 MByte), K) a free space of the storage 422 included in the detection information is less than a predetermined threshold Y6 (e.g., 10 MByte), L) a code indicating a detection information acquisition error by the detection-information acquiring unit 471 is included in the error code included in the detection information, and M) a code indicating a control error of the output unit 75 by the output control unit 474 is included in the error code included in the detection information.

Note that, in the following explanation, for convenience of explanation, it is assumed that, in step S320, the event A) among the events A) to M) is detected by the abnormal-event detecting unit 372.

Subsequently, the state determining unit 373 determines a state of the image processing apparatus 40E on the basis of the event indicating the abnormality of the image processing apparatus 40E detected by the abnormal-event detecting unit 372 in step S330 (in this example, the event A)) (step S330). Processing for determining the state of the image processing apparatus 40E by the state determining unit 373 is explained. The state determining unit 373 determines, on the basis of the event indicating the abnormality of the image processing apparatus 40E detected by the abnormal-event detecting unit 372 in step S330, the state of the image processing apparatus 40E from a correspondence relation shown in FIG. 49.

FIG. 49 is a diagram showing an example of a correspondence relation among the event indicating the abnormality of the image processing apparatus 40E, a condition under which the event indicating the abnormality of the image processing apparatus 40E is detected, the state of the image processing apparatus 40E, and a state code for identifying the state of the image processing apparatus 40E.

For example, when the abnormal-event detecting unit 372 does not detect the event indicating the abnormality of the image processing apparatus 40E, on the basis of the correspondence relation shown in FIG. 49, the state determining unit 373 determines that the state of the image processing apparatus 40E is a normal state (a state code is 0). The normal state is an example of the normal state in the aspect of the invention. When the abnormal-event detecting unit 372 detects CPU temperature abnormality (when a condition for detection is 90° C. or higher and less than 100° C.) as the event indicating the abnormality of the image processing apparatus 40E, the state determining unit 373 determines that the state of the image processing apparatus 40E is a warning occurrence state. The warning occurrence state is a state in which a part or all of one or more functional units by hardware or a part of or the entire control processing by software included in the image processing apparatus 40E is highly likely to fail in future.

When the abnormal-event detecting unit 372 detects CPU temperature abnormality (when a condition for detection is 100° C. or more) as the event indicating the abnormality of the image processing apparatus 40E, the state determining unit 373 determines that the state of the image processing apparatus 40E is an error occurrence state. The error occurrence state is a state in which a part or all of one or more functional units by hardware or a part of or the entire control processing by software included in an image processing apparatus 40E is highly likely to be out of order.

Note that the correspondence relation shown in FIG. 49 is only an example. States and state codes of the other image processing apparatuses 40E may be associated with the event indicating the abnormality of the image processing apparatus 40E. Instead of any one of the three states, i.e., the normal state, the warning occurrence state, and the error occurrence state, the state of the image processing apparatus 40E may be any one of a part of the three states, may be any one of one or more other states different from the three states, or may be any one of four or more states including the three states and another state.

In this example, the event indicating the abnormality of the image processing apparatus 40E detected by the abnormal-event detecting unit 372 in step S330 is the event A) explained above (i.e., the event indicating the abnormality of the image processing apparatus 40E associated with a state code 1 shown in FIG. 49). Therefore, in step S330, the state determining unit 373 determines that the state of the image processing apparatus 40E is the warning occurrence state.

Subsequently, the communication control unit 375 causes the communication unit 34 to output, to the image processing apparatus 40E, a request for changing the lighting state of the output unit 75 included in the image processing apparatus 40E to a lighting state corresponding to the state of the image processing apparatus 40E detected by the state determining unit 373 in step S330 (the determination result of the determination by the state determining unit 373) (step S330). When acquiring this request, the output control unit 474 included in the image processing apparatus 40E changes the lighting state of the output unit 75 according to the acquired request. Processing for changing the lighting state of the output unit 75 by the output control unit 474 is explained. The output control unit 474 causes, according to the state of the image processing apparatus 40E detected by the state determining unit 373 in step S330, the output unit 75 to change the lighting state on the basis of the correspondence relation shown in FIG. 50.

FIG. 50 is a table showing an example of rules for the change of the lighting state of the output unit 75 by the output control unit 474.

When the state of the image processing apparatus 40E detected by the state determining unit 373 is the warning occurrence state, the output control unit 474 causes the output unit 75 to change the lighting state of the output unit 75 to the blinking. On the other hand, when the state of the image processing apparatus 40E detected by the state determining unit 373 is the error occurrence state, the output control unit 474 causes the output unit 75 to change the lighting state of the output unit 75 to the lighting. In this example, the state of the image processing apparatus 40E detected by the state determining unit 373 in step S330 is the warning occurrence state. Therefore, the output control unit 474 causes the output unit 75 to change the lighting state of the output unit 75 to the blinking.

Note that, in this example, after causing the output unit 75 to change a lighting state of the red LED included in the output unit 75 to the blinking or lighting, when the state determining unit 373 determines that the state of the image processing apparatus 40E is the normal state (i.e., the state of the image processing apparatus 40E is restored to the normal state from the warning occurrence state or the error occurrence state), the output control unit 474 is configured to cause the output unit 75 to change the lighting state of the red LED included in the output unit 75 to extinguishing. However, the output control unit 474 may be configured to cause the output unit 75 to change the lighting state of the red LED to a lighting state other than the blinking, the lighting, and the extinguishing.

When a plurality of events indicating abnormality of the image processing apparatus 40E are detected and the state of the image processing apparatus 40E is determined for each of the events, for example, when the state determining unit 373 determines that the warning occurrence state related to the CPU 71 and the error occurrence state related to the system fan simultaneously have occurred, the output control unit 474 causes the output unit 75 to change the lighting state of the output unit 75, for example, according to rules R1) and R2) explained below.

R1) When the error occurrence state and the warning occurrence state simultaneously occur, the lighting state of the output unit 75 is changed to the lighting.

R2) When the error occurrence state does not occur and the warning occurrence state occurs, the lighting state of the output unit 75 is changed to the blinking.

Subsequently, the communication control unit 375 causes the external communication unit 441 to output, to the information processing apparatus 5, information indicating a state code for identifying the state of the image processing apparatus 40E determined by the state determining unit 373 in step S330 (step S350). In this way, the control unit 37 repeats the processing of steps S310 to S350 to detect the event indicating the abnormality of the image processing apparatus 40E and change the lighting state of the output unit 75 according to the detected event indicating the abnormality of the image processing apparatus 40E. Consequently, the control apparatus 30 can notify the user of the state of the image processing apparatus 40E according to the lighting state of the output unit of the image processing apparatus 40E. The control unit 37 can notify the information processing apparatus 5 of the state of the image processing apparatus 40E by repeating the processing of steps S310 to S350.

Processing performed by the control apparatus 30 and the information processing apparatus 5 after acquiring the information indicating the state code output from the image processing apparatus 40E in step S350 is explained. The control apparatus 30 records the state code for identifying the state of the image processing apparatus 40E determined by the state determining unit 373 in step S330 in an error history together with a message associated with a state code shown in FIG. 51.

FIG. 51 is a table showing an example of a correspondence relation between the state code for identifying the state of the image processing apparatus 40E determined by the state determining unit 373 in step S330 and the message recorded in the error history together with the state code.

In this way, the control apparatus 30 can record, as the error history, in which hardware or control of the image processing apparatus 40E the event indicating the abnormality of the image processing apparatus 40E has occurred and reduce labor of the user related to maintenance, repairing, and the like of the image processing apparatus 40E. Note that state codes shown in FIG. 51 are only an example and may be other numerical values, characters, and the like.

The control apparatus 30 may be configured to include, for example, a display unit W different from the output unit 35 such as a seven-segment LED, cause the output control unit 374 to display a number representing the state code on the display unit W, and notify the user that the event indicating the abnormality of the image processing apparatus 40E has occurred. In this case, the control apparatus 30 can easily notify the user in which hardware or control of the image processing apparatus 40E the event indicating the abnormality of the image processing apparatus 40E has occurred.

The communication control unit 375 of the control apparatus 30 controls the communication unit 34 to output information indicating the state code to the information processing apparatus 5. The information processing apparatus 5 acquires the information indicating the state code from the control apparatus 30 and causes, on the basis of the acquired state code, the image processing apparatus 40E to display, on a display (or a GUI displayed on the display), information indicating that the event indicating the abnormality has occurred in the image processing apparatus 40E. Consequently, the information processing apparatus 5 can notify, via the GUI, the user in which hardware or control of the image processing apparatus 40E the event indicating the abnormality of the image processing apparatus 40E has occurred. As a result, it is possible to reduce labor of the user who has to directly operate the control apparatus 30 and the image processing apparatus 40E.

In the following explanation, processing performed between the information processing apparatus 5 and the control apparatus 30 after the image processing apparatus 40E is connected to the robot system 1 (in this example, the control apparatus 30) is explained. After the image processing apparatus 40E is connected to the control apparatus 30 and the information processing apparatus 5 recognizes the image processing apparatus 40E, the information processing apparatus 5 cyclically (e.g., every time one second elapses) requests the control apparatus 30 to acquire detection information acquired from the image processing apparatus 40E. When acquiring the request, the control apparatus 30 outputs, to the information processing apparatus 5, detection information acquired in the control apparatus 30 at a point in time when the request is acquired.

The information processing apparatus 5 acquires the detection information from the control apparatus 30. The information processing apparatus 5 receives operation from the user via the GUI displayed on the display and causes, on the basis of the received operation, the display to display a GUI for displaying detection values included in the acquired detection information.

Figure 52:
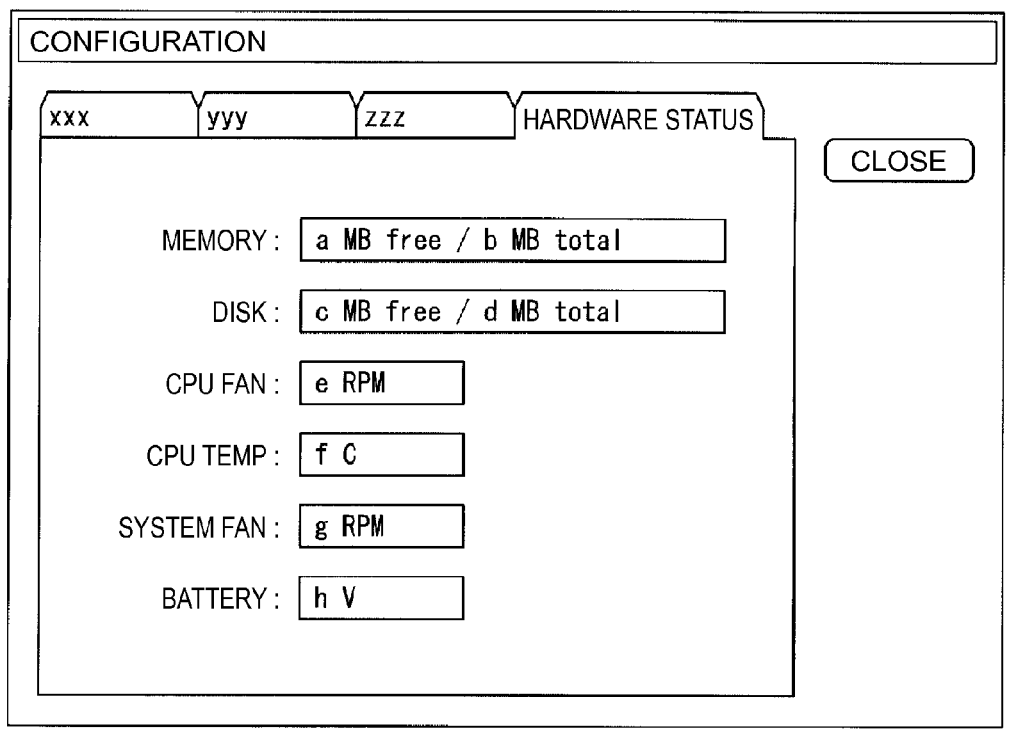
FIG. 52 is a diagram showing an example of a GUI for displaying detection values included in detection information acquired from the image processing apparatus.

FIG. 52 is a diagram showing an example of the GUI for displaying the detection values included in the detection information acquired from the image processing apparatus 40E.

In this example, on the GUI, as shown in FIG. 52, a free capacity of the memory 421 (in FIG. 52, shown as a MB of a total capacity of b MB), a free capacity of the storage 422 (in FIG. 52, shown as c MB of a total capacity of d MB), the number of revolutions of the cooling fan for the CPU 71 (in FIG. 52, shown as e RPM), the temperature of the CPU 71 (in FIG. 52, shown as f ° C.), the number of revolutions of the system fan that cools the inside of the housing of the image processing apparatus 40E (in FIG. 52, shown as g RPM), and a voltage value of the battery for BIOS backup incorporated in the image processing apparatus 40E (in FIG. 52, shown as h V) are displayed. Consequently, by causing the display of the information processing apparatus 5 to display the GUI shown in FIG. 52, the user can check whether the event indicating the abnormality of the image processing apparatus 40E has occurred.

Note that the processing performed between the information processing apparatus 5 and the control apparatus 30 may be performed between the control apparatus 30 and the image processing apparatus 40E, may be performed between the information processing apparatus 5 and the image processing apparatus 40E, or may be performed between the information processing apparatus 5 and the image processing apparatus 40E and between the control apparatus 30 and the image processing apparatus 40E.

The image processing apparatus 40E is only an example of the processing apparatus in the aspect of the invention. The abnormal state notifying function explained in this embodiment may be included in, for example, a sound processing apparatus that processes sound data, an input processing apparatus (e.g., a teaching pendant) that processes input operation received from the user and moves the robot 20 according to the input operation, or a data processing apparatus that processes some other data.

The control apparatus 30 explained above is an example of the controller in the aspect of the invention.

As explained above, the control apparatus 30 included in the robot system 1 in this embodiment acquires (receives), from the image processing apparatus 40E that processes a picked-up image, the detection information of the image processing apparatus 40E, determines the state of the image processing apparatus 40E on the basis of the detection information, and generates, on the basis of a result of the determination, a transmission signal to be transmitted to an external apparatus (in this example, the information processing apparatus 5). Consequently, the control apparatus 30 makes it possible to notify the state of the image processing apparatus.

The control apparatus 30 determines, as the state of the image processing apparatus 40E, any one of a state in which the state of the image processing apparatus 40E is normal, a state in which the image processing apparatus 40E is highly lightly to be out of order, and a state in which the image processing apparatus 40E is highly likely to fail in future. Consequently, the control apparatus 30 makes it possible to notify that the state of the image processing apparatus 40E is any one of the normal state, the state in which the image processing apparatus 40E is highly likely to be out of order, and the state in which the image processing apparatus 40E is highly likely to fail in future.

The control apparatus 30 detects the event indicating the abnormality of the image processing apparatus 40E on the basis of one or more physical quantities indicating states of the hardware included in the image processing apparatus 40E and determines the state of the image processing apparatus 40E on the basis of the detected event. Consequently, the control apparatus 30 can generate a transmission signal based on the state of the image processing apparatus 40E determined on the basis of the event indicating the abnormality of the image processing apparatus 40E.

The control apparatus 30 detects the event indicating the abnormality of the image processing apparatus 40E on the basis of an error code related to the control of the image processing apparatus 40E. Consequently, the control apparatus 30 can generate a transmission signal based on the state of the image processing apparatus 40E determined on the basis of the event indicating the abnormality of the image processing apparatus 40E detected on the basis of the error code related to the control of the image processing apparatus 40E.

The control apparatus 30 associates, with the state of the image processing apparatus 40E determined on the basis of the event indicating the abnormality of the image processing apparatus 40E, information for identifying the state of the image processing apparatus 40E and includes, in the transmission signal, the associated information for identifying the state of the image processing apparatus 40E. Consequently, the control apparatus 30 can generate the transmission signal including the information for identifying the state of the image processing apparatus 40E.

The control apparatus 30 causes the communication unit 34 to transmit the transmission signal generated on the basis of the determination result of the state of the image processing apparatus 40E to the external apparatus. Consequently, the control apparatus 30 can notify a user of the external apparatus of the state of the image processing apparatus 40E.

The control apparatus 30 causes, according to a request from the external apparatus, the communication unit to transmit, to the external apparatus, information indicating the one or more physical quantities indicating the states of the hardware included in the image processing apparatus 40E. Consequently, the control apparatus 30 can notify the user of the one or more physical quantities indicating the states of the hardware included in the image processing apparatus 40E.

The control apparatus 30 causes, according to the determination result of the state of the image processing apparatus 40E, the communication unit 34 to transmit, to the image processing apparatus 40E, information for requesting a change of the lighting state of the output unit 75 included in the image processing apparatus 40E. Consequently, the control apparatus 30 can cause the user to check, with the image processing apparatus 40E, the state of the image processing apparatus 40E.

The information processing apparatus 5 displays a GUI for displaying the one or more physical quantities indicating the states of the hardware included in the image processing apparatus 40E acquired from the control apparatus 30. Consequently, the information processing apparatus 5 can facilitate the management of the state of the image processing apparatus 40E by providing the user with the GUI for displaying the one or more physical quantities indicating the states of the hardware included in the image processing apparatus 40E.

Eighth Embodiment

An embodiment of the invention is explained below with reference to the drawings. Note that components same as the components in the first embodiment are denoted by the same reference numerals and signs and explanation of the components is omitted or simplified.

In the following explanation, a program updating function of an image processing apparatus 40F in the robot system 1 configured as shown in FIG. 1 is explained. In this embodiment, the program updating function of the image processing apparatus 40F indicates, for example, a function of changing (e.g., changing through rewriting or changing through deletion) a part or all of a plurality of computer programs for realizing an OS and application software of the image processing apparatus 40F. However, the program updating function may be a function of changing one or more other computer programs. In the following explanation, for convenience of explanation, changing (e.g., changing through rewriting or changing through deletion) a computer program is referred to as updating the computer program and explained. Note that, in this embodiment, software is explained as a general term of a function realized by executing the computer program.

The hardware configuration of the image processing apparatus 40F is explained with reference to FIG. 53.

Figure 53:
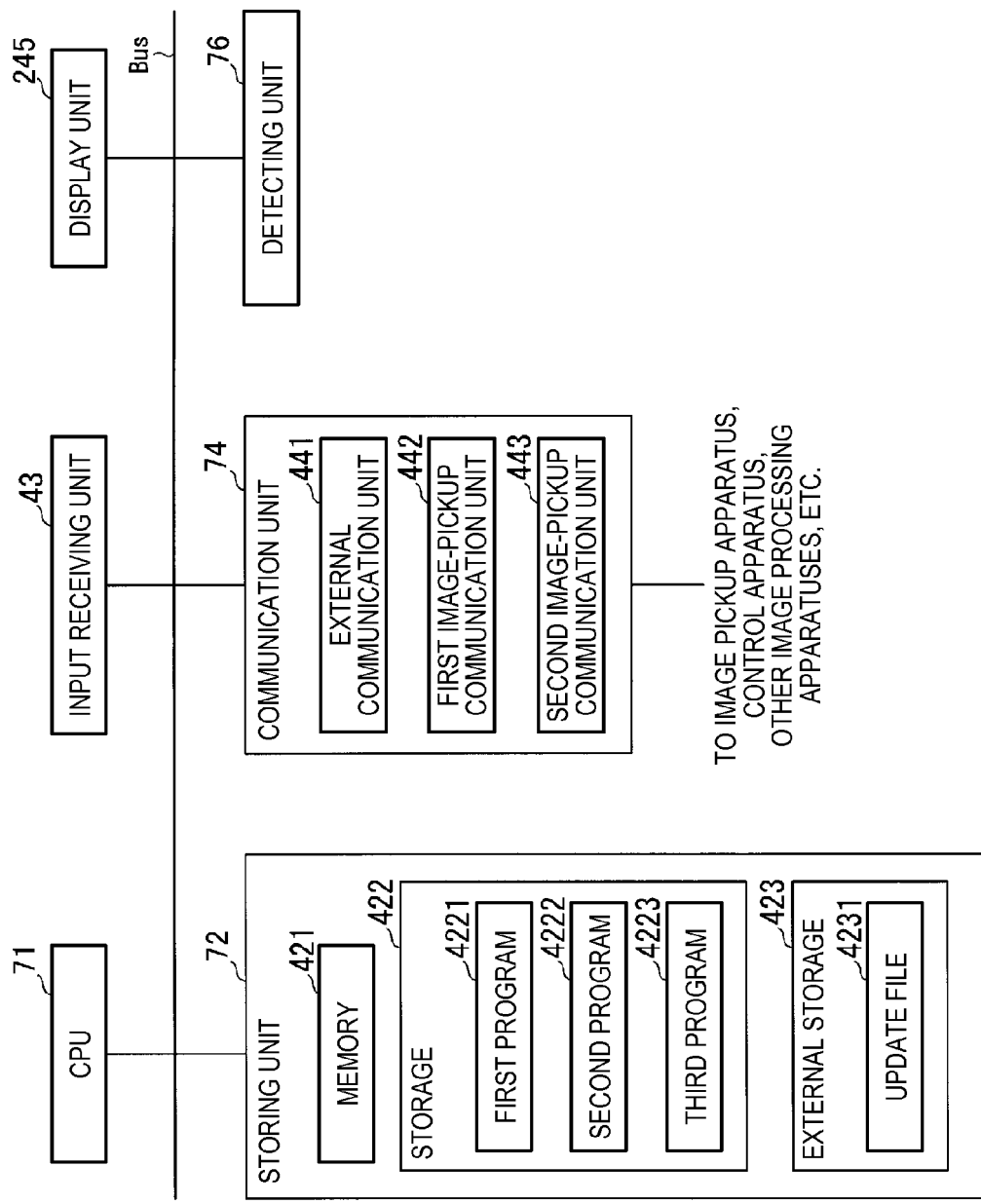
FIG. 53 is a diagram showing an example of a hardware configuration of an image processing apparatus according to an eighth embodiment.

FIG. 53 is a diagram showing an example of the hardware configuration of the image processing apparatus 40F according to this embodiment. The image processing apparatus 40F includes, for example, the CPU 71, the storing unit 72, the input receiving unit 43, the communication unit 74, a display unit 245, and the detecting unit 76 and performs communication with the control apparatus 30, other image processing apparatuses 40F, other apparatuses, and the like via the communication unit 74. These components are communicably connected to one another via the bus Bus. The CPU 71 executes various computer programs stored in the storing unit 72.

The storage 422 includes, for example, a HDD, an SSD, an EEPROM, a ROM, or a RAM and stores various kinds of computer programs including a first computer program 4221, a second computer program 4222, and a third computer program 4223, various kinds of information to be processed by the image processing apparatus 40F, and an image to be processed by the image processing apparatus 40F.

A storage region of the storage 422 is divided into a plurality of storage regions by a partition. In this example, it is assumed that the first computer program 4221 and the second computer program 4222 are stored in a first storage region and the third computer program 4223 is stored in a second storage region different from the first storage region. Note that, like the external storage 423, the memory 421 and the storage 422 may be respectively external storage devices connected by, for example, a digital input/output port such as a USB instead of storage devices incorporated in the image processing apparatus 40F.

The first computer program 4221 indicates a computer program for realizing software different from the second computer program 4222 and the third computer program 4223 by being executed by the CPU 71. In this example, the first computer program 4221 indicates a computer program for realizing an OS by being executed by the CPU 71. However, the first computer program 4221 may be a computer program for realizing other software. For example, the OS realized when the first computer program 4221 is executed by the CPU 71 is an OS built on the basis of LINUX (registered trademark). However, the OS may be other OSs such as UNIX (registered trademark). In the following explanation, for convenience of explanation, the OS is referred to as normal time start OS and explained. Update of the first computer program 4221 is referred to as update of the normal time start OS and explained.

The second computer program 4222 indicates a computer program for realizing software different from the first computer program 4221 and the third computer program 4223 by being executed by the CPU 71. In this example, the second computer program 4222 indicates one or more computer programs for realizing application software operating on the normal time start OS.

The third computer program 4223 indicates a computer program for realizing software different from the first computer program 4221 and the second computer program 4222 by being executed by the CPU 71. In this example, the third computer program 4223 indicates a computer program for realizing an OS by being executed by the CPU 71. However, the third computer program 4223 may be a computer program for realizing other software. For example, the OS realized when the third computer program 4223 is executed by the CPU 71 is an OS started, for example, when the normal time start OS cannot be started because of some reason or when a part or the entire first computer program 4221 is updated. The OS realized when the third computer program 4223 is executed by the CPU 71 is an OS built on the basis of LINUX (registered trademark). However, the OS may be other OSs. In the following explanation, for convenience of explanation, the OS is referred to as failure time start OS and explained.

The external storage 423 is, for example, an external storage device connected by, for example, a digital input/output port such as a USB. The external storage 423 stores an update file 4231 and the like. Note that the external storage 423 is an example of the external storage device.

The update file 4231 is a program file for updating the normal time start OS (i.e., the first computer program 4221). In this example, the update file 4231 is an image file based on a standard such as ext3 (third extended file system) or iso9660 and includes an installer and update data of the normal time start OS.

The installer is a compressed file with a password and includes a normal time start OS update program for updating the normal time start OS. The normal time start OS update program included in the installer is executed by the failure time start OS to perform update of the normal time start OS using the update data of the normal time start OS. Note that a form of the update data of the normal time start OS may be any form as long as the form is a form corresponding to the update program of the normal time start OS.

For example, content of update by the update program of the normal time start OS is postscript of a text according to a command by a shell script, the update data of the normal time start OS does not have to be included (present) in the external storage 423. When the content of the update by the update program of the normal time start OS is copying of a plurality of data files to a specific directory, the update data of the normal time start OS includes the plurality of data files.

The update file 4231 is explained with reference to FIG. 54.

Figure 54:
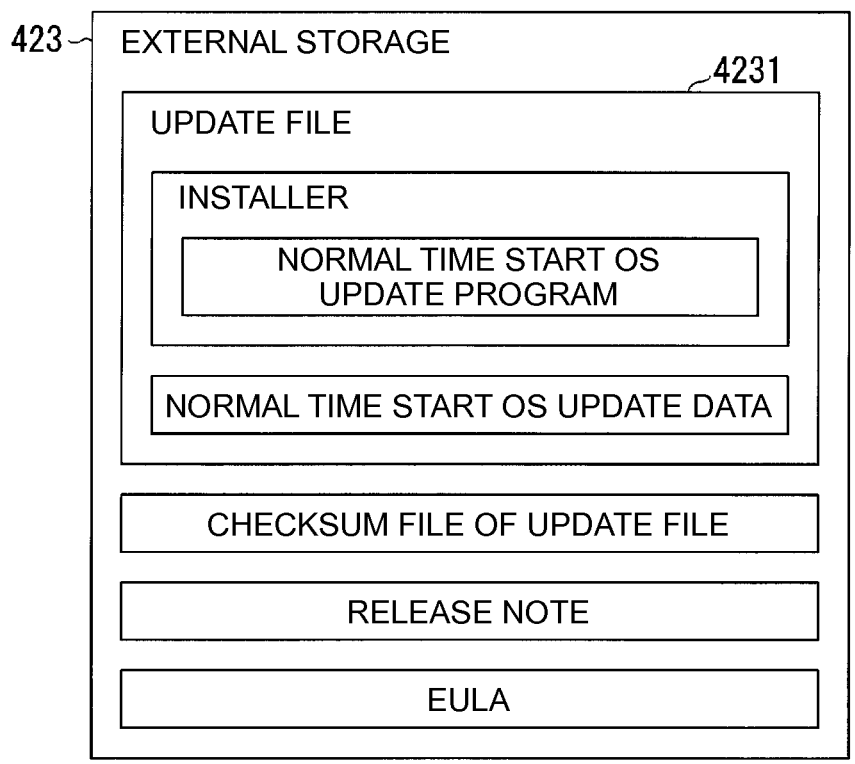
FIG. 54 is a diagram illustrating a plurality of files stored in an external storage.

FIG. 54 is a diagram illustrating a plurality of files stored in the external storage 423. As shown in FIG. 54, the update file 4231 is included in the external storage 423. In this example, in the external storage 423, as shown in FIG. 54, in addition to the update file 4231, a checksum file of the update file 4231, a release note file, and an end user license agreement (EULA) file are included. However, a part or all of these files do not have to be included in the external storage 423. The checksum file is a program file for checking, by being executed by the failure time start OS, whether the update file 4231 is normal. Note that the update file 4231 is an example of the first data in the aspect of the invention.

The input receiving unit 43 is, for example, a built-in or external keyboard or a mouse. However, the input receiving unit 43 may be a touch pad or other input devices instead of the keyboard or the mouse. In the case of the touch pad, the input receiving unit 43 may be configured integrally with the display unit 245 as a touch panel. In this example, the input receiving unit 43 is explained as the external keyboard.

The communication unit 74 includes the external communication unit 441, the first image-pickup communication unit 442, and the second image-pickup communication unit 443.

The external communication unit 441 includes, for example, digital input/output ports such as a plurality of Ethernet (registered trademark) ports or a plurality of USBs. In the explanation of this example, it is assumed that the external communication unit 441 includes two Ethernet (registered trademark) ports.

The first image-pickup communication unit 442 includes digital input/output ports such as a plurality of Ethernet (registered trademark) ports or a plurality of USBs. The ports are dedicated ports for performing communication with the image pickup apparatus 10. Note that the first image-pickup communication unit 442 may be a dedicated port for performing communication with other apparatuses such as a sound acquiring apparatus for acquiring sound.

The second image-pickup communication unit 443 includes digital input/output ports such as a plurality of Ethernet (registered trademark) ports or a plurality of USBs. The ports are dedicated ports for performing communication with the image pickup apparatus 10. Note that the second image-pickup communication unit 443 may be a dedicated port for performing communication with other apparatuses such as a sound acquiring apparatus for acquiring sound.

The first image-pickup communication unit 442 and the second image-pickup communication unit 443 are different in communication standards of the ports thereof. In this example, it is assumed that the first image-pickup communication unit 442 includes four Ethernet (registered trademark) ports and the second image-pickup communication unit 443 includes four USB ports.

The display unit 245 is, for example, an external liquid crystal display panel or an organic EL display panel. However, instead, the display unit 245 may be a built-in liquid crystal display panel or organic EL display panel.

The detecting unit 76 is a plurality of sensors for detecting physical quantities serving as indexes indicating states of a respective plurality of pieces of hardware included in the image processing apparatus 40F. In this example, the plurality of pieces of hardware included in the image processing apparatus 40F indicate a not-shown cooling fan for the CPU 71, a not-shown system fan that cools the inside of a housing of the image processing apparatus 40F, the CPU 71, and a not-shown battery for BIOS backup incorporated in the image processing apparatus 40F. However, the plurality of pieces of hardware may be other pieces of hardware.

The functional configuration of the image processing apparatus 40F during the start of the normal time start OS is explained with reference to FIG. 55.

Figure 55:
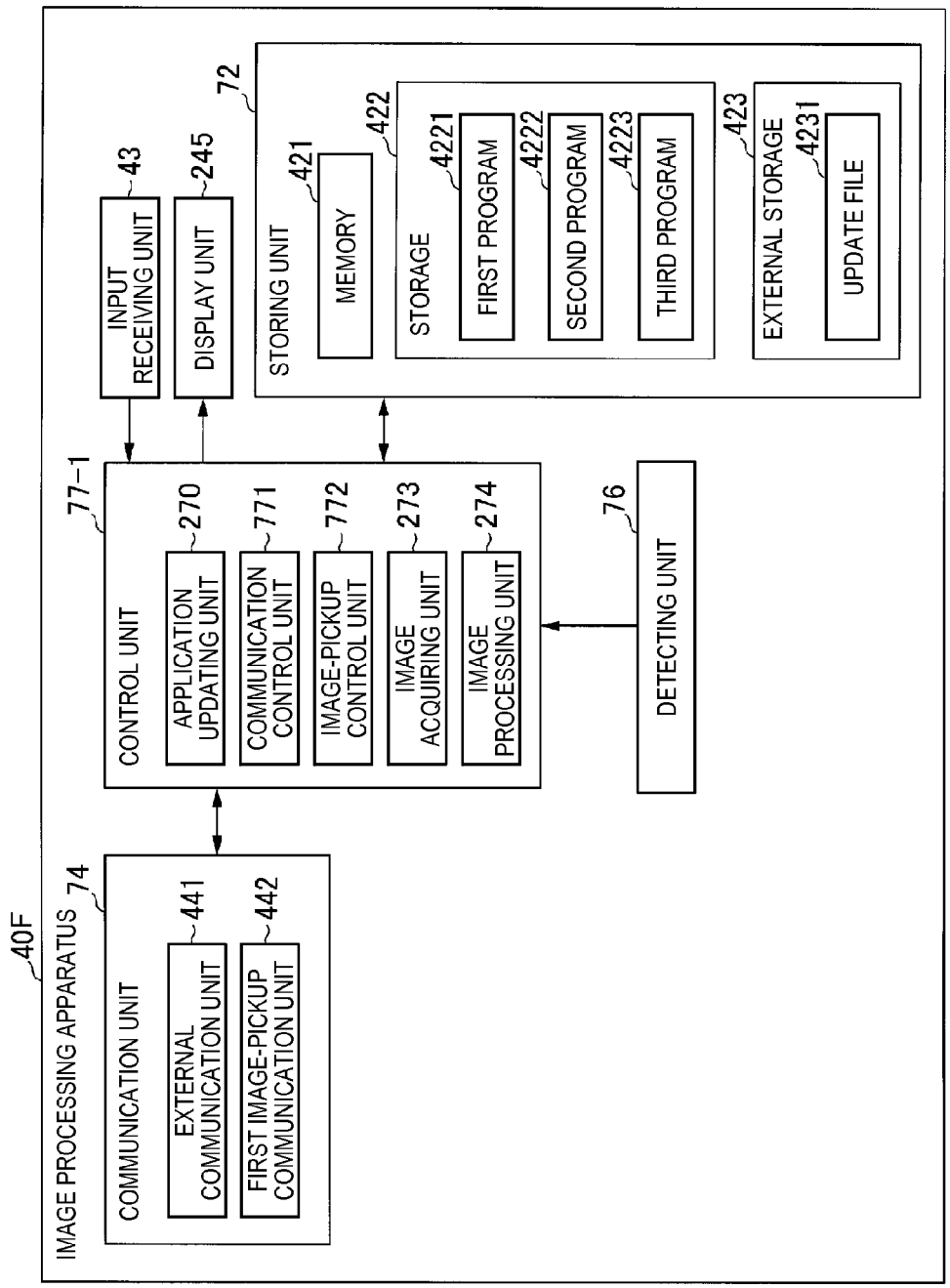
FIG. 55 is a diagram showing an example of the functional configuration of the image processing apparatus during the start of a normal time start OS.

FIG. 55 is a diagram showing an example of the functional configuration of the image processing apparatus 40F during the start of the normal time start OS. The image processing apparatus 40F includes the storing unit 72, the communication unit 74, the display unit 245, a detecting unit 76, and a control unit 77-1. A part or all of functional units included in the control unit 77-1 are realized by, for example, the CPU 71 executing the first computer program 4221 and the second computer program 4222 stored in the storing unit 72.

A part of the functional units may be hardware functional units such as an LSI and an ASIC. Note that, in the explanation of this example, it is assumed that the image pickup apparatus 10 is connected to the first image-pickup communication unit 442 and an image pickup apparatus is not connected to the second image-pickup communication unit 443.

The control unit 77-1 controls the entire image processing apparatus 40F. The control unit 77-1 includes an application updating unit 270, a communication control unit 771, an image-pickup control unit 772, an image acquiring unit 273, and an image processing unit 274.

When acquiring, from the information processing apparatus 5 via the external communication unit 441, a request for update of application software realized when a part or all of one or more computer programs included in the second computer program 4222 are executed by the CPU 71, the application updating unit 270 performs, according to the request, application update processing for updating a part or all of the one or more computer programs included in the second computer program 4222. Note that the application updating unit 270 is an example of the second updating unit.

The communication control unit 771 outputs information concerning a position and a posture of the work target M calculated by the image processing unit 274 to the control apparatus 30.

The image-pickup control unit 772 controls, via the first image-pickup communication unit 442, the image pickup apparatus 10 to pick up an image of a range including the work target M. When some image pickup apparatus Z is connected to the second image-pickup communication unit 443, the image-pickup control unit 772 controls, via the second image-pickup communication unit 443, the image pickup apparatus Z to pick up an image of a range in which the image pickup apparatus Z can pick up an image.

The image acquiring unit 273 acquires a picked-up image from the image pickup apparatus 10 via the first image-pickup communication unit 442. When the image pickup apparatus Z is connected to the second image-pickup communication unit 443, the image acquiring unit 273 acquires a picked-up image from the image pickup apparatus Z via the second image-pickup communication unit 443.

The image processing unit 274 performs, on the basis of the picked-up image acquired by the image acquiring unit 273, image processing for calculating a position and a posture of the work target M. Note that the image processing unit 274 is an example of the processing unit in the aspect of the invention.

The functional configuration of the image processing apparatus 40F during the start of the failure time start OS is explained with reference to FIG. 56.

Figure 56:
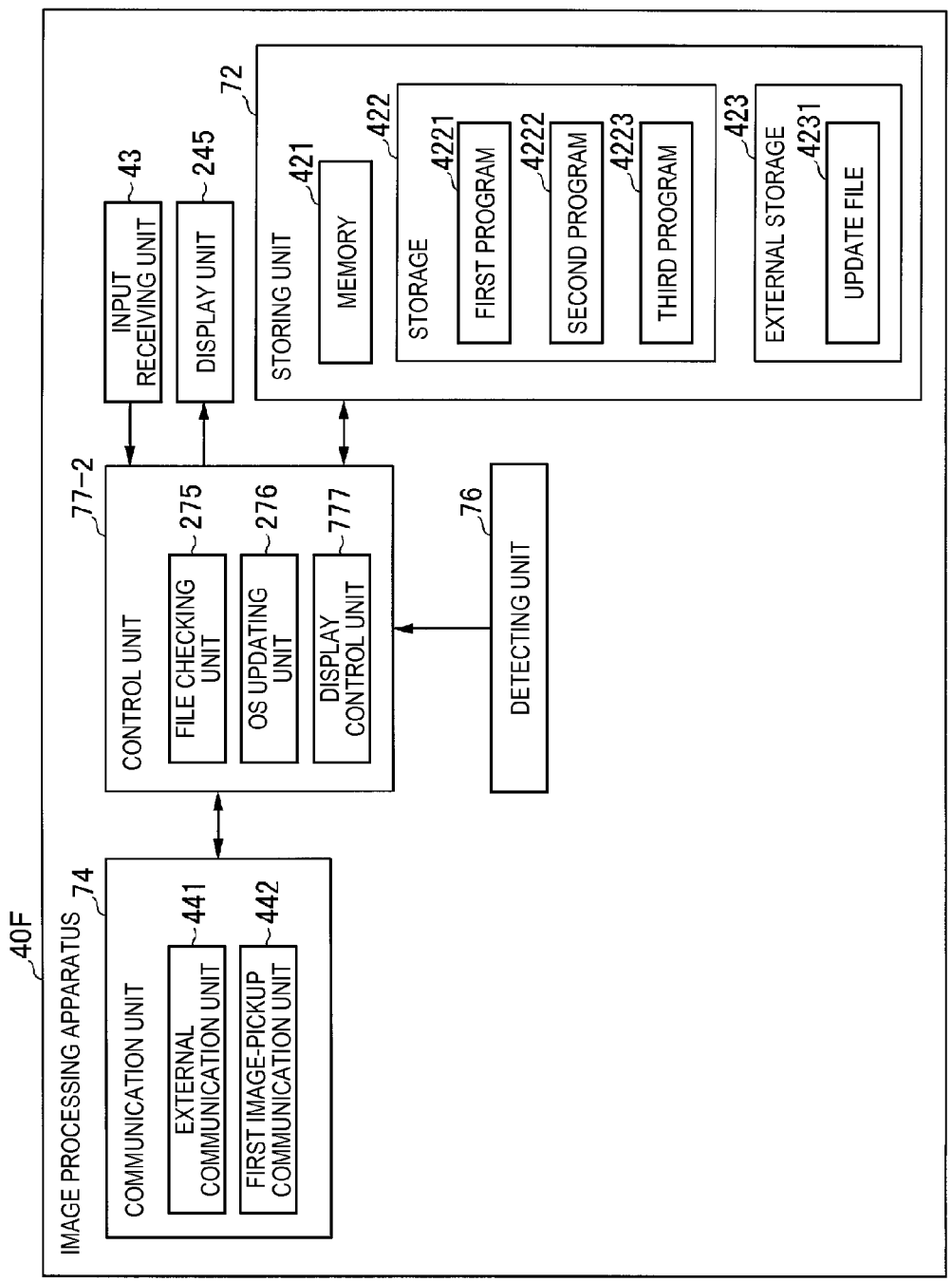
FIG. 56 is a diagram showing an example of the functional configuration of the image processing apparatus during the start of a failure time start OS.

FIG. 56 is a diagram showing an example of the functional configuration of the image processing apparatus 40F during the start of the failure time start OS. The image processing apparatus 40F includes the storing unit 72, the communication unit 74, the display unit 245, the detecting unit 76, and a control unit 77-2. Apart or all of functional units included in the control unit 77-2 are realized by, for example, the CPU 71 executing the third computer program 4223 stored in the storing unit 72. A part of the functional units may be hardware functional units such as an LSI and an ASIC.

The control unit 77-2 controls the entire image processing apparatus 40F. The control unit 77-2 includes a file checking unit 275, an OS updating unit 276, and a display control unit 777.

When execution of OS update processing for updating the normal time start OS is selected by a user via a GUI that the display control unit 777 causes the display unit 245 to display, the file checking unit 275 confirms that the update file 4231 is stored in the external storage 423 connected to the image processing apparatus 40F (determines whether the update file 4231 is stored).

When the file checking unit 275 confirms that the update file 4231 is stored in the external storage 423 (determines that the update file 4231 is stored), the OS updating unit 276 updates the first computer program 4221 (i.e., performs the OS update processing) on the basis of the update file 4231 stored in the external storage 423. Note that the OS updating unit 276 is an example of the first updating unit.

The display control unit 777 controls the display unit 245 to display a CUI (Command User Interface) or a GUI related to the operation of the failure time start OS. In the explanation of this example, it is assumed that the display control unit 777 controls the display unit 245 to display the CUI.

In the following explanation, application update processing performed by the control unit 77-1 is explained with reference to FIG. 57.

Figure 57:
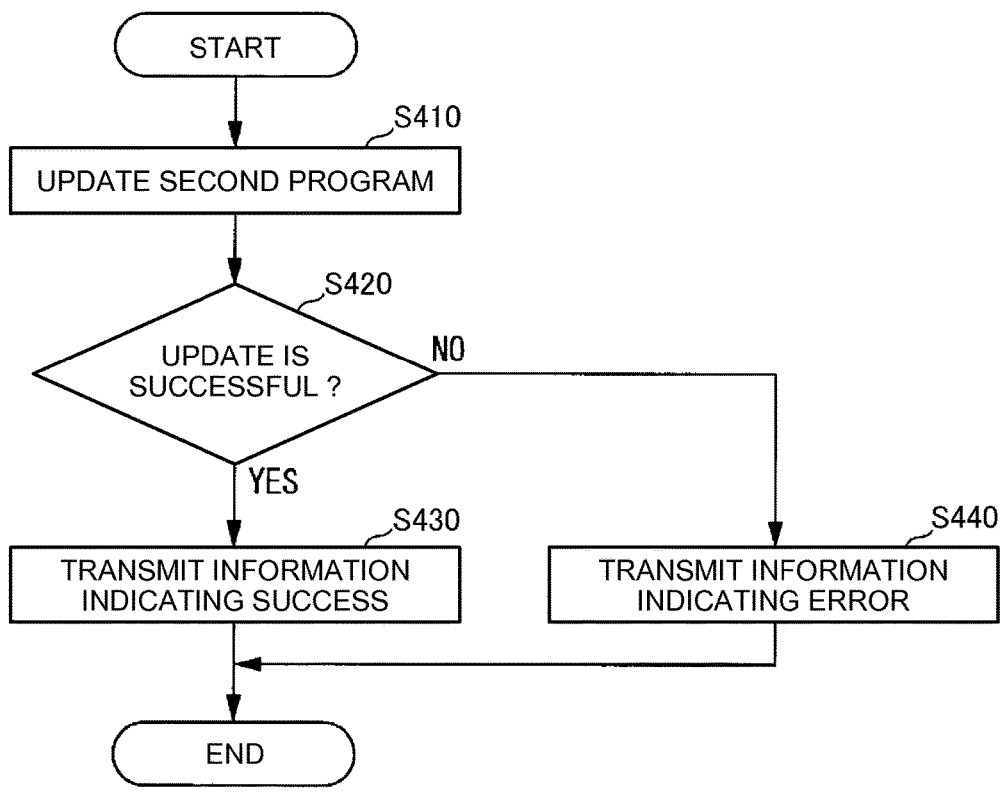
FIG. 57 is a flowchart showing an example of a flow of application update processing performed by a control unit.

FIG. 57 is a flowchart for explaining an example of a flow of the application update processing performed by the control unit 77-1. In the following explanation, processing performed after the control unit 77-1 acquires, from the information processing apparatus 5 via the external communication unit 441, a request for update of application software realized when a part or all of one or more computer programs included in the second computer program 4222 are executed by the CPU 71 is explained.

First, the application updating unit 270 acquires, from the information processing apparatus 5, a file for update necessary for updating a part or all of the one or more computer programs included in the second computer program. 4222. In the following explanation, for convenience of explanation, the file for update is referred to as file for application update and explained. The application updating unit 270 performs, on the basis of the acquired file for application update, update of a part or all of the one or more computer programs included in the second computer program 4222 (step S410). In the following explanation, for convenience of explanation, the update of a part or all of the one or more computer programs included in the second computer program 4222 is simply referred to as update of the second computer program 4222 and explained. Note that the file for application update is an example of the second data in the aspect of the invention.

Subsequently, the application updating unit 270 determines whether the update of the second computer program 4222 performed in step S410 is successful (step S420). When it is determined that the update of the second computer program 4222 is successful (Yes in step S420), the communication control unit 771 transmits information indicating the success of the update of the second computer program 4222 to the information processing apparatus 5 via the external communication unit 441 (step S430). On the other hand, when it is determined that the update of the second computer program 4222 is unsuccessful (No in step S420), the communication control unit 771 transmits information indicating an error of the update of the second computer program 4222 to the information processing apparatus 5 via the external communication unit 441 (step S440).

In the following explanation, OS update processing performed by the control unit 77-2 is explained with reference to FIG. 58.

Figure 58:
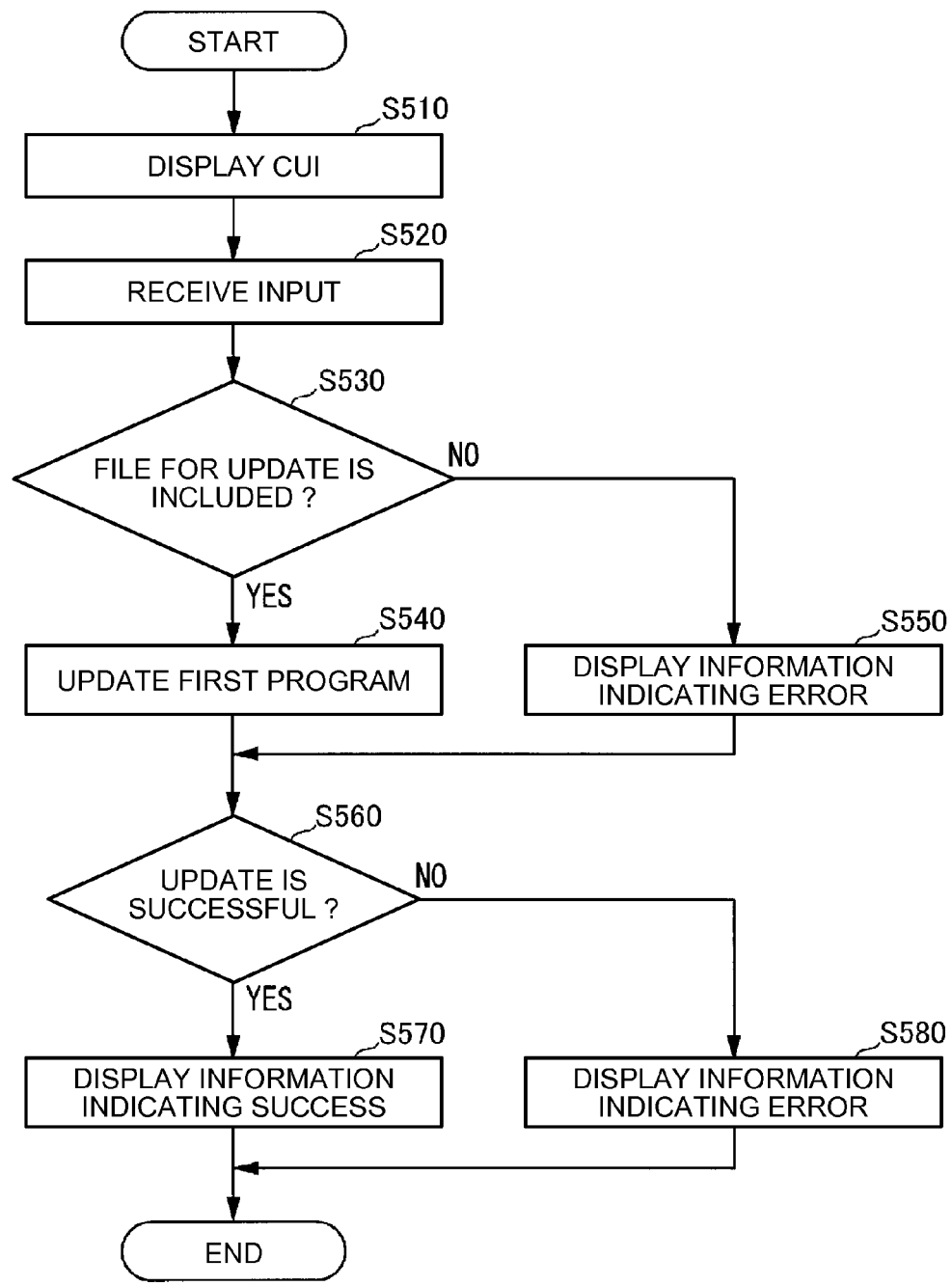
FIG. 58 is a flowchart showing an example of a flow of OS update processing performed by the control unit.

FIG. 58 is a flowchart for explaining an example of a flow of the OS update processing performed by the control unit 77-2. In the following explanation, processing performed after the failure time start OS is started in the image processing apparatus 40F is explained. First, the display control unit 777 controls the display unit 245 to display a CUI for displaying a menu of the failure time start OS (step S510).

The CUI for displaying the menu of the failure time start OS is explained with reference to FIG. 59.

FIG. 59 is a diagram showing an example of the CUI for displaying the menu of the failure time start OS. On the CUI, for example, a menu indicating five selectable operations of the failure time start OS is displayed as shown in FIG. 59. In this example, the five selectable operations are respectively operations explained below. Note that the five operations explained below are respectively Japanese versions of the five operations displayed on the CUI shown in FIG. 59.

1. Reset (initialization) of setting of xxx
2. Reset (initialization) of setting of yyy
3. Update of the normal time start OS
9. Start of Shell
0. End the failure time start OS and restart the normal time start OS In this example, the "setting of xxx" indicates setting of the image processing performed by the image processing unit 274 but may be other settings. The "setting of yyy" indicates setting of the image processing apparatus 40F but may be other settings. The image processing apparatus 40F receives, with the input receiving unit 43, via the CUI shown in FIG. 59, a number (any one of 1 to 3, 9, and 0 described above) indicating a desired operation from the user to perform the operation indicated by the received number. In FIG. 59, a state in which "3. Update of the normal time start OS" is selected is shown.

Subsequently, the control unit 77-2 receives, with the input receiving unit 43, via the CUI displayed in step S510, a number indicating a desired operation from the user (step S520). In the following explanation, it is assumed that the user selects "3. Update of the normal time start OS" in step S520. When the user selects "3. Update of the normal time start OS" in step S520, the display control unit 777 controls the display unit 245 to display a CUI shown in FIG. 60.

FIG. 60 shows an example of a CUI for displaying a warning to an event that occurs when the update of the normal time start OS is executed and checking whether the update of the normal time start OS is executed. In this example, the execution of the update of the normal time start OS causes an event that all data are erased as displayed in the warning shown in FIG. 60. However, instead, the execution of the update of the normal time start OS may cause other events, for example, erasing of a part of the data. In the following explanation, it is assumed that, in step S520, the control unit 77-2 receives, with the input receiving unit 43, from the user, operation for accepting the execution of the update of the normal time start OS (in this example, operation for inputting "yes").

When, in step S520, the control unit 77-2 receives, with the input receiving unit 43, from the user, the operation for accepting the execution of the update of the normal time start OS, the file checking unit 275 determines (checks) whether the update file 4231 is stored in the external storage 423 connected to the image processing apparatus 40F (step S530). When the file checking unit 275 determines that the update file 4231 is not stored in the external storage 423 (No in step S530), the display control unit 777 controls the display unit 245 to display a CUI for displaying information indicating an error (step S550). On the other hand, when the file checking unit 275 determines that the update file 4231 is stored in the external storage 423 (Yes in step S530), the OS updating unit 276 performs OS update processing for updating the normal time start OS (step S540).

The OS update processing for updating the normal time start OS is explained. The OS updating unit 276 executes a checksum file stored in the external storage 423 and determines (checks) whether the update file 4231 is normal. When it is determined by the checksum file that the update file 4231 is not normal, the OS updating unit 276 determines that the update file 4231 is an unauthorized update file and determines in determination in step S560 that the update of the normal time start OS is successful.

On the other hand, when it is determined by the checksum file that the update file 4231 is normal, the OS updating unit 276 mounts the update file 4231, for example, on a predetermined mount point (directory). When the update file 4231 cannot be mounted on the mount point, the OS updating unit 276 determines that the update file 4231 is an unauthorized update file and determines in the determination in step S560 that the update of the normal time start OS is unsuccessful.

On the other hand, when the update file 4231 is mounted on the mount point, the OS updating unit 276 decompresses, using a password stored in advance in the failure time start OS, in the external storage 423, the installer included in the update file 4231 stored in the external storage 423. When the decompression of the installer performed using the password stored in advance in the failure time start OS is unsuccessful, the OS updating unit 276 determines that the update file 4231 is an unauthorized update file and determines in the determination in step S560 that the update of the normal time start OS is unsuccessful.

On the other hand, when the decompression of the installer performed using the password stored in advance in the failure time start OS is successful, the OS updating unit 276 executes a decompressed update program for the normal time start OS and executes update of the normal time start OS on the basis of update data of normal time start OS. When executing the update of the normal time start OS, the OS updating unit 276 backs up the normal time start OS before the update in a storage region of the external storage 423. Consequently, when the normal time start OS is damaged because of some reason during the execution of the update of the normal time start OS, the OS updating unit 276 can restore the normal time start OS using the normal time start OS backed up in the external storage 423.

Subsequently, the OS updating unit 276 determines whether the update of the normal time start OS performed in step S540 is successful (step S560). When it is determined that the update of the normal time start OS is not successful (unsuccessful), the display control unit 777 controls the display unit 245 to display information indicating an error (step S580) and ends the processing. On the other hand, when it is determined that the update of the normal time start OS is successful, the display control unit 777 controls the display unit 245 to display a CUI for displaying information indicating the success of the update of the normal time start OS as shown in FIG. 61 (step S580) and ends the processing.

FIG. 61 is a diagram showing an example of the CUI for displaying the information indicating the success of the update of the normal time start OS.

In this way, the image processing apparatus 40F performs the update of the normal time start OS using the external storage 423. Therefore, even when a free capacity of the storage 422 is small, it is possible to perform the processing related to the update of the normal time start OS irrespective of the free capacity of the storage 422, for example, back up the normal time start OS before the update in the external storage 423.

The image processing apparatus 40F performs the update of the normal time start OS using the external storage 423. Therefore, for example, even when the image processing apparatus 40F is connected in a closed network like a factory, the image processing apparatus 40F can easily perform the update of the normal time start OS.

As explained above, the image processing apparatus 40F can easily perform the update of the normal time start OS. Therefore, the image processing apparatus 40F can quickly perform a complementary treatment for a fatal deficiency and vulnerability due to the normal time start OS. The image processing apparatus 40F can perform, for example, application update processing for improving functions and performance of application software related to image processing.

As explained above, in the image processing apparatus 40F included in the robot system 1 in this embodiment, the first computer program 4221 is updated using the update file 4231 stored in the external storage 423. The second computer program 4222 is updated using the file for application update stored in the information processing apparatus 5. Consequently, the image processing apparatus 40F can easily update a computer program.

The image processing apparatus 40F operates according to the execution of the third computer program 4223 different from the first computer program 4221 and the second computer program 4222, reads the update file 4231 stored in the external storage 423, and updates the first computer program 4221 on the basis of the read update file 4231. Consequently, the image processing apparatus 40F can update the first computer program 4221 without executing the first computer program 4221. Therefore, the image processing apparatus 40F can suppress the first computer program 4221 from being damaged by the update of the first computer program 4221 performed during the execution of the first computer program 4221.

The image processing apparatus 40F backs up the first computer program 4221 before the update in the storage region of the external storage 423 and thereafter updates the first computer program 4221 on the basis of the update file 4231. Consequently, the image processing apparatus 40F does not need to secure a storage region for backup in a storage region of the image processing apparatus 40F. It is possible to reduce costs for securing the storage region of the image processing apparatus 40F.

The image processing apparatus 40F determines whether the update file 4231 is stored in the external storage 423. When it is determined that the update file 4231 is not stored in the external storage 423, the image processing apparatus 40F causes the display unit 245 to display information indicating an error. When it is determined that the update file 4231 is stored in the external storage 423, the image processing apparatus 40F updates the first computer program 4221 on the basis of the update file 4231. Consequently, the image processing apparatus 40F can suppress the update of the first computer program 4221 from being continued by mistake in a state in which the update file 4231 is not stored in the external storage 423.

The image processing apparatus 40F operates according to the execution of the first computer program 4221, acquires the file for application update from the information processing apparatus 5 via the external communication unit 441, and updates the second computer program 4222 on the basis of the acquired file for application update. Consequently, the image processing apparatus 40F can easily update the second computer program 4222 with the information processing apparatus 5.

The embodiments of the invention are explained in detail above with reference to the drawings. However, specific components are not limited to the embodiments and may be, for example, changed, substituted, and deleted without departing from the spirit of the invention.

A computer program for realizing the functions of any components in the apparatuses explained above (e.g., the information processing apparatus 5, the control apparatus 30, and the image processing apparatuses 40F, 40-1 to 40-3, and 40D) may be recorded in a computer-readable recording medium, read by a computer system, and executed. Note that the "computer system" includes an OS and hardware such as peripheral apparatuses. The "computer-readable recording medium" refers to a portable medium such as a flexible disk, a magneto-optical disk, a ROM, or a CD (Compact Disk)-ROM or a storage device such as a hard disk incorporated in the computer system. Further, the "computer-readable recording medium" includes a recording medium that retains a computer program for a fixed time like a volatile memory (a RAM) in a computer system functioning as a server or a client when the computer program is transmitted via a network such as the Internet or a communication line such as a telephone line.

The computer program may be transmitted from the computer system, in which the computer program is stored in the storage device or the like, to other computer systems via a transmission medium or a transmission wave in the transmission medium. The "transmission medium" for transmitting the computer program refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in a combination with a computer program already recorded in the computer system, a so-called differential file (a differential program).

The entire disclosures of Japanese Patent Application Nos. 2014-188035, filed Sep. 16, 2014; 2014-188127, filed Sep. 16, 2014; 2014-187732, filed Sep. 16, 2014; 2014-188036, filed Sep. 16, 2014; 2014-188037, filed Sep. 16, 2014; and 2014-188038, filed Sep. 16, 2014 are expressly incorporated by reference herein.

What is claimed is:

1. An image processing apparatus comprising:
    a plurality of camera connectors that are communicably connected to a plurality of cameras, each of the plurality of camera connectors having a different network segment;
    a plurality of other connectors that are communicably connected to at least a first robot controller of a plurality of robot controllers and at least a first other image processing apparatus of a plurality of other image processing apparatuses, the first robot controller being configured to control a robot, the plurality of other connectors respectively having different identifiers;
    a processor that is configured to process images picked up by the plurality of cameras, the processor being configured to detect and compare network segments of the plurality of camera connectors and the plurality of other connectors, the processor being configured to set a same IP address for two or more other connectors among the plurality of other connectors; and
    a memory that is configured to store a plurality of identifiers of the plurality of other connectors,
    wherein a first camera of the plurality of cameras is connected to a first camera connector of the plurality of camera connectors, and the first camera connector has a first network segment,
    each of the plurality of other connectors has a second network segment, and
    when the processor determines that the first network segment is the same as the second network segment, the processor is configured to change the first network segment of the first camera connector to a third network segment that is different from the first and second network segments.

2. The image processing apparatus according to claim 1, wherein the processor is configured to set an IP address different from the same IP address for another other connector, which is different from the two or more other connectors, of the plurality of other connectors.

3. The image processing apparatus according to claim 1, wherein the same IP address is for information that is input from one of an information processing apparatus that outputs a control program for the robot to the plurality of robot controllers and a setting screen on which an IP address is set.

4. A robot system comprising:
    an image processing apparatus that has:
        a plurality of camera connectors that are communicably connected to a plurality of cameras, respectively, and each of the plurality of camera connectors having a different network segment;
        a plurality of other connectors that are communicably connected to at least a first robot controller of a plurality of robot controllers and at least a first other image processing apparatus of a plurality of other image processing apparatuses, the first robot controller being configured to control a robot, the plurality of other connectors respectively having different identifiers;
        a processor that is configured to process images picked up by the plurality of cameras, the processor being configured to detect and compare network segments of the plurality of camera connectors and the plurality of other connectors, the processor being configured to set a same IP address for two or more other connectors among the plurality of other connectors; and a memory that is configured to store a plurality of identifiers of the plurality of other connectors;

a robot main body of the robot;

the plurality of cameras; and the first robot controller configured to perform driving control for the robot main body, wherein a first camera of the plurality of cameras is connected to a first camera connector of the plurality of camera connectors, and the first camera connector has a first network segment, each of the plurality of other connectors has a second network segment, and when the processor determines that the first network segment is the same as the second network segment, the processor is configured to change the first network segment of the first camera connector to a third network segment that is different from the first and second network segments.

5. The robot system according to claim 4, wherein the processor is configured to set an IP address different from the same IP address for another other connector, which is different from the two or more other connectors, of the plurality of other connectors.

6. The robot system according to claim 4, wherein the same IP address is for information that is input from one of an information processing apparatus that outputs a control program for the robot to the plurality of robot controllers and a setting screen on which an IP address is set.

* * * * *